(12) United States Patent
Pignataro et al.

(10) Patent No.: US 10,938,661 B1
(45) Date of Patent: Mar. 2, 2021

(54) SERVICE HEATMAP-BASED TELEMETRY FEEDBACK LOOP

(71) Applicant: Cisco Technology, Inc., San Jose, CA (US)

(72) Inventors: Carlos M. Pignataro, Cary, NC (US); Nagendra Kumar Nainar, Morrisville, NC (US); Benoit Claise, Othée (BE); Joseph M. Clarke, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/704,147

(22) Filed: Dec. 5, 2019

(51) Int. Cl.
*H04L 12/24* (2006.01)
*H04L 12/26* (2006.01)

(52) U.S. Cl.
CPC ...... *H04L 41/0893* (2013.01); *H04L 41/0853* (2013.01); *H04L 41/12* (2013.01); *H04L 41/5045* (2013.01); *H04L 43/045* (2013.01)

(58) Field of Classification Search
CPC . H04L 41/0893; H04L 41/5045; H04L 41/12; H04L 41/0853; H04L 43/045
See application file for complete search history.

(56) References Cited

U.S. PATENT DOCUMENTS

| | | | |
|---|---|---|---|
| 9,059,941 B1 | 6/2015 | Oweis et al. | |
| 9,929,923 B2 | 3/2018 | Heinz et al. | |
| 9,992,082 B2 | 6/2018 | MacNeil et al. | |
| 10,372,520 B2 | 8/2019 | Johnston et al. | |
| 10,637,744 B2* | 4/2020 | Carroll | H04L 43/026 |
| 2011/0261049 A1* | 10/2011 | Cardno | G06Q 10/10 345/419 |
| 2019/0028909 A1 | 1/2019 | Mermoud et al. | |
| 2019/0132213 A1 | 5/2019 | Na et al. | |
| 2019/0253328 A1* | 8/2019 | Kolar | H04L 43/045 |

OTHER PUBLICATIONS

Cisco, "Intent-Based Networking", C11-740210-00, Jan. 2018, 11 pages.
Path Solutions, "Root-Cause Troubleshooting for Your Entire Network", Path Solutions Inc., 2019, 2 pages.
VMWare, "VMWare Smart Assurance", VMWare, Inc., Palo Alto, CA, 2019, 4 pages.

* cited by examiner

*Primary Examiner* — Kristie D Shingles
(74) *Attorney, Agent, or Firm* — Edell, Shapiro & Finnan, LLC

(57) ABSTRACT

A method includes configuring a service on a network, and generating infrastructure definitions that define one or more network topologies configured on the network to implement the service. The method also includes decomposing a service definition of the service into a subservice dependency graph to indicate a collection of subservices and dependencies between the subservices that collectively implement the service. The method further includes, based on the subservice dependency graph and the one or more network topologies defined by the infrastructure definitions, determining infrastructure elements configured in the network to implement the service. The method also includes generating a heatmap that maps the service against the infrastructure elements and that indicates, for the infrastructure elements, respective measures of criticality in a range from a high criticality to a low criticality.

20 Claims, 34 Drawing Sheets

```
                                                                    300

302 ⎰ At path rpc-reply/data/devices/device[sain-pe-1]/config/interface/GigabitEthernet:
    ⎱ <GigabitEthernet xmlns="http://tail-f.com/ned/cisco-ios-xr"
      xmlns:nc="urn:ietf:params:xml:ns:netconf:base:1.0" refcounter="2" backpointer="[
304 ─── /ncs:services/l2vpn:l2vpn-p2p[l2vpn:vpn-id='xyz'] ]">
        <id>0/0/0/3</id>
306 ───  <description>to sain-ce-1</description>
308 ───  <mtu refcounter="1">4010</mtu>
        ⎧ <ipv4>
        ⎪   <address>
        ⎪     <ip>192.0.2.3</ip>
310 ⎨       <mask>255.255.255.252</mask>
        ⎪   </address>
        ⎩ </ipv4>
        ⎧ <ipv6>
        ⎪   <address>
        ⎪     <prefix-list>
312 ⎨        <prefix>2001:db8::1:1:0:b</prefix>
        ⎪     </prefix-list>
        ⎪   </address>
        ⎩ </ipv6>
        <cdp/>
       </GigabitEthernet>
```

402 — At path rpc-reply/data/devices/device[sain-pe-2]/config/policy-map[xyz-IN]:
<policy-map xmlns="http://tail-f.com/ned/cisco-ios-xr"
xmlns:nc="urn:ietf:params:xml:ns:netconf:base:1.0" refcounter="1" backpointer="[
406 — /ncs:services/l2vpn:l2vpn-p2p[l2vpn:vpn-id='xyz'] ]">
  <name>xyz-IN</name>
  <class>
   <class-default refcounter="1" backpointer="[ /ncs:services/l2vpn:l2vpn-p2p[l2vpn:vpn-id='xyz'] ]">
408 —   <map>class-default</map>

410 {
    <police-rate-unit>
     <police>
      <rate>
       <cir refcounter="1">10</cir>
       <cir-unit refcounter="1">mbps</cir-unit>
      </rate>
     </police>
    </police-rate-unit>

<set>
     <mpls>
      <experimental>
       <imposition refcounter="1">5</imposition>
      </experimental>
     </mpls>
    </set>
   </class-default>
  </class>
</policy-map>

502 {
At path rpc-reply/data/devices/device[sain-pe-2]/config/l2vpn:
<l2vpn xmlns="http://tail-f.com/ned/cisco-ios-xr"
xmlns:nc="urn:ietf:params:xml:ns:netconf:base:1.0" refcounter="1" backpointer="[
/ncs:services/l2vpn:l2vpn-p2p[l2vpn:vpn-id='xyz'] ]">

504 {
  <xconnect>
    <group refcounter="1" backpointer="[ /ncs:services/l2vpn:l2vpn-p2p[l2vpn:vpn-id='xyz'] ]">
      <name>l2vpn</name>
      <p2p refcounter="1" backpointer="[ /ncs:services/l2vpn:l2vpn-p2p[l2vpn:vpn-id='xyz'] ]">
        <name>P2P_xyz</name>
        <interface refcounter="1" backpointer="[ /ncs:services/l2vpn:l2vpn-p2p[l2vpn:vpn-id='xyz'] ]">
          <name>GigabitEthernet0/0/0/2.600</name>  — 506
        </interface>
        <neighbor refcounter="1" backpointer="[ /ncs:services/l2vpn:l2vpn-p2p[l2vpn:vpn-id='xyz'] ]">
          <address>192.0.2.17</address>  — 508
          <pw-id>11000</pw-id>
          <ip-version refcounter="1">ipv4</ip-version>
          <pw-class refcounter="1">SAIN_PW_CLASS</pw-class>
        </neighbor>
      </p2p>
    </group>
  </xconnect>
</l2vpn>

☐ Main page
☐ Symptoms
☐ Top 10 issues l2vpn-p2p services status

| Selected | Name | | Status |
|---|---|---|---|
| ☐ | l2vpn-p2p | Customer A | Degraded (0.5) |
| ☐ | l2vpn-p2p | Customer B | Degraded (0.5) |

⎬ 1102 agents-health services status

| Selected | Name | Status |
|---|---|---|
| ☐ | agents-health instance | Healthy (1.0) |

⎬ 1104 sain-tunnel services status

| Selected | Name | | Status |
|---|---|---|---|
| ☐ | sain-tunnel | Customer C | Degraded (0.5) |
| ☐ | sain-tunnel | Customer D | Degraded (0.5) |

⎬ 1106 sain-tunnel-ipv6 services status

| Selected | Name | | Status |
|---|---|---|---|
| ☐ | sain-tunnel-ipv6 | Customer E | Degraded (0.5) |

⎬ 1108 custom_service services status

| Selected | Name | Status |
|---|---|---|
| ☐ | custom_service instance | Degraded (0.5) |

SERVICE HEATMAP-BASED TELEMETRY FEEDBACK LOOP

TECHNICAL FIELD

The present disclosure relates to assurance of services enabled on networks.

BACKGROUND

A compulsory step for intent-based networking involves closing a loop with telemetry for service assurance. Discovering whether a service fulfills its service level agreement (SLA) is relatively easy when monitoring synthetic traffic mimicking the service. However, such an over-the-top mechanism only provides SLA compliance results that considers a network on which the service is enabled as a "black box," without knowledge of inner workings or low-level components of the service. Therefore, a network operator tasked with the monitoring of the service has limited or no insights on which specific degraded or faulty network components/features are responsible for service degradation. This issue is particularly difficult when the network is composed of heterogeneous network components. Telemetry exists today to report operational information, but an issue arises in that telemetry from network devices in the network does not provide service context information. Hence, troubleshooting the service based on the telemetry is very complex, with, on one side, the service information, and on another side, network device-specific telemetry information. In the event that the network operator discovers that a service is underperforming, e.g., is not fulfilling its SLA, it may be near impossible for the network operator to identify in an efficient manner which low-level components of the service are responsible for such underperformance. The inability to identify efficiently the problematic low-level components hampers efforts to make repairs at the component-level in order to restore acceptable performance to the service.

Modern network devices, and networks that employ the network devices, produce and stream large volumes of operational network data, both model-driven and event-driven data. Currently, the network operators use tools to consume the large volumes of data to derive meaningful results from the data. The primary challenge is how to collect only the relevant data and convert the same into useful business outcomes in an efficient manner. The network may provide device data (e.g., interface statistics) or service data (e.g., network layer statistics) at a very granular level. Thus, enabling network devices to stream all of the available data is not a viable approach, as it suffers serious scalability and efficiency issues. The network operators are faced with challenging questions, such as what data should be collected, from where in the networks should the data be collected, and how frequently should the data be collected.

BRIEF DESCRIPTION OF THE DRAWINGS

FIG. 3 is an illustration of service configuration information for a first network device and an interface on the first network device for a specific service, according to an example embodiment.

FIG. 4 is an illustration of service configuration information for a second network device and an interface on the second network device for the specific service, according to an example embodiment.

FIG. 5 is an illustration of service configuration information for a first cross-connect (xconnect) associated with the second network device for the specific service, according to an example embodiment.

FIG. 11 is an illustration of UI generated for display by the assurance collectors based on an analysis of service-tagged subservice metrics for multiple services, according to an example embodiment.

DESCRIPTION OF EXAMPLE EMBODIMENTS

Overview

A method is performed at one or more entities that configure, and provide assurance for, services enabled on a network. Services are configured on a network, and infrastructure definitions are generated. The infrastructure definitions define one or more network topologies configured on the network to implement the service. A service definition of the service is decomposed into a subservice dependency graph to indicate a collection of subservices and dependencies between the subservices that collectively implement a respective one of the services. Based on the subservice dependency graph and the one or more network topologies defined by the infrastructure definitions, infrastructure elements configured in the network to implement the service are determined. A heatmap is generated. The heatmap maps the service against the infrastructure elements. The heatmap indicates, for the infrastructure elements, respective measures of criticality in a range from a high criticality to a low criticality.

Example Embodiments

Service Assurance for Intent-Based Networking (SAIN)

Figure 1A:
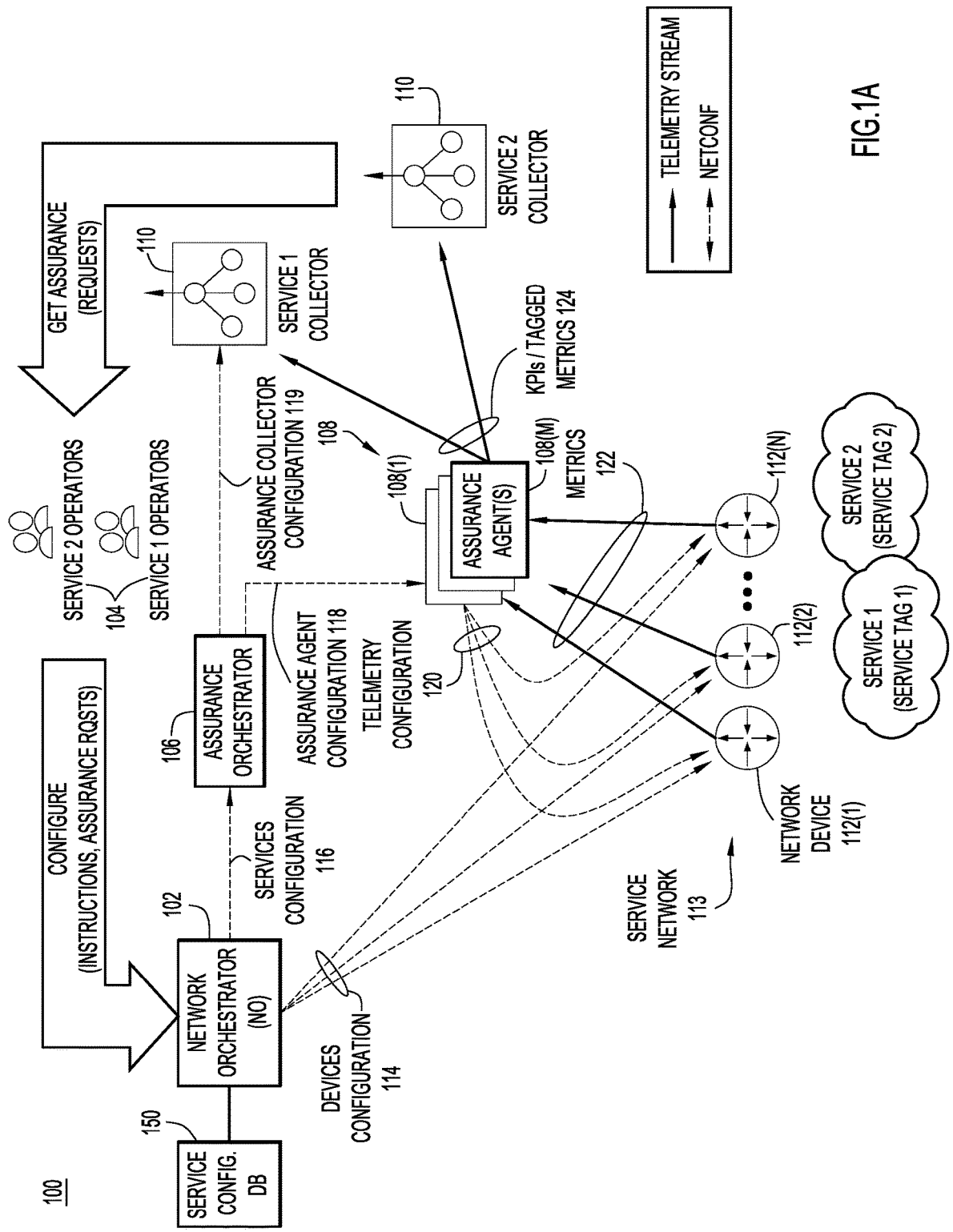
FIG. 1A is a block diagram of a network service assurance system or architecture (also referred to as a "service assurance system"), according to an example embodiment.

With reference to FIG. 1A, there is a block diagram of an example network service assurance system or architecture 100 (also referred to herein as a "service assurance system" 100). Service assurance system 100 may provide service assurance for intent-based networking (SAIN), for example. The service assurance system 100 leverages programming capabilities of network devices in the intent-based network (also referred to as a "service network" or simply a "network"), and model/event driven metrics in telemetry obtained from the network devices, to deliver end-to-end service assurance for various services. Service assurance system 100 includes a network orchestrator (NO) 102 (also referred to as a "service orchestrator 102"), service operators 104 to provide instructions to the network orchestrator 102, an assurance orchestrator 106 that communicates with the network orchestrator 102, assurance agents 108(1)-108(M) (collectively, "assurance agents" 108) that communicate with the assurance orchestrator 106, assurance collectors 110 that communicate with the assurance agents 108 and the service operators 104, and network devices 112(1)-112(N) (collectively, "network devices" 112) that communicate with the network orchestrator 102 and the assurance collectors 110. Network orchestrator 102 configures network devices 112(1)-112(N) to implement an intent-based service network 113 enabled to provide a variety of services to end users. Network devices 112 may include routers, switches, gateways, and other network devices (physical or virtual). Assurance orchestrator 106, assurance agents 108, and assurance collectors 110 are generally referred to as one or more "assurance entities" (or simply "entities") configured to provide assurance for services on a network.

Network orchestrator 102 may include applications and/or services hosted on one or more server devices (more simply referred to as servers), for example, in a cloud-based data center. Assurance orchestrator 106 may also include applications and/or services hosted on one or more server devices, which may be the same as or different from the servers used by network orchestrator 102. Similarly, assurance collectors 110 may also include applications and/or services hosted on one or more servers, which may be the same as or different from the servers used by assurance orchestrator 106. In an embodiment, assurance collectors 110 are applications integrated into assurance orchestrator 106. Assurance agents 108(1)-108(N) may each include applications and/or services hosted on one or more servers, and may be distributed geographically to be near respective ones of network devices 112(1)-112(N) enabled for services to be monitored under control of the assurance agents. Network orchestrator 102, assurance orchestrator 106, assurance agents 108, assurance collectors 110, and network devices 112 may communicate with each other over one or more communication networks, including one or more wide area networks (WANs), such as the Internet, and one or more local area networks (LANs).

In the example of FIG. 1A, service assurance system 100 supports multiple services, including service 1 and service 2 (collectively, "the services"). To this end, service operators 104 include a service 1 operator for service 1 and a service 2 operator for service 2, and assurance collectors 110 include a service 1 collector for service 1 and a service 2 collector for service 2. Service operators 104 (e.g., service 1 operator and service 2 operator) provide to network orchestrator 102 network and service intent-based instructions to setup/configure the services (e.g., service 1 and service 2) for end users. Service operators 104 also receive requests for assurance (e.g., "get assurance" requests) for the services from assurance collectors 110 (e.g., service 1 collector and service 2 collector), and forward the requests to network orchestrator 102.

Network Orchestrator

Responsive to the aforementioned instructions and the requests sent by service operators 104, network orchestrator 102 derives and sends to network devices 112 intent-based network device configuration information 114 to configure the network devices/service network 113 for the services (e.g., for service 1 and service 2). In addition, network orchestrator 102 derives and sends to assurance orchestrator 106 service configuration information 116 for providing assurance for the services (e.g., service 1 and service 2) enabled on service network 113. Service configuration information 116 includes, for each service deployed or implemented on service network 113, respectively, a definition of the service, including a service type (e.g., a type of network connectivity), a service instance (e.g., an identifier or name of the service), and configuration information that describes how the service is actually implemented of service network 113. That is, the definition of the configuration of the service is reflective of how the service is instantiated as a collection of the subservices in service network 113.

For network device configuration information 114, network orchestrator 102 may employ, for example, the Network Configuration Protocol (NETCONF) (or, similarly, Representational State Transfer (REST) Configuration (RESTCONF)) in a NETCONF compliant session to push intent-based network device configuration objects, such as Yet Another Next Generation (YANG) models or objects, to network devices 112. Similarly, for services configuration information 116, network orchestrator 102 may also employ, for example, NETCONF to push intent-based service configuration YANG objects to assurance orchestrator 106. YANG is a data modeling language used to define data sent over a NETCONF compliant network to configure resources. NETCONF is used to install, manipulate, and delete configurations of the resources, while YANG is used to model both configuration and state data of the resources. YANG models/objects used to implement embodiments presented herein may include YANG models/objects extended to include service-specific metadata annotations in accordance with RFC 7952, for example, or any other format that may be the subject of a future standard. More generally, network orchestrator 102 may employ client-server sessions to configure network devices 112, in which case the network orchestrator may operate as a client and the network devices may operate as servers.

Network orchestrator 102 configures a wide range of different subservices on one or more of network devices 112 to enable/support each of the services on service network 113. To do this, network orchestrator (i) generates subservice configuration information that includes network device configuration commands/instructions and associated configuration parameters for the subservices to be configured, and (ii) pushes the subservice configuration information to network devices 112 in network device configuration information 114, as mentioned above. Network orchestrator 102 also provides the subservice configuration information to assurance orchestrator 106 in service configuration information 116, as mentioned above.

Figure 1B:
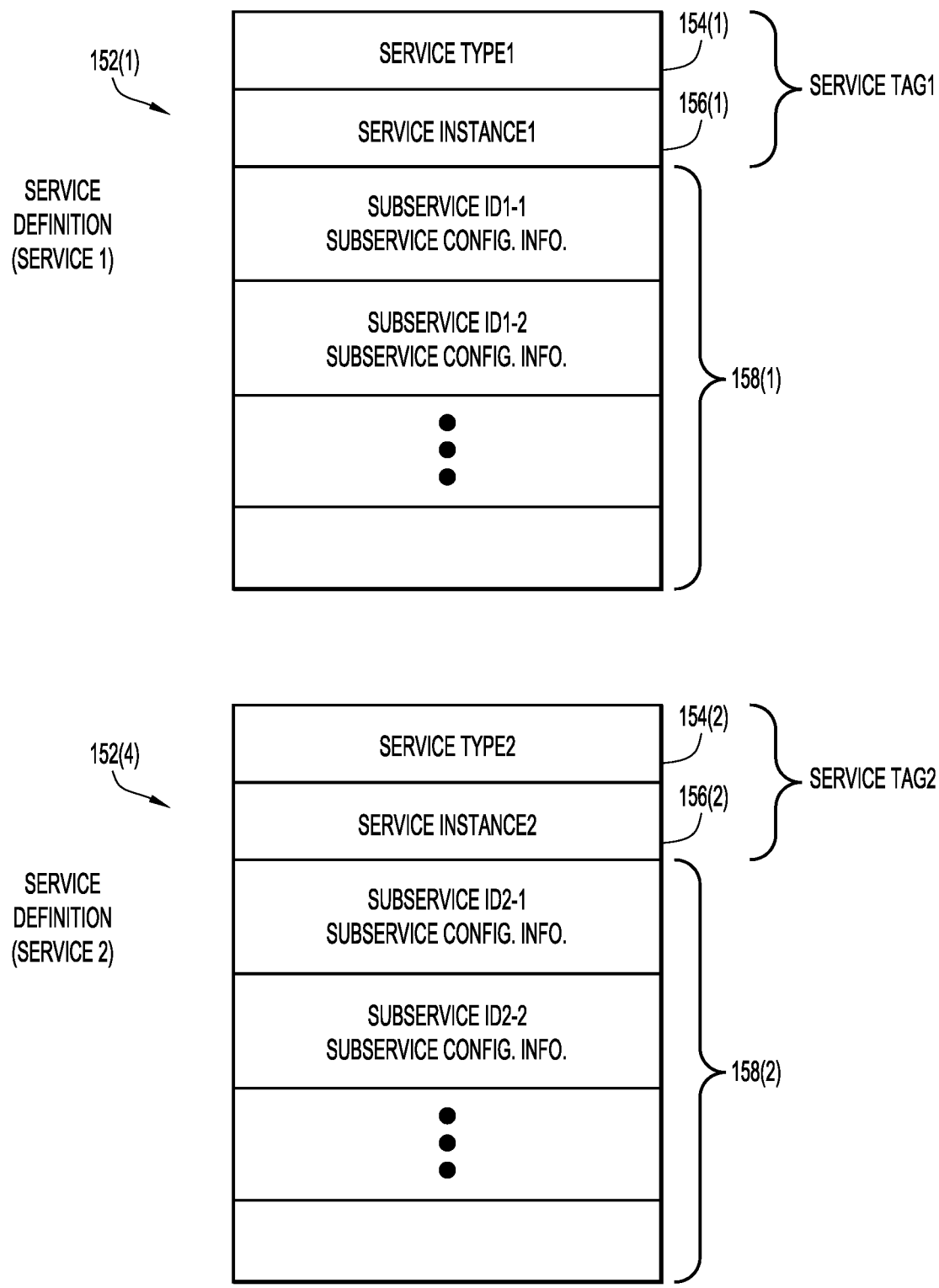
FIG. 1B is an illustration of a service configuration database in the network assurance system, according to an example embodiment.

Network orchestrator 102 stores in a service configuration database (DB) 150 a definition of each of the services that the network service orchestrator configures on service network 113. In an example, service configuration database 150 may be hosted on network orchestrator 102. With reference to FIG. 1B, there is an illustration of an example of service configuration database 150. In the example of FIG. 1B, service configuration database 150 stores definitions 152(1) and 152(2) (also referred to as "service definitions") for service 1 and service 2, from FIG. 1A. Each definition 152(i) may be similar to or the same as the definition of a service described above. Each definition 152(i) may include a service type 154(i) and a service instance 156(i) for the service to which the service definition pertains, and configuration information 158(i) that describes how that service is actually implemented/configured on service network 113. More specifically, configuration information 158(i) for a given service includes, for each of the subservices of the given service, a respective subservice identifier (ID) (e.g., subservice IDI-1, subservice IDI-2, and so on), and respective subservice configuration information (e.g., specific operations and/or intent-based network device configuration objects used to configure that subservice on a network device). Network orchestrator 102 may use a service type, a service instance, and a subservice identifier of a subservice as indexes into service configuration database 150 to search for and find respective subservice configuration information for the subservice.

Non-limiting examples of subservices that network orchestrator 102 may configure include layer 1 (L1), layer 2 (L2), and layer 3 (L3) connections/interfaces, packet routing protocols, logical network overlays such as equal-cost multi-path routing (ECMP), and subservices related to traffic shaping. Non-limiting examples of operations employed by network orchestrator 102 to configure the aforementioned example subservices, on a network device among network devices 112, are provided below.

To configure an L1 connection/interface:
 a. Enter L1 interface configuration mode.
 b. Configure on the network device components and interface parameters, including hardware parameters, memory buffers, optical transmit power, and optical encoding/modulation employed by optical interfaces on the network device.
 c. Exit the L1 interface configuration mode.

To configure an L2 connection/interface:
 a. Select a type of interface (i.e., L2, virtual LAN (VLAN), port-channel).
 b. Enter L2 interface configuration mode.
 c. Assign a media access control (MAC) address, a maximum transmission unit (MTU), and an L2 Quality-of-Service (QoS) classification (referred to simply as "QoS").
 d. Enable the L2 interface (no shutdown/enable L2 interface command).
 e. Exit the L2 interface configuration mode.

To configure an L3 connection/interface:
a. Select a type of interface (i.e., L3).
b. Enter L3 interface configuration mode.
c. Assign an Internet Protocol (IP) address, an L3 MTU, and an L3 QoS.
d. Enable the L3 interface (no shutdown/enable L3 interface command).
e. Exit the L3 interface configuration mode.

To configure a packet routing protocol (e.g., Intermediate System to Intermediate System (IS-IS)):
a. Check for pre-requirements of the packet routing protocol:
   i. IP address configured on at least one interface.
   ii. IP routing process running for an address family (e.g., IPv4, IPv6).
b. Enter interface configuration mode for packet routing protocol.
c. Select a routing protocol (e.g., IS-IS) and start a routing protocol process on the network device (e.g., router Routing Information Protocol (RIP), router Open Shortest Path First (OSPF)).
d. Assign interfaces to include routing advertisements (selects IP networks for the advertisements).
e. Assign an IP address, an L3 MTU, and an L3 QoS.
f. Exit the interface configuration mode.

To configure ECMP:
a. Identify parallel links or parallel multi-paths and associated network device interfaces for ECMP.
b. Enter ECMP configuration mode.
c. Enter interface or routing configuration mode
   i. Configure equal costs among interfaces identified in step (a) (e.g., configure Routing Information Base (RIB), Forwarding Information Base (FIB) accordingly).
d. Exit the ECMP configuration mode.

To configure traffic shaping as its own subservice or as a sub-component of another subservice, e.g., an interface:
a. Identify classes of network traffic (e.g., policy-map/class-map).
b. Define shaping, specifying peak/average of traffic, and bursting profile.
c. Enter interface (or permanent virtual circuit (PVC)) configuration mode.
d. Applying the above-defined shaping to an interface.
e. Exit interface configuration.

The subservices and operations to configure the subservices listed above are provided by way of example, only, and may be modified and/or expanded to include additional subservices and operations, as would be appreciated by one of ordinary skill in the relevant arts having read the present specification.

Assurance Orchestrator

Returning to FIG. 1A, assurance orchestrator 106 operates as a central controller for assurance of the services deployed on service network 113. That is, assurance orchestrator 106 employs "service awareness" to control assurance for the services deployed on service network 113. In this role, assurance orchestrator 106 performs several main operations. First, assurance orchestrator 106 generates, from the service type and the service instance in the definition of each service defined in service configuration information 116, a unique service tag for the service. In an example, the service tag for a given service may be a tuple that includes the service type and the service instance from the definition of the given service. The service tag may be used to distinguish the service to which it pertains from all other services.

Second, assurance orchestrator 106 decomposes the definition of each service defined in service configuration information 116 into a respective subservice dependency graph of subservices and dependencies/interdependencies between the subservices that collectively (actually) implement the service on a network. That is, assurance orchestrator 106 dissects each service into the respective subservice dependency graph. The subservice dependency graph includes (subservice) nodes that represent the subservices and links between the nodes that represent the dependencies between the subservices. The subservice dependency graph may include the service type and the service instance (e.g., the service tag) for the service represented by the subservice dependency graph. To assist with the aforementioned decomposition, assurance orchestrator 106 may poll or query various network devices identified in the definition to discover subservices, such as packet routing protocols, implemented on the network devices and that are to be incorporated into the subservice dependency graph.

In a non-limiting embodiment, the subservice dependency graph includes a subservice dependency tree having a root node that represents the services, and nodes that represent the subservices and that have parent-child relationships (i.e., the dependencies) between the nodes/subservices that lead back to the root node. An example of a subservice dependency tree is described below in connection with FIG. 6. Other types of graph constructs/data structures may be used to represent the subservice dependency graph, as would be appreciated by one of ordinary skill in the art having read the present specification.

Third, assurance orchestrator 106 derives from each subservice dependency graph a respective set of heuristic packages for the service described by the subservice dependency graph. The heuristic packages (i) specify/define service-related metrics (i.e., subservice metrics) to be monitored/recorded and reported by the subservices, and that are indicative of health statuses/states of the subservices, i.e., that are indicators of health states of the subservices, (ii) include rules to determine/compute key performance (KPIs) including the health states of the subservices (also referred to individually as a "subservice health state," and collectively as "subservice health states") based on the subservice metrics as recorded and reported, and (iii) which sensor paths (i.e., telemetry paths) are to be enabled for reporting telemetry, i.e., to report the subservice metrics recorded by the subservices from the subservices. The heuristic packages may also include or be associated with the service tag for the service to which the heuristic packages correspond. Assurance orchestrator 106 employs the heuristic packages to configure assurance agents 108 to monitor the subservices of the services, and to compute the health states of the subservices based on the monitoring, as described below.

Fourth, assurance orchestrator 106 provides to assurance agents 108 assurance agent configuration information 118 including the heuristic packages and their corresponding service tags in association with each other. Assurance orchestrator 106 may employ NETCONF to push the heuristic packages as YANG objects to assurance agents 108. Assurance orchestrator 106 may also provide the subservice dependency graphs to assurance collectors 110 in assurance collector configuration information 119.

Assurance Agents

Assurance agents 108 act as intermediary assurance devices between network devices 112, assurance collectors 110, and assurance orchestrator 106. More specifically, assurance agents 108 translate assurance agent configuration information 118, including the heuristic packages, to telemetry configuration information 120, and provide the telemetry configuration information to network devices 112, to configure the network devices 112 to record and report the subservice metrics mentioned above. For example, assurance agents 108 generate monitoring objects that define the subservice metrics to be recorded and reported by the subservices, and provide the monitoring objects to the subservices in telemetry configuration information 120, to configure the subservices to record and report the subservice metrics. Assurance agents 108 may maintain associations/bindings or mappings between the heuristic packages, the monitoring objects generated by the heuristic packages, and the services (e.g., service tags) to which the heuristic packages and the monitoring objects pertain. Assurance agents 108 may employ NETCONF (or RESTCONF), for example, to push YANG-modeled objects for purposes of monitoring (also referred to as "YANG monitoring objects") to network devices 112.

In response to receiving the monitoring objects in telemetry configuration information 120, network devices 112 record the subservice metrics specified in the monitoring objects, and report the subservice metrics (labeled as "metrics" 122 in FIG. 1A) back to assurance agents 108 in telemetry streams. In an example, the telemetry streams carry subservice metrics 122 in telemetry objects corresponding to the monitoring objects, as described below in connection with FIG. 2B. In turn, assurance agents 108 tag subservice metrics 122 with service tags to indicate which of the subservice metrics are associated with/belong to which of the services, to produce service-tagged subservice metrics 124 (labeled "tagged metrics" in FIG. 1A). In other words, assurance agents 108 apply the service tags to the subservice metrics for the services to which the service tags belong. In the example in which subservice metrics 122 are carried in telemetry objects, assurance agents 108 tag the telemetry objects with the service tag to produce service-tagged telemetry objects). Thus, the service tags provide service context to the subservice metrics.

In one embodiment, assurance agents 108 do not perform any specific analysis on the subservice metrics, leaving such analysis to assurance collectors 110 and/or assurance orchestrator 106. In another embodiment, assurance agents 108 perform analysis on subservice metrics 122 as instructed by the heuristic packages, to produce health states of the subservices (e.g., KPIs used as indicators of health states of the subservices) to which the subservice metrics pertain. Assurance agents 108 provide to assurance collectors 110 service-tagged subservice metrics 124, along with health states of the subservices when computed by the assurance agents. For example, assurance agents 108 provide flows of service-tagged subservice metrics tagged with service tag 1 to indicate service 1 to service 1 collector, and service-tagged subservice metrics tagged with service tag 2 to indicate service 2 to service 2 collector. Assurance agents 108 may also provide service-tagged subservice metrics 124 to assurance orchestrator 106.

Assurance Collectors

Assurance collectors 110 receive/collect service-tagged subservice metrics 124, and health states of the subservices when available, from assurance agents 108 for various services, as uniquely identified by the service tags with which the subservice metrics are tagged. Assurance collectors 110 associate service-tagged subservice metrics 124 with respective ones of the various services based on the service tags. Assurance collectors 110 determine a respective overall health state of each service based on the health states of the subservices of the service, as indicated by the service-tagged subservice metrics and their KPIs/health states. When assurance agents 108 do not provide to assurance collectors 110 health states of the subservices along with service-tagged subservice metrics 124, assurance collectors 110 compute the health states of the subservices from the service-tagged subservice metrics 124 as instructed by corresponding ones of the heuristic packages (e.g., by the heuristic packages tagged with the same service tag as the subservice metrics).

NETCONF/YANG (Object-Based) Implementation in Assurance System

Figure 2A:
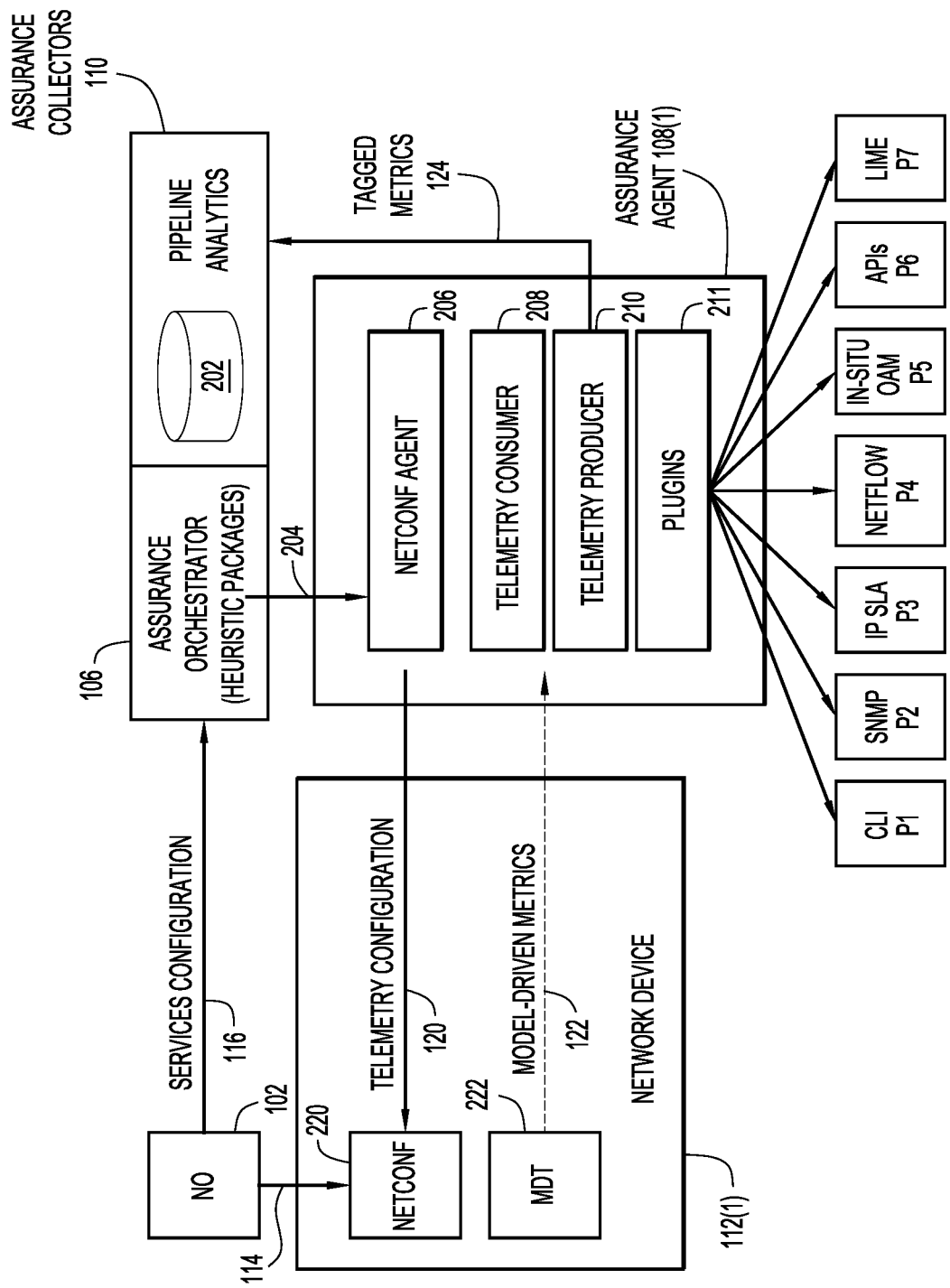
FIG. 2A is a block diagram that shows additional details of an assurance orchestrator, a representative assurance agent, and a representative network device of the service assurance system, according to an example embodiment.

With reference to FIG. 2A, there is a block diagram that shows additional details of assurance orchestrator 106, assurance collectors 110, a representative assurance agent (e.g., assurance agent 108(1)), and a representative network device (e.g., network device 112(1)) from FIG. 1A. Assurance collector 110 includes pipeline analytics 202 to analyze service-tagged subservice metrics 124 including the KPIs (if any) from assurance agents 108, to determine health states of the subservices and then service health states based on the health states of the subservices.

Assurance agent 108(1) includes a NETCONF agent 206, a telemetry consumer 208, a telemetry producer 210, and plugins 211. Plugins 211 provide various functional capabilities to assurance agent 108(1) to assist with tasks/operations performed by the assurance agent, including communicating with entities external to the assurance agent. Examples of plugins 211 include, but are not limited to, one or more of the following: a command line interface (CLI) plugin P1; a Simple Network Management Protocol (SNMP) plugin P2; an IP service-level agreement (SLA) plugin P3; a NetFlow™ protocol plugin to communicate with NetFlow-enabled network devices P4; an in-situ operations, administration, and maintenance (IOAM) plugin P5 to provide real-time telemetry of individual data packets and flows; application programming interfaces (APIs) P6; and Layer Independent OAM Management in the Multi-Layer Environment (LIME) P7.

NETCONF agent 206 digests heuristic packages 204 sent by assurance orchestrator 106. NETCONF agent 206 generates monitoring objects (in telemetry configuration information 120) as network device configuration YANG objects based on the heuristic packages, and pushes the monitoring objects to network device 112(1) to configure the network device for model-driven telemetry (MDT) used to report recorded subservice metrics. NETCONF agent 206 may include in the monitoring objects respective identifiers of the subservices to which the monitoring objects pertain (e.g., an identifier of network device 112(1), since the network device is a subservice), and the service tag for the service to which the subservice pertains. Telemetry consumer 208 receives from network device 112(1) subservice metrics 122 recorded in (model-driven) telemetry objects corresponding to the monitoring objects. The telemetry objects include the subservice metrics, the identifier of the subservice (e.g., the identifier of network device 112(1)) to which the subservice metrics pertain, and may also include the service tag copied from the corresponding monitoring object. Telemetry consumer 208 passes the (received) telemetry objects to telemetry producer 210. Telemetry producer 210 tags the (received) telemetry objects with service tags, as mentioned above, and sends resulting service-tagged telemetry objects (representing service-tagged subservice metrics 124) to assurance pipeline analytics 202 of assurance collectors 110, and optionally to assurance orchestrator 106. Telemetry producer 210 may also copy into the service-tagged telemetry objects any KPIs/health states of subservices computed by assurance agent 108(1) in the embodiment in which the assurance agent computes that information.

Network device 112(1) includes a NETCONF agent 220 and an MDT producer 222. NETCONF agent 220 receives network device configuration information 114 from network orchestrator 102 and configures subservice(s) on network device 112(1) based on the network device configuration information. NETCONF agent 220 also receives the monitoring objects from NETCONF agent 206, and configures the network device, including MDT producer 222, based on the monitoring objects. MDT producer 222, records its local subservice metrics and its subservice identifier in telemetry objects as instructed by the monitoring objects, and may optionally include the corresponding service tags in the telemetry objects, and reports the telemetry objects to telemetry consumer 208.

Distributed Assurance System

Figure 2B:
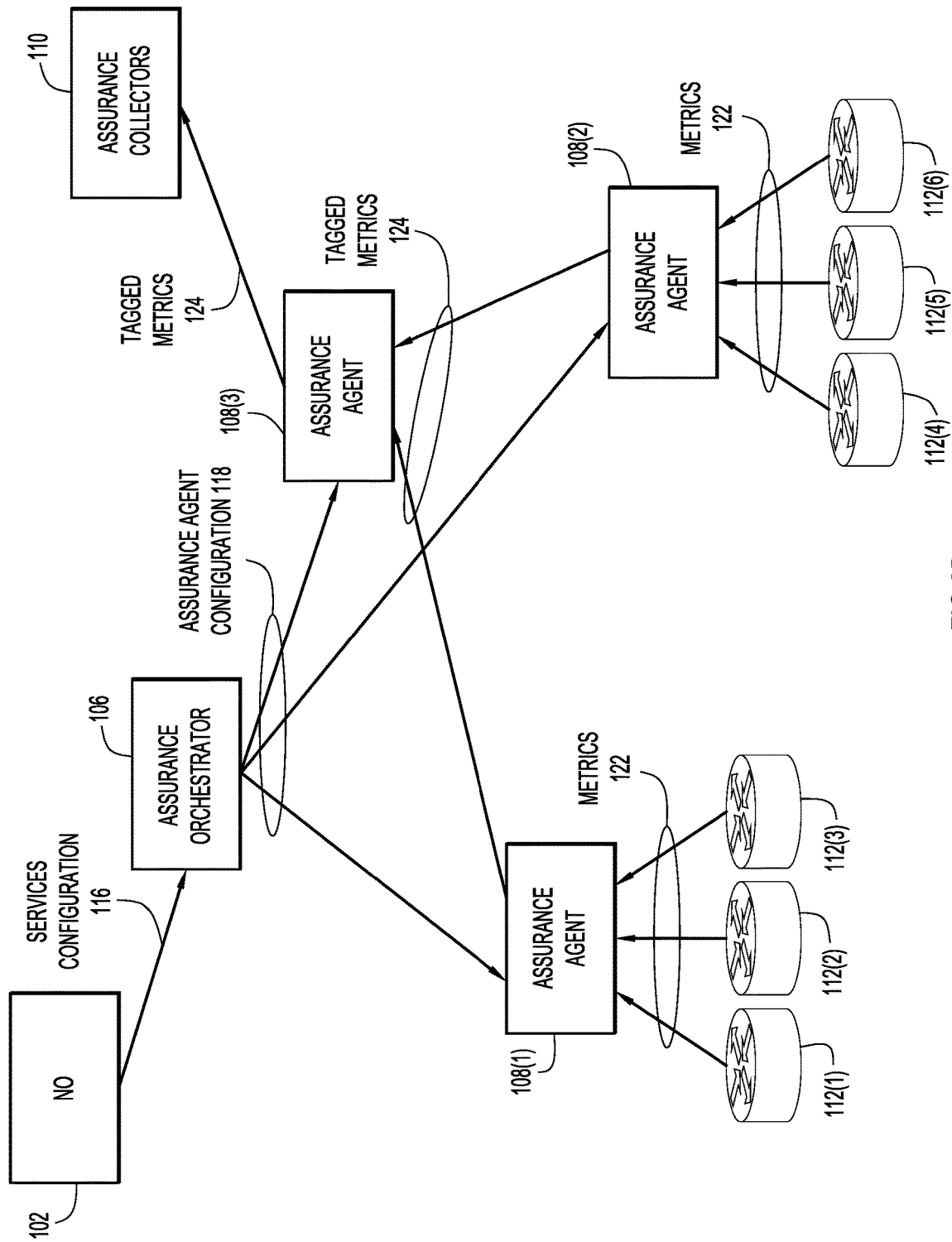
FIG. 2B is a block diagram that shows a distributed arrangement of assurance agents and network devices of the service assurance system, according to an example embodiment.

With reference to FIG. 2B there is a block diagram that shows an example of a distributed arrangement of assurance agents 108 and network devices 112 of service assurance system 100. In the example of FIG. 2B, assurance agent 108(1) is co-located with network devices 112(1)-112(3) at a first geographical location and assurance agent 108(2) is co-located with network devices 112(4)-112(6) at a second geographical location separated from the first geographical location. Service 1 (see FIG. 1A) may be implemented on network devices 112(1)-112(3), and Service 2 may be implemented on network devices 112(4)-112(6). Geographically distributed assurance agents 108(1) and 108(2) report their service-tagged telemetry objects to centralized assurance agent 108(3), which forwards the service-tagged subservice metrics to assurance collector 110.

Examples of service configuration information 116 for a service instance "xyz" (e.g., for a customer xyz) of service type L2 virtual private network (VPN) L2VPN, which is a peer-to-peer (p2p) connectivity type (i.e., L2VPN-p2p), are now described with reference to FIGS. 3-5. In FIGS. 3-5, the example service configuration information is represented as eXtensible Markup Language (XML) encoding of YANG models.

Service Configuration Information/Definition Examples

With reference to FIG. 3, there is an illustration of first example service configuration information 300 for a first network device and an interface of service instance xyz. More specifically, lines 302 introduce a "GigabitEthernet" interface for/on a first provider edge (PE) network device "sain-pe-1" (e.g., a router) for service instance xyz of type "l2vpn" indicated at line 304. As indicated at lines 302, first network device sain-pe-1 is running an XR operating system, by Cisco. Line 306 provides an identifier "0/0/0/3" for the GigabitEthernet interface. Line 308 defines a maximum transmission unit (MTU) for the interface. Groups of lines 310 and 312 define parameters for IPv4 and IPv6 addresses configured on the interface.

With reference to FIG. 4, there is an illustration of second example service configuration information 400 for a second network device of service instance xyz. More specifically, lines 402 introduce a second PE network device "sain-pe-2" (e.g., a router) for service instance xyz of type "l2vpn" indicated at line 406. Line 408 defines a QoS classification, as default, for traffic handled by the network device sain-pe-2. Alternatively, or additionally, service configuration information 400 may define a Quality-of-Experience (QoE) classification. Lines 410 define a policy rate for network device sain-pe-2.

With reference to FIG. 5, there is an illustration of third example service configuration information 500 for a first cross-connect ("xconnect") associated with second network device sain-pe-2 for service instance xyz. An "xconnect" is a L2 pseudowire (L2 PW) used to create L2 VPNs (L2VPNs). Examples of xconnects are provided at https://www.amazon.com/Layer-VPN-Architectures-Networking-Technology-ebook/dp/B0051TM5BM, authored by C. Pignataro. In the present context of service assurance, "xconnect" refers to a syntax of a command used to realize the pseudowire in, for example, a Cisco internetwork operating system (IOS)-XR/IOS-XE operating system.

Lines 502 associate second network device sain-pe-2 with service instance xyz. Lines 504 define the first xconnect, which is associated with a GigabitEthernet subinterface 0/0/0/2.600 at line 506 and with an IPv4 address 192.0.2.17 at line 508.

Subservice Dependency Graph Example

Figure 6:
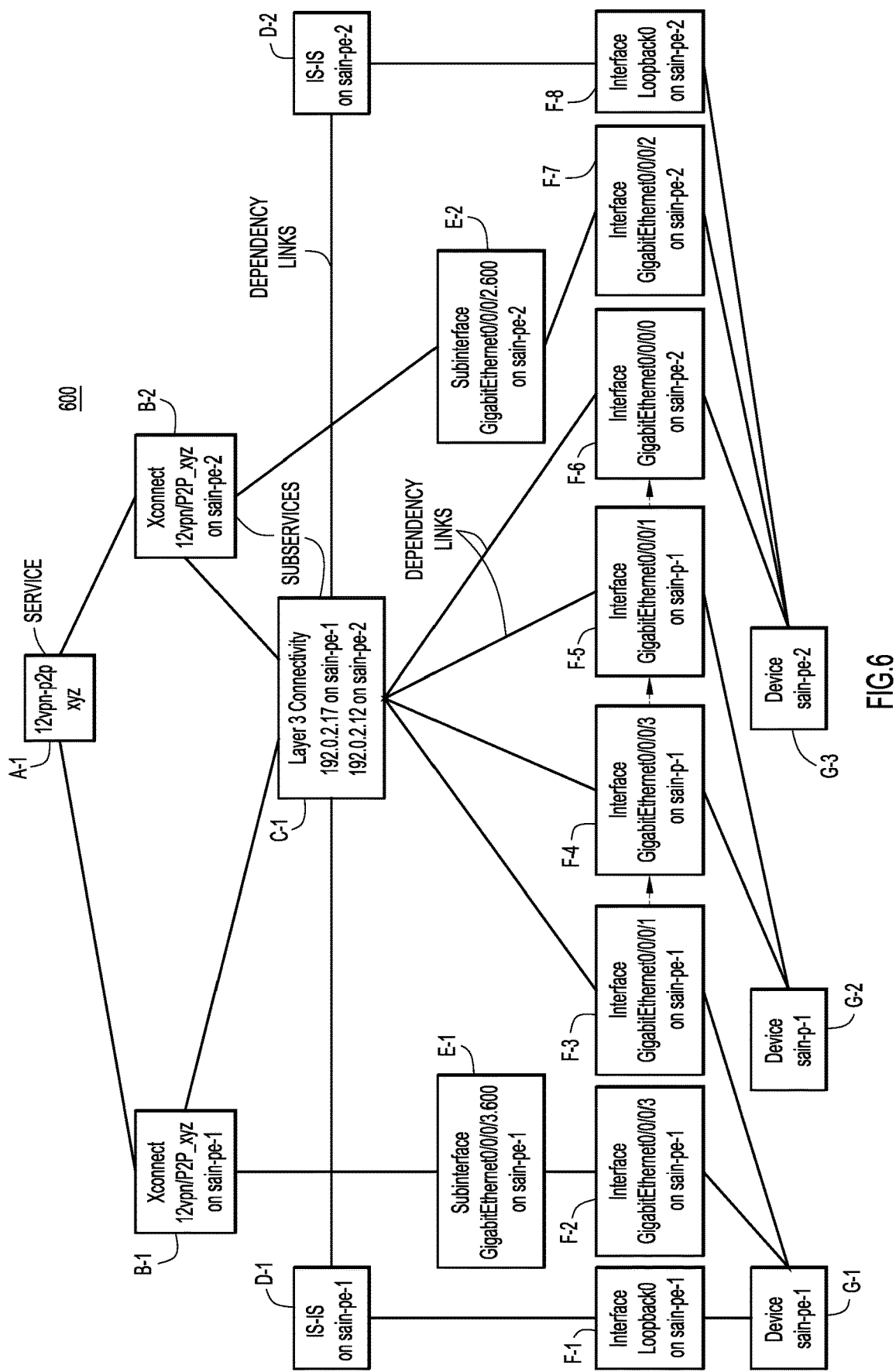
FIG. 6 is an illustration of a subservice dependency graph, in an example form of a subservice dependency tree, for a service, according to an example embodiment.

With reference to FIG. 6, there is an illustration of an example subservice dependency graph in the form of a subservice dependency tree 600 for service L2VPN-p2p, meaning an L2 VPN for a peer-to-peer connection. Subservice dependency tree 600 (or "tree" for short) includes a service node A-1 at a highest level of the tree. Service node A-1 identifies/represents the service by a service tag tuple that includes service type and service instance, e.g., tuple <service type, service instance>. In the example of FIG. 6, service node A-1 represents service <L2VPN-p2p, xyz>. Lower levels of tree 600 are populated with subservice nodes (shown as boxes) that identify/represent respective subservices of the service <L2VPN-p2p, xyz>, and that connect back to service node A-1 through subservice dependencies or parent-child links (shown as lines connecting boxes that depend on each other). Each of the subservice nodes includes an identifier (e.g., a plain text identifier, as depicted in FIG. 6) of the subservice represented by that subservice nodes. In the example of FIG. 6, the lower levels of tree 600 include:

a. A second level that includes subservice nodes B-1 and B-2 for xconnect subservices implemented on network devices sain-pe-1 and sain-pe-2;

b. A third level that includes a subservice node C-1 for an L3 network connectivity subservice with components on network devices sain-pe-1 and sain-pe-2.

c. A fourth level that includes subservice nodes D-1 and D-2 for routing protocol subservices (e.g., IS-IS) on network devices sain-pe-1 and sain-pe-2.

d. A fifth level that includes subservice nodes E-1 and E-2 for subinterface subservices on network devices sain-pe-1 and sain-pe-2.

e. A sixth level that includes subservice nodes F-1-F-8 for interface subservices on network devices sain-pe-1 or sain-pe-2, as indicated.

f. A seventh level that includes subservice nodes G-1-G3 for network devices sain-pe-1 and sain-pe-2 as subservices as indicated.

In one example branch of subservice dependency tree 600, service <L2VPN-p2p, xyz> depends on the subservice of subservice node B-1, which depends on the subservice of subservice node E-1, which depends on the subservice of subservice node F-2, and so on down the levels of the tree. As indicated by the subservice links, a given subservice may depend on multiple other subservices. Traversing the levels of tree 600 downward from the highest level to the lowest level of the tree, the subservices of service <L2VPN-p2p, xyz> include network xconnects on network devices (e.g., on sain-pe-1 and sain-pe-2), L3 network connectivity on the network devices (L2 network connectivity on the network devices may also be a subservice), routing protocols on the network devices, interfaces of the network devices, subinterfaces of the network devices, and the network devices themselves.

Generally, the subservices include: xconnects on network devices; L1 (e.g., optical), L2, and L3 network connectivity on the network devices; routing protocols on the network devices; interfaces of the network devices; subinterfaces of the network devices; communication behavior of the interfaces and the subinterfaces; the network devices themselves and operations performed on/by the network devices. Subservices also include logical network functions and groupings of logical and physical elements, such as: ECMP/ECMP groups of network devices; network tunnels; link protection functions executing in a network; network device protection functions executing in a network; and logical overlays on a physical network.

Logical overlays may include: link aggregation for a link aggregation group (LAG); Virtual Extensible (Vx) LAN (VxLAN); VxLAN-Generic Protocol Extension (GPE); Generic Routing Encapsulation (GRE); service function chaining (SFC) functionality including Network Service Header (NSH) implementation; and Multiprotocol Label Switching (MPLS); for example. The subservices may also include applications such as application categorization as per RFC 6759. The subservices may also include one or more multicast subnets on network devices.

Heuristic Packages

Examples heuristic packages are now described in connection with FIGS. 7-9.

Figure 7:
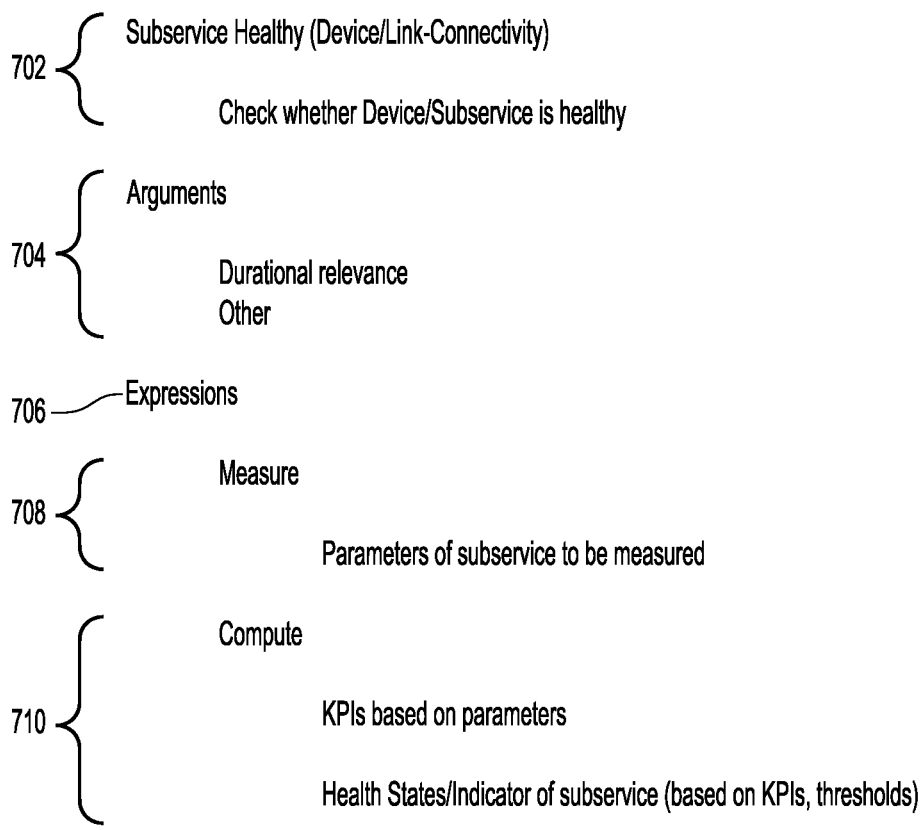
FIG. 7 is an illustration of a generalized heuristic package generated based on a subservice dependency graph, according to an example embodiment.

With reference to FIG. 7, there is an illustration of an example generalized heuristic package 700 generated based on a subservice dependency graph. Heuristic package 700 includes a header 702 that identifies a subservice of the subservice dependency graph that is targeted by the heuristic package, and an overall function for which the heuristic package is to be used. For example, header 702 may identify any specific one of xconnect, L3 connectivity, routing protocol, subinterface, interface, or network device, and the header may specify that the heuristic package is to be used to determine a health of the indicated subservice.

Heuristic package 700 may include arguments 704, which indicate various conditions under which the heuristic package is to be used, such as a time duration over which the subservice is to be monitored. Heuristic package 700 also includes expressions 706, which include measure 708 and compute 710. Measure 708 specifies subservice metrics of the subservice that are to be recorded. For example, for a network device subservice, the subservice metrics may include central processor unit (CPU) usage, free memory, temperature, power, and the like. For an interface of the network device, the subservice metrics may include traffic rate, and so on. Compute 710 provides rules and/or instructions to compute KPIs based on the subservice metrics, and instructions to determine a health state for the subservice, such as thresholds against which computed values are to be compared to determine the health state.

Compute 710 may include rules to compute a health state that is binary, i.e., a health state that indicates either a passing health state when the subservice is operating properly (e.g., meets a desired performance level) or a failing health state (which is a degraded health state) when the subservice is not operating properly (e.g., does not meet the desired performance level). Alternatively, the rules may compute a health state that is graded, i.e., a health state that indicates a health state within a range of possible health states from passing to failing, e.g., including a passing health state, a failing health state, and a degraded health state that is not a passing health state or a failing health state (in this case, degraded means between passing and failing). In an example, the health states may include the following computed health state values: failing=0, 0<degraded<1, passing=1.

Figure 8:
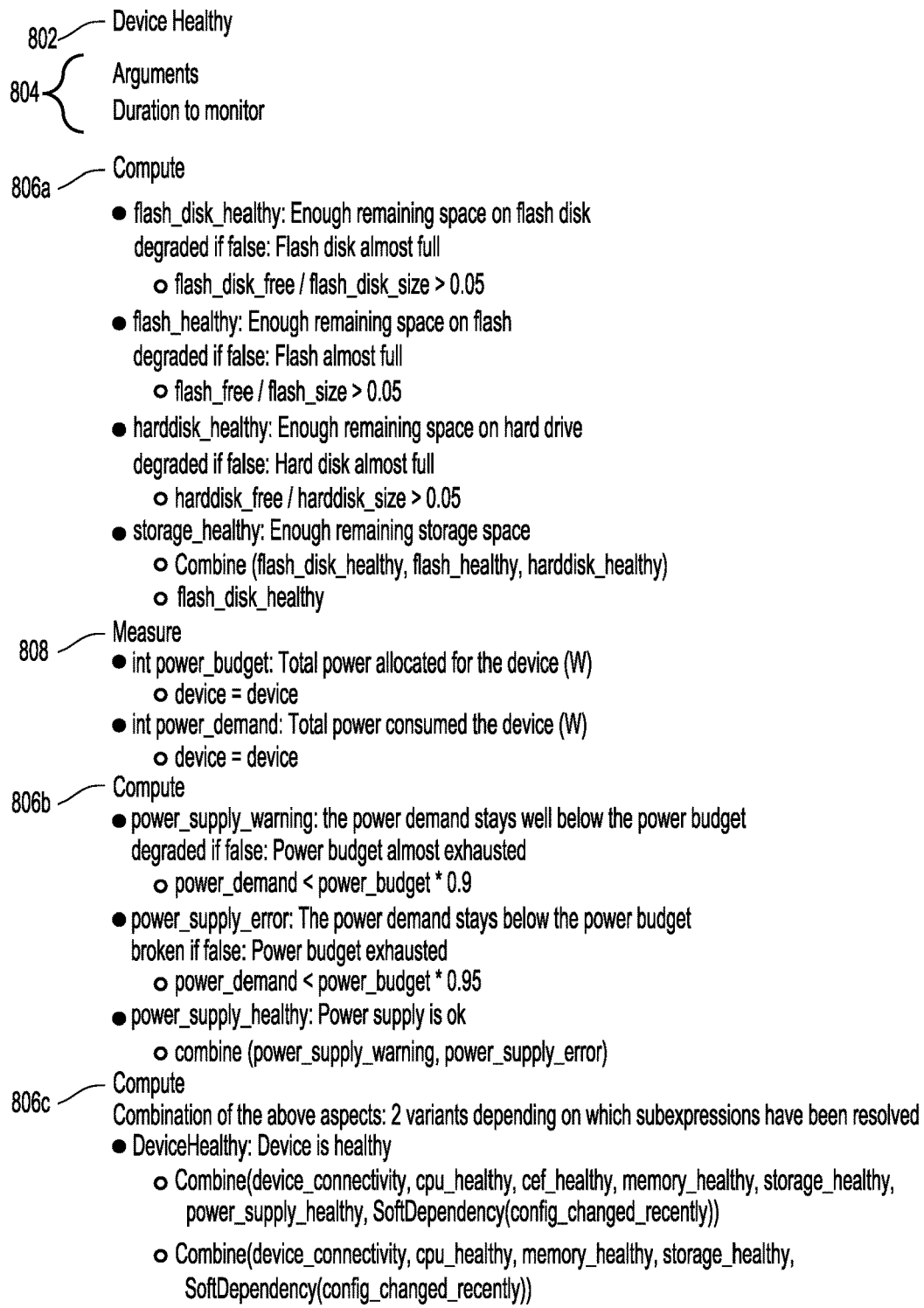
FIG. 8 is an illustration of a heuristic package for a network device used by a service, according to an example embodiment.

With reference to FIG. 8, there is an illustration of an example heuristic package 800 for a network device subservice. Heuristic package 800 includes header 802 and arguments 804. Heuristic package 800 includes compute 806a to compute health indicators (KPIs) for a flash disk, flash, a hard disk, and storage, generally. For example, compute 806a includes rules to set the health state to indicate a degraded health state if memory of a flash disk is full, and further rules to evaluate the following Boolean operation: flash_disk_free/flash_disk_size>0.05, and so on. Heuristic package 800 includes measure 808 that lists power metrics to be measured (e.g., power demand), and compute 806b to compute health states based on the power metrics. Heuristic package 800 also includes compute 806c to compute an overall health state (KPI) for the network device based on values computed in prior computes 806a and 806b. That is, compute 806c defines a rule expression to evaluate the overall health state of the subservice based on the subservice metrics and the computed (intermediate) values mentioned above.

Figure 9:
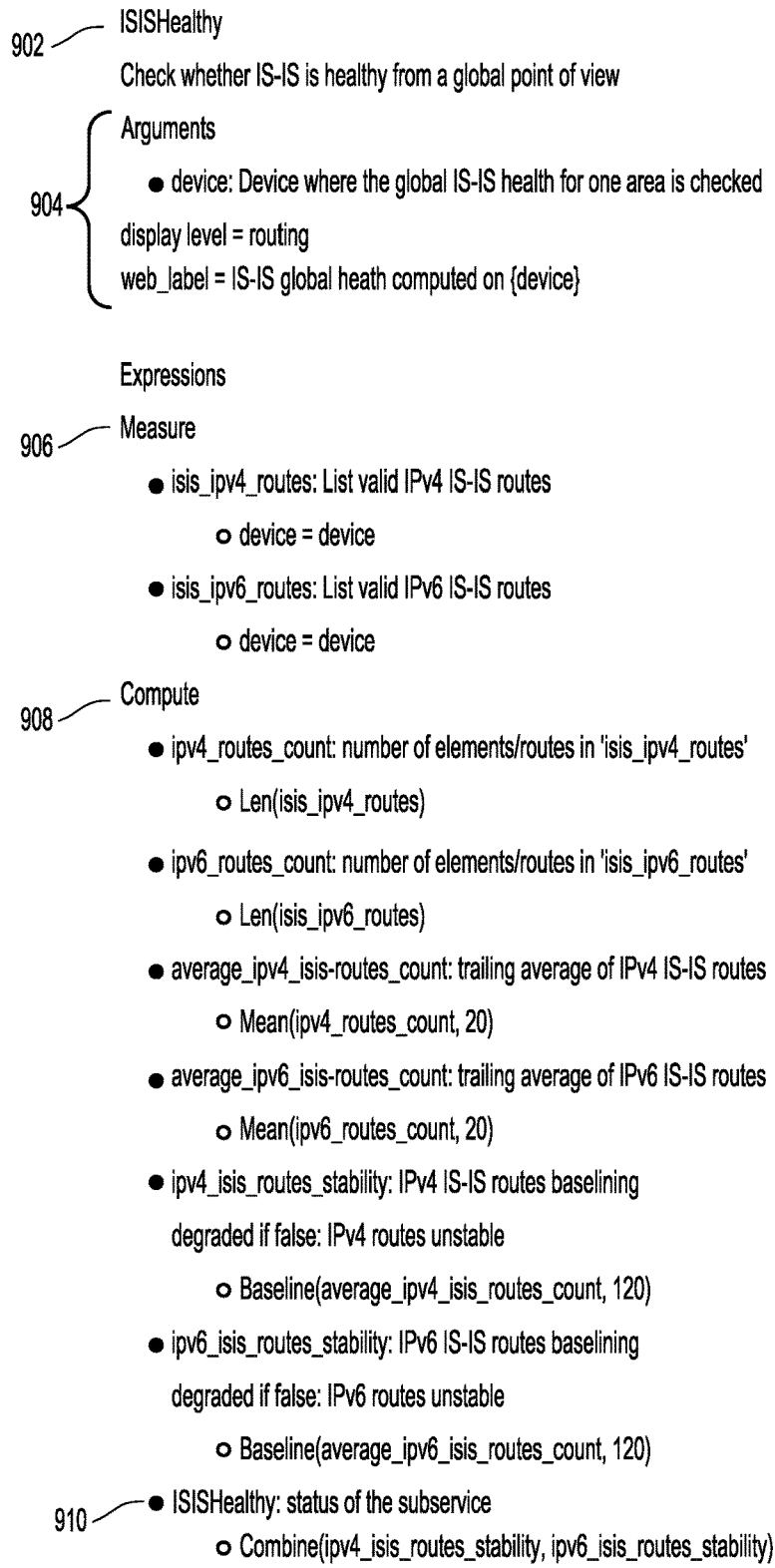
FIG. 9 is an illustration of a heuristic package for a network protocol implemented on a network device used for the service, according to an example embodiment.

With reference to FIG. 9, there is an illustration of an example heuristic package 900 for a network protocol (e.g., IS-IS) subservice implemented on a network device. Heuristic package 900 includes header 902 and arguments 904. Heuristic package 900 includes measure 906 to measure metrics associated with IS-IS, including to determine lists of valid IPv4 and IPv6 IS-IS routes on the network device (e.g., from a forwarding or routing table in the network device). Heuristic package 900 includes compute 908 to compute KPIs that include various counts and stabilities of the IPv4 and the IPv6 IS-IS routes based on the metrics from measure 906, and to compute an overall health state 910, which is also a KPI, for IS-IS based on previously computed values/KPIs.

Assurance Collector Operations and User Interfaces

Further operations of assurance collectors 110 are now described in connection with FIGS. 10 and 11, and with reference again to FIG. 1A. As mentioned above, assurance collectors 110 receive/collect service-tagged subservice metrics 124 from assurance agents 108 for various services, subservice dependency graphs for the various services, and heuristic packages for the various services. The subservice dependency graphs each includes the service tag for the service to which the subservice dependency graph pertains. The heuristic packages each includes the service tag to which the heuristic package pertains. Assurance collectors 110 associate all service-tagged subservice metrics 124 (and health states of subservices when available) tagged with a given service tag to the subservice dependency graphs that includes the given service tag, and to the heuristic packages that include the given service tag. In other words, assurance collectors 110 associate all service-tagged subservice metrics 124 (and health states of subservices), subservice dependency graphs, and heuristic packages that have a matching (i.e., the same) service tag to each other and to the service identified by that service tag.

For each service, assurance collectors 110 may populate the subservice dependency graph with corresponding health states of the subservices of the subservice dependency graph as represented by the service-tagged subservice metrics. For example, assurance collectors 110 may populate the nodes of a subservice dependency tree for the service with the health states of the subservices represented by the nodes. In an embodiment in which assurance agents 108 provide the health states of the subservices along with the service-tagged subservice metrics to assurance collectors 110, the assurance collectors may populate the subservice dependency tree with the provided health states. Alternatively, assurance collector 110 computes the health states of the subservices from the corresponding service-tagged subservice metrics 124 in accordance with the corresponding heuristic packages, and then populates the subservice dependency tree with the health states as computed.

The resulting subservice dependency graph, populated with health states of the subservices, may be generated for display to an administrator in a graph form (e.g., tree) or otherwise, e.g., as a list of subservices for the service. Also, for each service, assurance collectors 110 may determine an overall health state of the service (also referred to simply as a "health state" of the service) based on the health states of the subservices of the service. For example, if all of the subservices have health states that indicate passing health states, assurance collectors 110 may set the overall health state to indicate a passing overall health state. Alternatively, if the health states of one or more of the subservices indicate failing health states, assurance collectors 110 may set the overall health state to indicate a failing overall health state.

Figure 10:
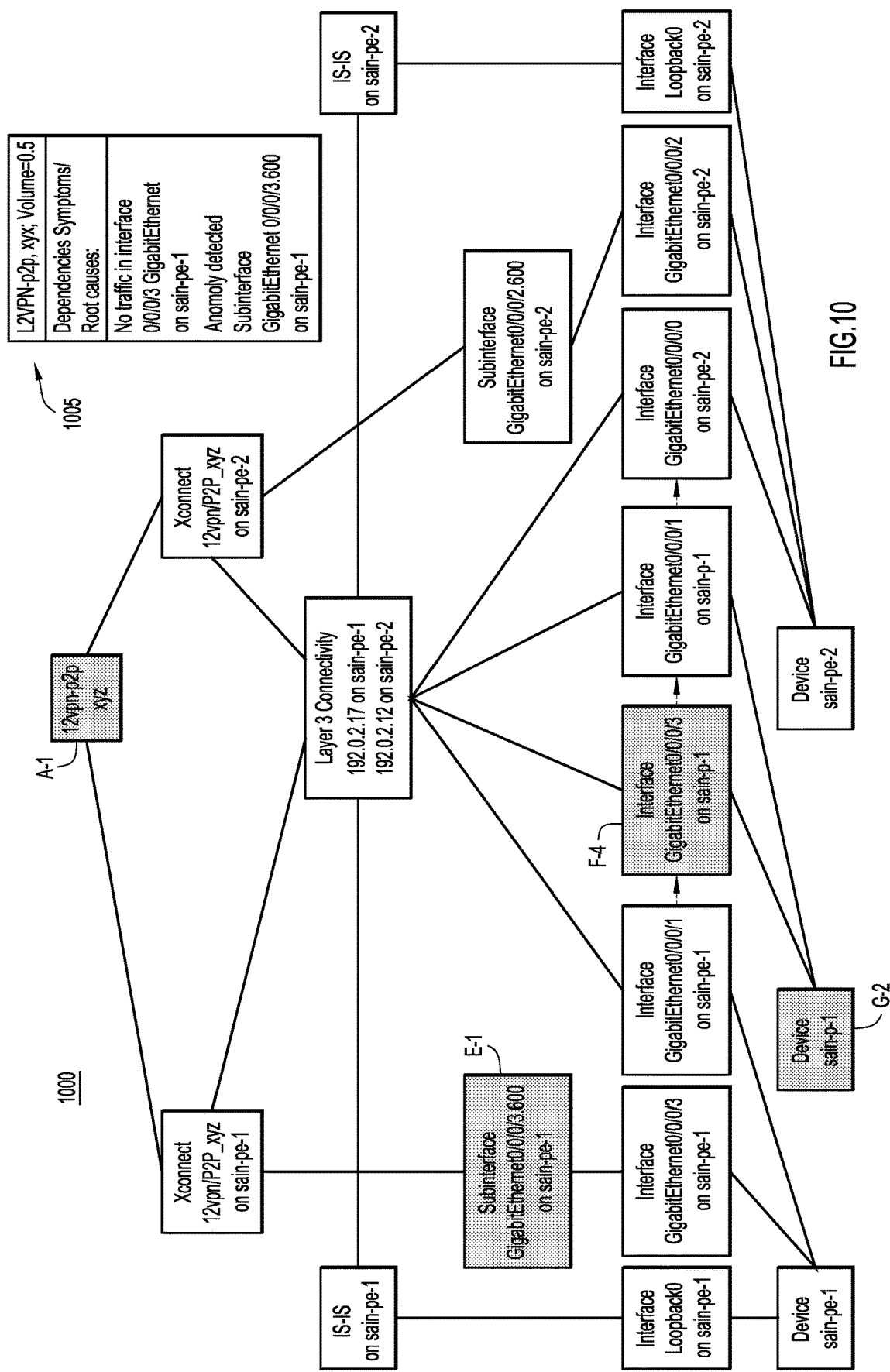
FIG. 10 is an illustration of a user interface (UI) generated for display by assurance collectors of the service assurance system based on an analysis of service-tagged subservice metrics belonging to a specific service, according to an example embodiment.

With reference to FIG. 10, there is an illustration of an example user interface (UI) 1000 generated for display by assurance collectors 110 responsive to collecting and analyzing service-tagged subservice metrics for the service L2VPN-p2p, xyz. UI 1000 includes subservice dependency tree 600 for the service, as described above, but with various subservices highlighted (e.g., with shaded) to indicate degraded health states (which may mean a failing health state or, alternatively, a degraded health state between failing and passing). Specifically, UI 1000 includes shading of subservices identified by subservice nodes E-1, F-4, and G-2, which indicates degraded health states for those subservices, i.e., assurance collectors 110 determined degraded health states of those subservices. Moreover, UI 1000 includes shading of the service L2VPN-p2p, xyz identified by service node A-1, which indicates a degraded overall health state of the service, i.e., assurance collectors 110 determined the degraded overall health state of the service based on the degraded health states of its subservices. In other example, different colors may distinguish passing health states (e.g., green) and degraded health states (e.g., orange).

UI 1000 also includes an information window or panel 1005 that provides health states and diagnostic information for the degraded subservices and the service.

With reference to FIG. 11, there is an there is an illustration of an example user interface (UI) 1100 generated for display by assurance collectors 110 responsive to collecting and analyzing service-tagged subservice metrics for multiple services. UI 1100 includes a panel 1102 that shows health states for two L1VPN-p2p services including service instances Customer A and Customer B, both degraded. UI 1100 includes a panel 1104 that shows health states for assurance agents 108. UI 1100 also includes a panel 1106 that indicates health states for Customer C and Customer D tunnel services, a panel 1108 that indicates a health state for a Customer E IPv6 service, and a panel 1110 that indicates a health state for a customer service.

Monitoring and Service-Tagged Telemetry Objects

Figure 12:
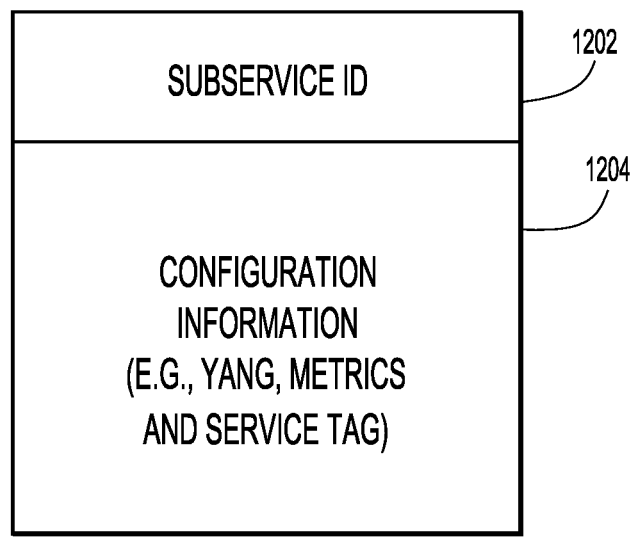
FIG. 12 is an illustration of a monitoring object used to configure a subservice of a service, according to an example embodiment.

With reference to FIG. 12, there is an illustration of an example monitoring object 1200. Monitoring object 1200 includes a subservice identifier (ID) 1202 and configuration information 1204. Configuration information 1204 may include YANG network device configuration information, for example, and identifies subservice metrics to be recorded and reported, in accordance with a heuristic package. Configuration information 1204 may include one or more configuration code snippets to configure a subservice, e.g., a network device, to perform the recording/reporting of the subservice metrics. For example, a heuristic package with instructions to monitor (memory) "space available" for MPLS in a network device running IOS-XR may result in the following command line interface (CLI) code snippet in a monitoring object destined for the network device:

CLIMetric:
    Command: show resource detail,
    regex_type: textfam,
    regex: ios_xr/show_oef_rsource_detail.txt,
    key: "space available"
    filter:
        "node"
        "mpls"
    post_processing: convert2 byte (GetTuple (value, 0), GetTuple (value, 1)

Alternatively, the monitoring object may include a YANG object that performs the same function as the CLI code snippet. Alternative, the monitoring object may include binary information such as a packet.

Monitoring object 1200 may also include a service tag for the service to which the subservice identified by the subservice ID pertains.

Figure 13:
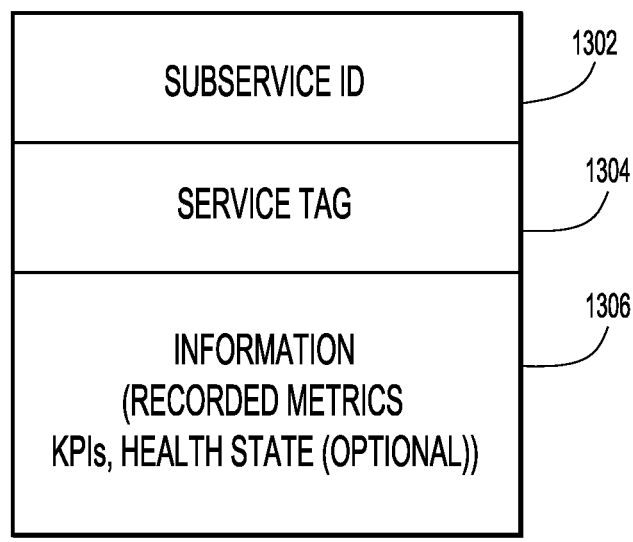
FIG. 13 is an illustration of a service-tagged subservice metrics in a form of a telemetry object corresponding to the monitoring object, according to an example embodiment.

With reference to FIG. 13, there is an illustration of an example service-tagged telemetry object 1300. Service-tagged telemetry object 1300 includes a subservice identifier 1302, a service tag 1304, and information 1306. Information 1306 includes recorded/reported subservice metrics, computed values, and KPIs (including a health state of a subservice) in accordance with a heuristic package from which a corresponding monitoring object was generated.

Service Assurance Operational Flow

Figure 14:
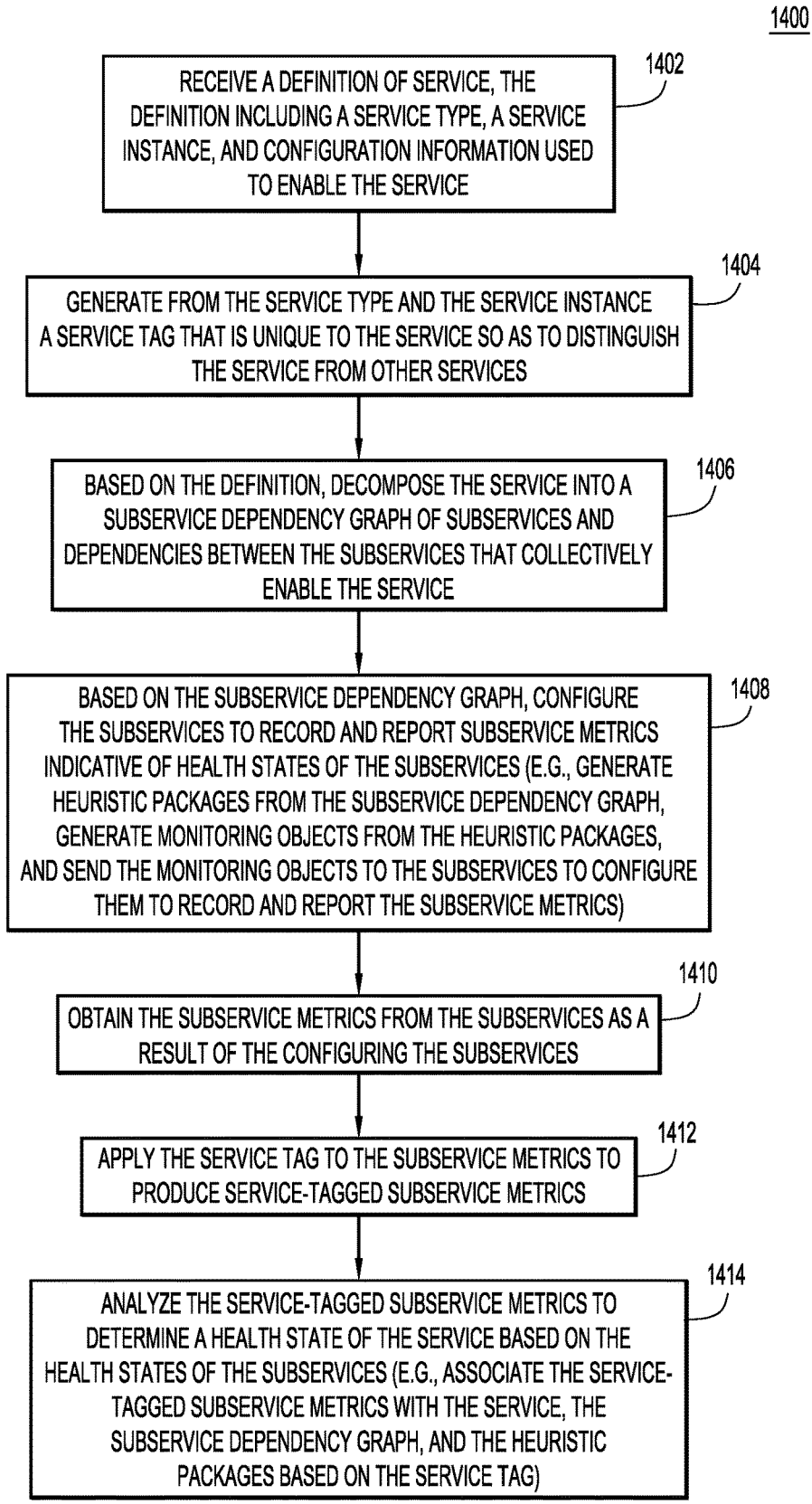
FIG. 14 is a flowchart of a method of performing assurance for a service enabled on a network, according to an example embodiment.

With reference to FIG. 14, there is a flowchart of an example method 1400 of performing assurance for a service enabled on a network. Method 1400 may be performed by a system including one or more entities to provide assurance for the service on the network. The one or more entities may include one or more of assurance orchestrator 106, assurance agents 108, and assurance collectors 110.

At 1402, a definition of a configuration of a service is received, e.g., by assurance orchestrator 106. The definition includes a service type, a service instance, and configuration information used to enable or implement the service in the network.

At 1404, a service tag is generated from the service type and the service instance. For example, assurance orchestrator 106 generates the service tag. The service tag identifies the specific instantiation of the service in the network, and is unique so as to distinguish the service from other services. The service tag may be a tuple that includes the service type and the service instance.

At 1406, based on the configuration information of the definition, the service is decomposed into a graph of subservices and dependencies between the subservices that collectively actually implement the service in the network. The service tag is applied to the subservice dependency graph. For example, assurance orchestrator 106 decomposes the service into the subservice dependency graph, and may provide the subservice dependency graph to assurance collectors 110.

At 1408, the subservices are configured to record and report subservice metrics indicative of health states of the subservices (e.g., a respective health state of each of the subservices) based on the subservice dependency graph. The health states may respectively indicate either a passing health state or a failing health state. Alternatively, the health states may respectively indicate a health state within a range of health states including a passing health state, a failing health state, and a degraded health state that is not a passing health state or a failing health state. Operation 1408 may include the following further operations:

a. Based on the subservice dependency graph, assurance orchestrator 106 generates heuristic packages, typically one per subservice, that specify the subservice metrics that the subservices are to record and report, and include rules to compute the health states of the subservices based on the subservice metrics. Assurance orchestrator 106 provides to assurance agents 108 the heuristic packages and the service tag.

b. Responsive to the heuristic packages, assurance agents 108 generate from the heuristic packages monitoring objects that define the subservice metrics that the subservices are to record and report, and provide the monitoring objects to the subservices to configure the subservices to record and report the subservice metrics.

At 1410, responsive to the configuring of 1408, the subservice metrics are obtained from the subservices. For example, responsive to the monitoring objects, the subservices record and then report to assurance agents 108 the subservice metrics in telemetry objects corresponding to the monitoring objects.

At 1412, the service tag is applied to the subservice metrics to produce service-tagged subservice metrics. For example, assurance agents 108 receive the telemetry objects, insert the service tag into the telemetry objects, and then send the (resulting) service-tagged telemetry objects to assurance collectors 110. Optionally, assurance agents 108 also analyze the subservice metrics to compute health states of the subservices in accordance with the rules in the heuristic packages, and insert the health states into the service-tagged telemetry objects before sending them to assurance collectors 110, which receive the service-tagged telemetry objects.

At 1414, the service-tagged subservice metrics are analyzed to determine a health state of the service. For example, assurance collectors 110 (i) associate the subservice metrics in the service-tagged telemetry objects with the service based of the service-tagged telemetry objects, (ii) analyze the subservice metrics to compute individual health states of the subservices (unless the health states are included with the service-tagged telemetry objects), e.g., one health state per subservice, based on the rules in the heuristic packages, and (iii) determine an overall health state of the service based on the individual health states of the subservices, which were associated with the service based on the service tags at (i). For example, if all of the health states of the subservices indicate passing health states, the overall health state may be set to indicate a passing overall health state. Alternatively, if one or more of the health states of the subservices indicate failing health states, the overall health state may be set to indicate a failing overall health state. Alternatively, if one or more of the health states of the subservices indicate degraded (not failing or passing) health states, and there are no failing health states, the overall health state may be set to indicate a degraded (not failing or passing) overall health state.

In addition, assurance collectors 110 populate indications of the subservices in the subservice dependency graph with their respective health states, and generate for display the populated subservice dependency graph to provide visual feedback. In various embodiments, operations performed by assurance collectors 110 as described above may be shared between the assurance collectors and assurance orchestrator 106. In another embodiment in which assurance collectors 110 are omitted, assurance agents 108 send service-tagged subservice metrics (and health states) directly to assurance orchestrator 106, and the assurance orchestrator performs all of the operations performed by the assurance collectors as described above. That is, assurance orchestrator 106 operates as the assurance orchestrator and assurance collectors 110.

In an environment that includes multiple services, method 1400 is performed for each service, by the one or more entities, to produce, for each service, respectively, a unique service tag, a subservice dependency graph, heuristic packages, monitoring objects, telemetry objects, tagged telemetry objects, health states of subservices, and an overall service health state. The one or more entities use the unique service tags to distinguish between the services and the aforementioned information generated for the services.

Closed Loop Automation for Intent-Based Networking

Closed loop automation for intent-based networking is now described. Closed loop automation for intent-based networking discovers an overall health state of a service comprising a collection of subservices based on health states of the subservices, using techniques described above, for example. If the closed loop automation discovers that the overall health state of the service (also referred to as the "service health state") indicates a failing overall health state, the closed loop automation reconfigures the subservices so that the overall health state indicates a passing overall health state. In other words, the closed loop automation provides feedback to "close the loop" in service assurance system 100 to restore the overall health state of the service to an acceptable, passing overall health state.

Figure 15:
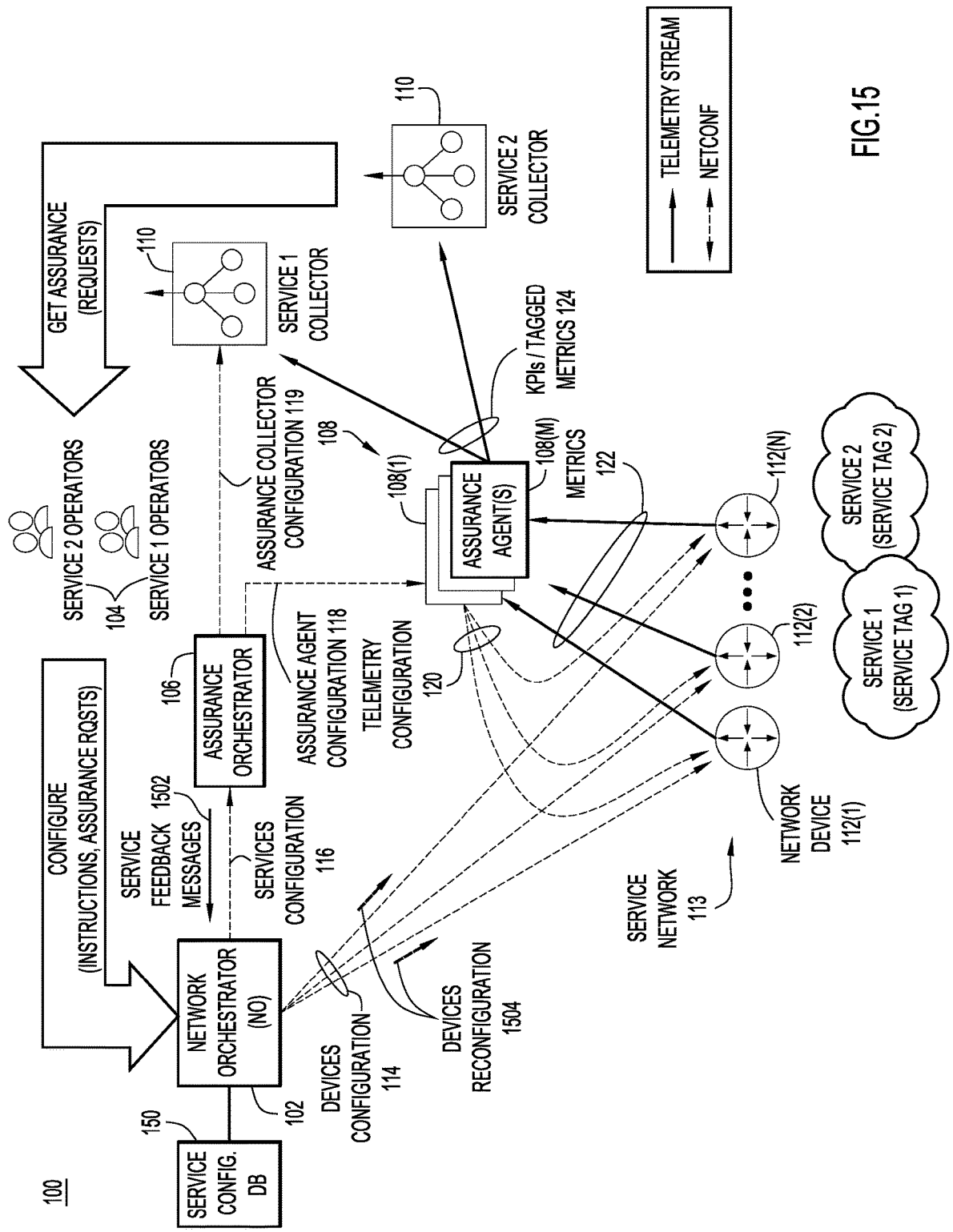
FIG. 15 is a block diagram of the service assurance system adapted to perform closed loop automation for intent-based networking, according to an example embodiment.

With reference to FIG. 15, there is shown a block diagram of service assurance system 100 adapted to perform the closed loop automation. FIG. 15 is similar to FIG. 1A, except that FIG. 15 shows additional flows used for the closed loop automation. For closed loop automation, assurance orchestrator 106 determines an overall health state of each of the services implemented on service network 113, and then provides to network orchestrator 102 service assurance messages 1502 (also referred to as "flow 1502"). Service assurance messages 1502 include the overall health states for the services as determined by assurance orchestrator 106, and may also include health states of subservices for each of the services. Service assurance messages 1502 may also include, for each of the services having an overall health state that indicates a failing (or degraded) overall health state, a corresponding request to reconfigure subservices of that service, so as to return the overall health state to a passing overall health state. The request to reconfigure may also be referred to as a "subservice reconfiguration request."

Responsive to each request to reconfigure subservices of a service received in service assurance messages 1502, network orchestrator 102 reconfigures the subservices of the service, as identified in the request. To reconfigure the subservices, network orchestrator 102 provides subservice reconfiguration information 1504 (also referred to as "flow 1504") to the network devices among network devices 112 that host/implement the subservices to be reconfigured.

Subservice reconfiguration information 1504 may be formatted similarly to network device configuration information 114, and may be provided to network devices 112 similarly to the way in which the network device configuration information is provided to the network devices.

Figure 16:
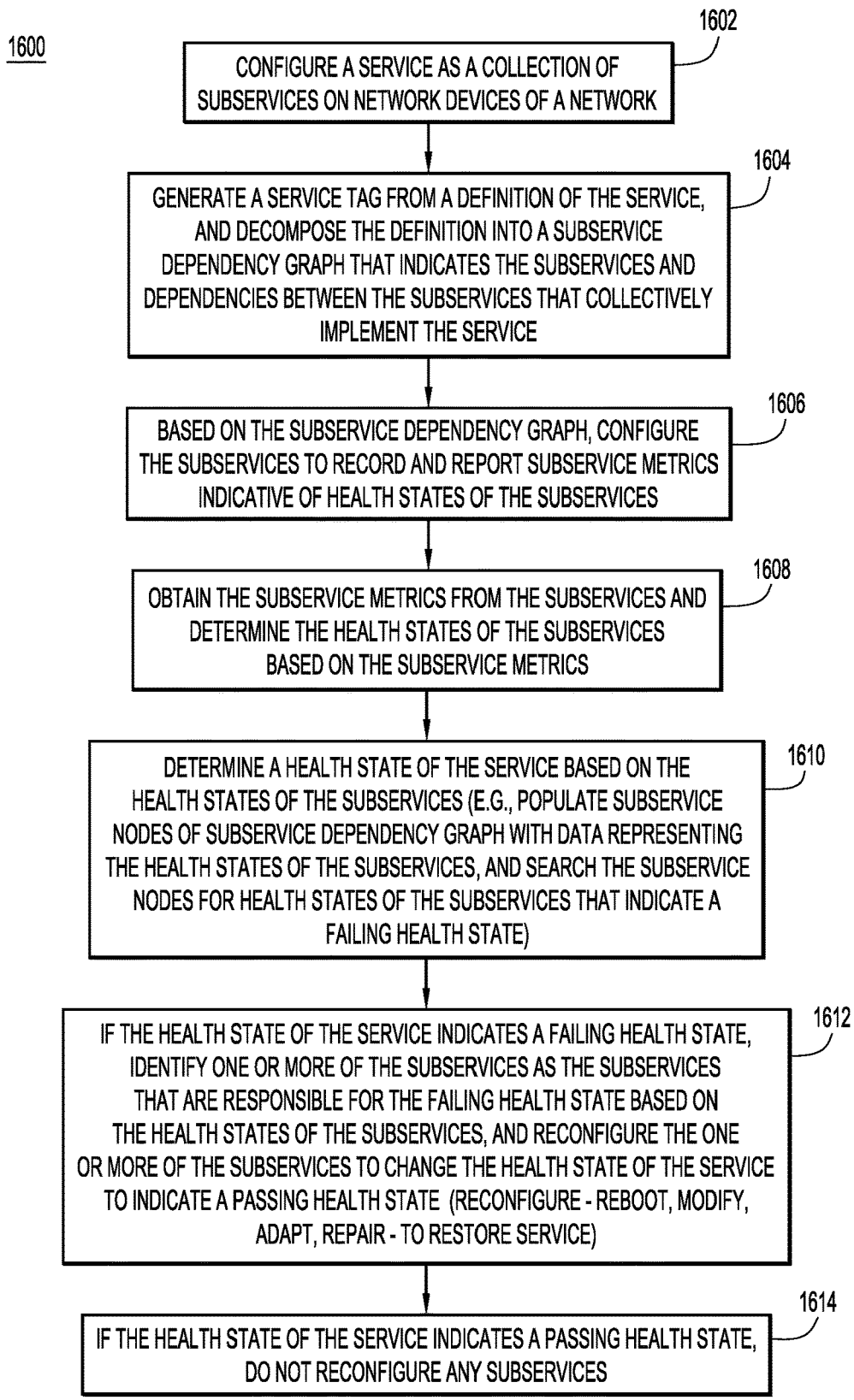
FIG. 16 is a flowchart of a method of closed loop automation for intent-based networking performed by the service assurance system of FIG. 15, according to an example embodiment.

With reference to FIG. 16, there is a flowchart of an example method 1600 of closed loop automation for intent-based networking performed in service assurance system 100, as depicted in FIG. 15, for example. Method 1600 incorporates various operations described above. The terms "health state of a subservice" and "subservice health state" are synonymous and interchangeable.

At 1602, network orchestrator 102 configures a service as a collection of subservices on network devices of a network, stores a definition of the service in service configuration database 150, and provides the definition to assurance orchestrator 106. The definition includes a service type, a service instance, and configuration information, as described above.

At 1604, assurance orchestrator 106 generates a service tag based on the definition of the service, and decomposes the definition into a subservice dependency graph that indicates the subservices and dependencies between the subservices that collectively implement the service. Operation 1604 may include operations 1402-1406 of method 1400.

At 1606, based on the subservice dependency graph, assurance orchestrator 106 and assurance agents 108, collectively, configure the subservices to record and report subservice metrics indicative of health states of the subservices. Operation 1606 may include operation 1408 of method 1400.

At 1608, assurance agents 108 and assurance orchestrator 106, collectively, obtain the subservice metrics from the subservices, tag the subservice metrics with the service tag, and determine the health states of the subservices based on the subservice metrics. Operation 1608 may include operations 1410, 1412, and 1414 of method 1400.

At 1610, assurance orchestrator 106 determines an overall health state of the service based on the health states of the subservices. In an example, assurance orchestrator 106 populates subservice nodes of the subservice dependency graph with data representing respective ones of the health states of the subservices, and searches the subservice nodes for any of the health states of the subservices that indicate a failing health state. Assurance orchestrator 106 may generate for display the subservice dependency graph populated with the data representing the health states of the subservices, as shown in FIG. 10, for example. Operation 1610 may include operation 1414 of method 1400.

At 1612, if the overall health state indicates a failing overall health state, assurance orchestrator 106 identifies one or more of the subservices as the subservices that are responsible for the failing overall health state based on the health states of the subservices. Assurance orchestrator 106 generates one or more service assurance messages that include (i) the identifier of the service (e.g., the service tag), (ii) the overall health state that indicates the failing overall health state, (iii) identifiers and health states of at least the one or more subservices that are responsible for the failing overall health state, and (iv) a request to reconfigure the one or more of the subservices. The one or more service assurance messages may report health states of all of the subservices, not just those of the one or more subservices responsible for the failing overall health state. Assurance orchestrator 106 provides the one or more service assurance messages to network orchestrator 102, as indicated at 1502 of FIG. 15.

Responsive to the one or more service assurance messages, including the request to reconfigure the one or more subservices, network orchestrator 102 reconfigures the one or more subservices. To do this, network orchestrator 102 (i) uses the identifier of the service and the identifiers of the one or more subservices from the one or service assurance messages as indexes to access/retrieve the subservice configuration information for the one or more subservices from the service definition stored in service configuration database 150, (ii) generates subservice reconfiguration information based on the subservice configuration information retrieved from the service definition, and (iii) provides the subservice reconfiguration information to network devices among network devices 112 that host/implement the one or more subservices, as indicated at 1504 of FIG. 15. In response to the subservice reconfiguration information, network devices 112 reconfigure the one or more subservices to implement the requested subservice reconfiguration, thus closing the loop for the closed loop automation process. The entire closed loop automation is performed without manual intervention.

Network orchestrator 102 may reconfigure the one or more subservices in many different ways to improve the overall health state of the service, e.g., to change the overall health state from failing to passing. In one example, network orchestrator 102 may simply repeat the operations used to configure the one or more subservices as performed at 1602, in which case the subservice reconfiguration information may include the same intent-based network device configuration objects that were used to initially configure the one or more subservices at 1602. For example, network orchestrator 102 may repeat the operations described above in connection with FIG. 1B to configure one or more of an L1 connection/interface, an L2 connection/interface, an L3 connection/interface, a packet routing protocol, ECMP, traffic shaping, and so on, as identified in the request to reconfigure.

In another example, network orchestrator 102 may reboot the one or more subservices. To reboot a subservice, network orchestrator 102 may first validate permissions and user authorizations for the subservice as provided in the service definition, force a process that implements the subservice to enter a privileged mode, and then reboot the process or an operating system that hosts the process. Alternatively, network orchestrator 102 may implement a process to perform a network device repair or link repair for critical network devices and/or links associated with the one or more subservices.

In yet another example, network orchestrator 102 may not completely reconfigure the one or more subservices, but rather may adjust/modify selected operational parameters of the one or more subservices (from their initially configured values) to improve their operational performance. This constitutes only a partial or limited reconfiguring of the one or more subservices. For example, for the one or more subservices, network orchestrator 102 may:

a. Adjust routing metrics, such as cost routing.
b. Modify L2 QoS, MTU, or adjust storm control policies (L2).
c. Change optical transmission power or hardcode interface speed (L1).
d. Adjust L3 QoS or MTU (L3).
e. Change ECMP hashing inputs (e.g., use destination IP instead of source IP).

f. Perform traffic shaping by modifying QoS to assure a desired level of traffic throughput.

g. Adjust interface traffic throughput (e.g., bandwidth).

In even further examples, service assurance system 100 may reprogram the level of detail and frequency of telemetry collection per network device in order to investigate in greater detail why the overall health state of the service indicates the failing health state.

At 1614, if the overall health state indicates a passing overall health state, assurance orchestrator 106 generates one or more service assurance messages that include (i) the identifier of the service, (ii) the overall health state that indicates the passing overall health state, and (iii) identifiers and health states of the subservices. The one or more service assurance messages do not include a request to reconfigure subservices. Assurance orchestrator 106 provides the one or more service assurance messages that do not include the request to network orchestrator 102 at 1502. Responsive to the one or more service assurance messages that do not include the request, network orchestrator 102 does not reconfigure any subservices.

Figure 17:
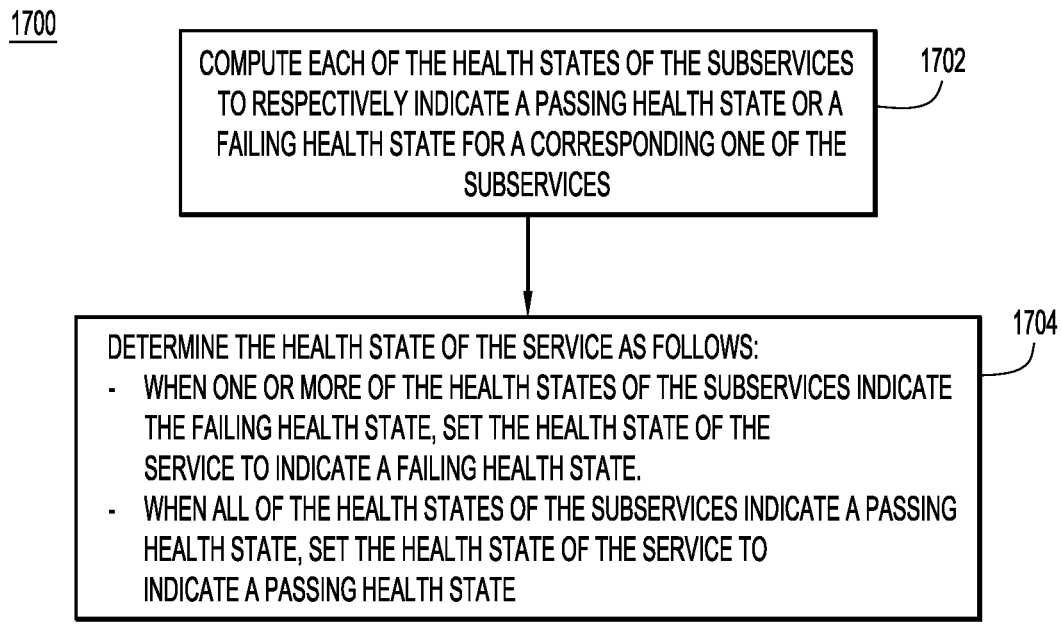
FIG. 17 shows operations expanding on an operation used to determine an overall health state of a service in the method of FIG. 16, according to an example embodiment.

With reference to FIG. 17, there are shown example operations 1700 expanding on operation 1610 used to determine the overall health state of the service in method 1600.

At 1702, assurance orchestrator 106 computes each of the health states of the subservices to respectively indicate a passing health state or a failing health state for a corresponding one of the subservices.

At 1704, assurance orchestrator 106 determines the overall health state of the service as follows:

a. When one or more of the health states of the subservices indicate the failing health state, set the overall health state of the service to indicate a failing overall health state.

b. When all of the health states of the subservices indicate a passing health state, set the overall health state of the service to indicate a passing overall health state.

Figure 18:
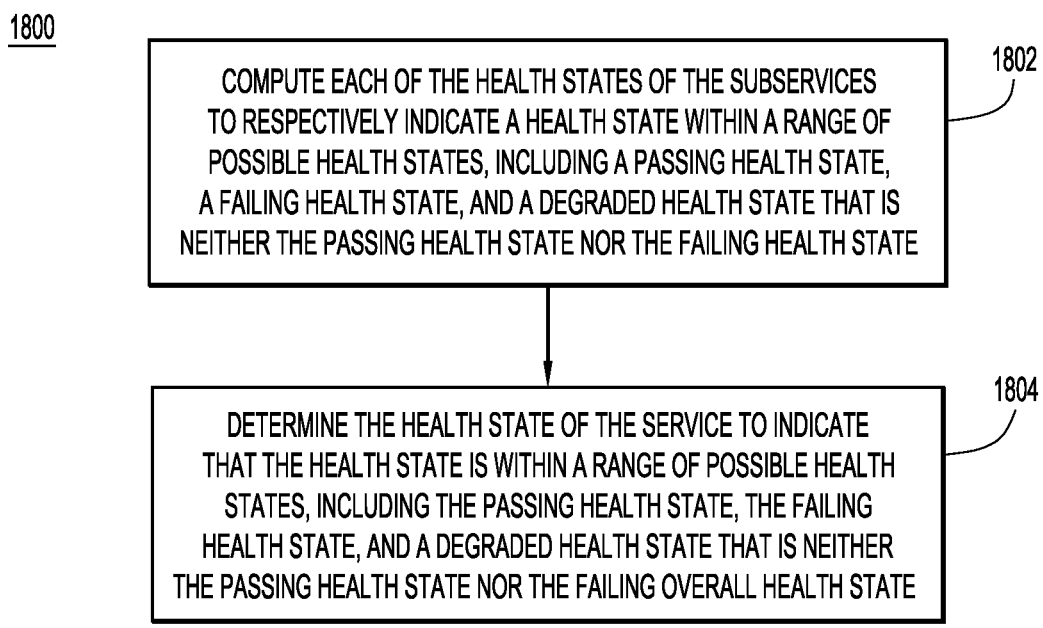
FIG. 18 shows operations expanding on the operation used to determine the overall health state of the service in the method of FIG. 16, according to an example embodiment.

With reference to FIG. 18, there are shown example operations 1800 expanding on operation 1610 used to determine the overall health state of the service in method 1600.

At 1802, compute each of the health states of the subservices, respectively, to indicate a health state within a range of possible health states, including a passing health state, a failing health state, and a degraded health state that is neither the passing health state nor the failing health state.

At 1804, determine the overall health state of the service to indicate that the overall health state is within a range of possible overall health states, including the passing overall health state, the failing overall health state, and a degraded overall health state that is neither the passing overall health state.

Figure 19:
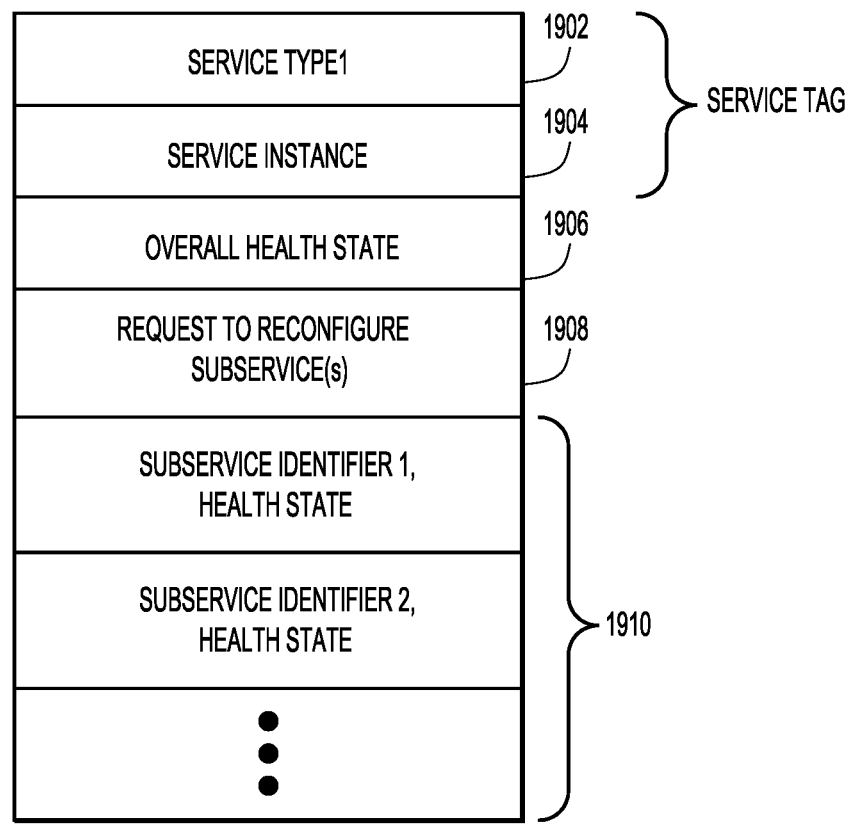
FIG. 19 is an illustration of a service assurance message used to request subservice reconfiguration in the closed loop automation for intent-based networking implemented by the service assurance system of FIG. 15, according to an example embodiment.

With reference to FIG. 19, there is an illustration of an example service assurance message 1900 that may be included in service assurance messages (flow) 1502.

Service assurance message 1900 includes a service type 1902 and a service instance 1904 that together uniquely identify a service, an overall health status 1906 of the service, a request 1908 to reconfigure one or more subservices, and identifiers and health states 1910 of the one or more services.

Intelligent Selection of Vantage Points for Assurance Monitoring of Subservices

Embodiments directed to intelligent selection of vantage points for assurance monitoring of subservices of multiple services on a network are now described in connection with FIGS. 20-25.

Broadly speaking, most network and service monitoring occurs across all lower-level network elements and service elements. This results in a deluge of data that needs to be sifted for analysis. When it comes to end-to-end user experience monitoring, one can either do a full mesh, which is expensive, or choose a sample, i.e., choose to monitor only specific segments or paths. Embodiments presented below provide an intelligent way to sample for purposes of monitoring.

In practice, service assurance system 100 may deploy and provide service assurance for a large number (e.g., hundreds or even thousands) of services on one or more networks. The services may comprise many different service types (e.g., L3VPN, and so on), and many instances of each of the different service types (e.g., L3VPN for customer 1, L3VPN for customer 2, and so on). Because each of the services includes many different subservices, the services may collectively comprise a large number (e.g., in the many thousands) of subservices. Thus, providing service assurance for such large numbers of services and their subservices presents a scaling challenge that can be met by answering questions such as which subservices should be monitored, which subservices should be monitored more closely and more aggressively than others, and how should end-to-end user experience be monitored at scale to identify subservices most likely to impact a broad range of services? Service assurance monitoring that uses intelligent selection of vantage points answers the aforementioned questions, to provide a focus for aggressive monitoring of subservices known to impact multiple services, thus reducing monitoring resource requirements.

Figure 20:
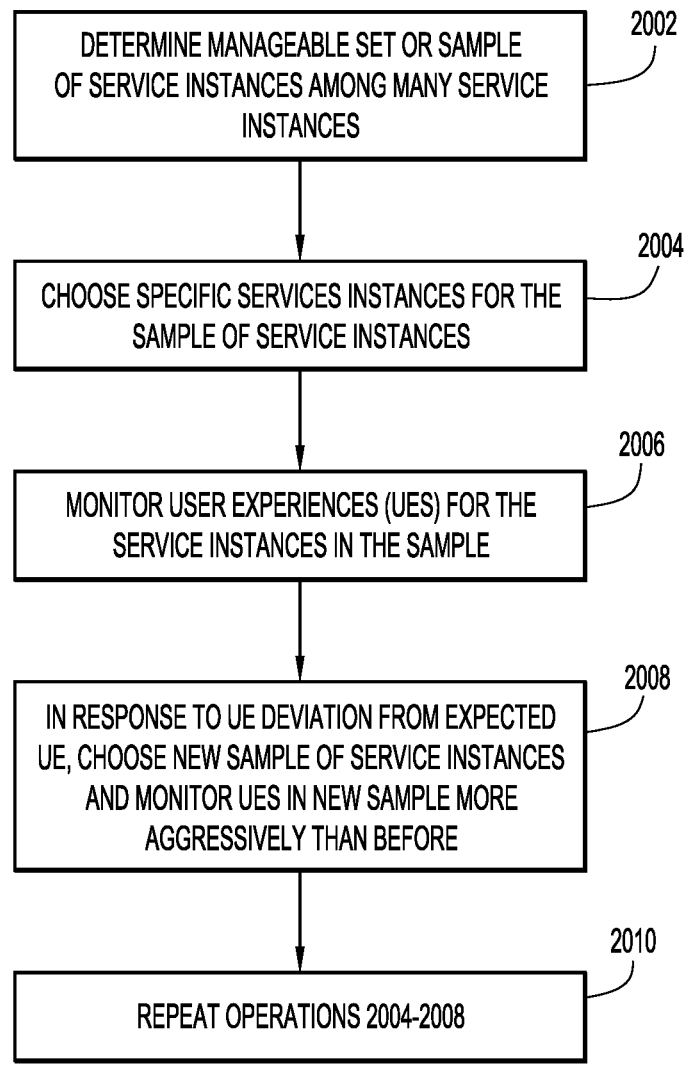
FIG. 20 is a high-level flowchart of a method of assurance monitoring of multiple services that may be performed by the service assurance system, according to an example embodiment.

With reference to FIG. 20, there is a high-level flowchart of an example method 2000 of assurance monitoring for multiple services performed by service assurance system 100. A goal of method 2000 is to choose a representative subset of service instances and/or subservices that will give a best view of the health states of a much larger number of service instances.

At 2002, service assurance system 100 determines, for a given type of service for which many service instances exist, an initial "manageable set" or initial "sample" of the service instances over which end-to-end user experience (UE) assurance monitoring may be performed. The "manageable set" or "sample" represents a fraction, e.g., 10%, of a total number of the service instances. The fraction may vary based on the total number of service instances and a size of the service provider (SP) that provides the service instances.

At 2004, service assurance system 100 chooses, from all of the service instances, specific service instances for the initial sample. One or more of the following criteria/mechanisms may be used to choose the specific service instances:

a. Choose as the specific service instances the service instances for customers that generate the most revenue.

b. Choose as the specific service instances the service instances that use the most common or shared subservices.

c. Choose as the specific service instances a random sample of the service instances.

At 2006, service assurance system 100 monitors UEs associated with the specific service instances with respect to expected UEs. Assurance system 100 may apply an initial rate to the monitoring, in which case service assurance system 100 collects or polls data (including subservice metrics, as described above) from the specific service instances at an initial rate (referred to as an initial "polling frequency"), and then determines the UEs at the initial rate based on the collected data.

When the monitoring indicates, for one of the specific services instances, a significant deviation of the UE from the expected UE, an assumption is made that the other service instances (for the given service type) are similarly affected, i.e., are experiencing significant deviations of their respective UEs from expected UEs.

At 2008, in response to the significant deviation indicated in 2006, service assurance system 100 applies a "next level down" or "deeper-dive" monitoring of the UEs, which may include choosing a new sample of service instances to monitor. The new sample may include a next tier of service instances, a random sample of service instances, and so on. Additionally, service assurance system 100 may use a higher rate (i.e., higher polling frequency) for monitoring the UEs of the service instances of the new sample, to test whether the service instances of the new sample are affected similarly to those of the initial sample.

At 2010, operations 2004, 2006, and 2008 are repeated with refinements to the sample based on where deviations in the UEs are most commonly seen.

Assurance system 100 may implement various ones of operations 2002-2008 in a way that provides advantages over conventional approaches. In particular, operation 2006 may employ subservice dependency graphs of service instances to pinpoint where the service instances intersect with one another. This enables an intelligent selection of which network paths (or segments) to monitor for UE, where the UE may be represented as a health state of a service instance in the context of a subservice dependency graph. For example, rather than performing true end-to-end monitoring from customer premises equipment (CPE)-to-CPE over a VPN, it may be equally beneficial, and more efficient, simply to monitor a single segment in the path of the VPN, if that segment is where an intersection of the subservice dependency graphs indicates an occurrence of a critical fluctuation in performance from a subservice basis. An intelligent selection of only that path segment as a monitoring point, i.e., as a "vantage point," provides considerable visibility across an entire service type (and perhaps other services, e.g., in the case of a specific leaf to spine interconnect), while limiting the consumption of resources for the UE monitoring, and limiting any negative impact on the utility of the UE monitoring.

With respect to operations 2006 and 2008, the subservice dependency graphs may also provide enhanced visibility to identify deviations in the UEs, because the subservice dependency graphs provide (overall) health states (which may be considered representative of the UEs) of the service instances represented by the subservice dependency graphs, as well as subservice health states. Therefore, if the UE monitoring determines that the performance of a service instance in the sample of service instances is outside of an acceptable range, e.g., the UE is degraded because it does not meet an acceptable threshold, the subservice dependency graph for the service instance may be examined/traversed to determine where other service instances may also be affected similarly. For example, while it may be that the CPE of every customer is faulty at the same time (e.g., due to a software bug on the CPE), it is likely that a shared subservice is unhealthy, and that the shared subservice is causing the degraded UE. The subservice dependency graph may be used to reveal other service instances that share that subservice to further identify a root cause of degradation.

Additionally, because the subservice dependency graph (i.e., the subservice nodes and the links/edges connecting the subservice nodes) may be traversed bi-directionally, from the top level (i.e., the root) down to the bottom level, and vice versa, either a top-down or a bottom-up traversal of the subservice dependency graph may be employed to find key (i.e., shared) subservices and, therefore, key service paths and service instances to monitor. For example, a top-down traversal may easily reveal that a core router is a key shared subservice vantage point, but a bottom-up traversal, that traverses services from their lower level subservice connection points to a network up to the root, may identify less obvious shared subservices. The less obvious shared subservices may include individual network device interfaces, for example, that represent bottlenecks and thus serve as excellent candidates or vantage points for UE monitoring.

Figure 21:
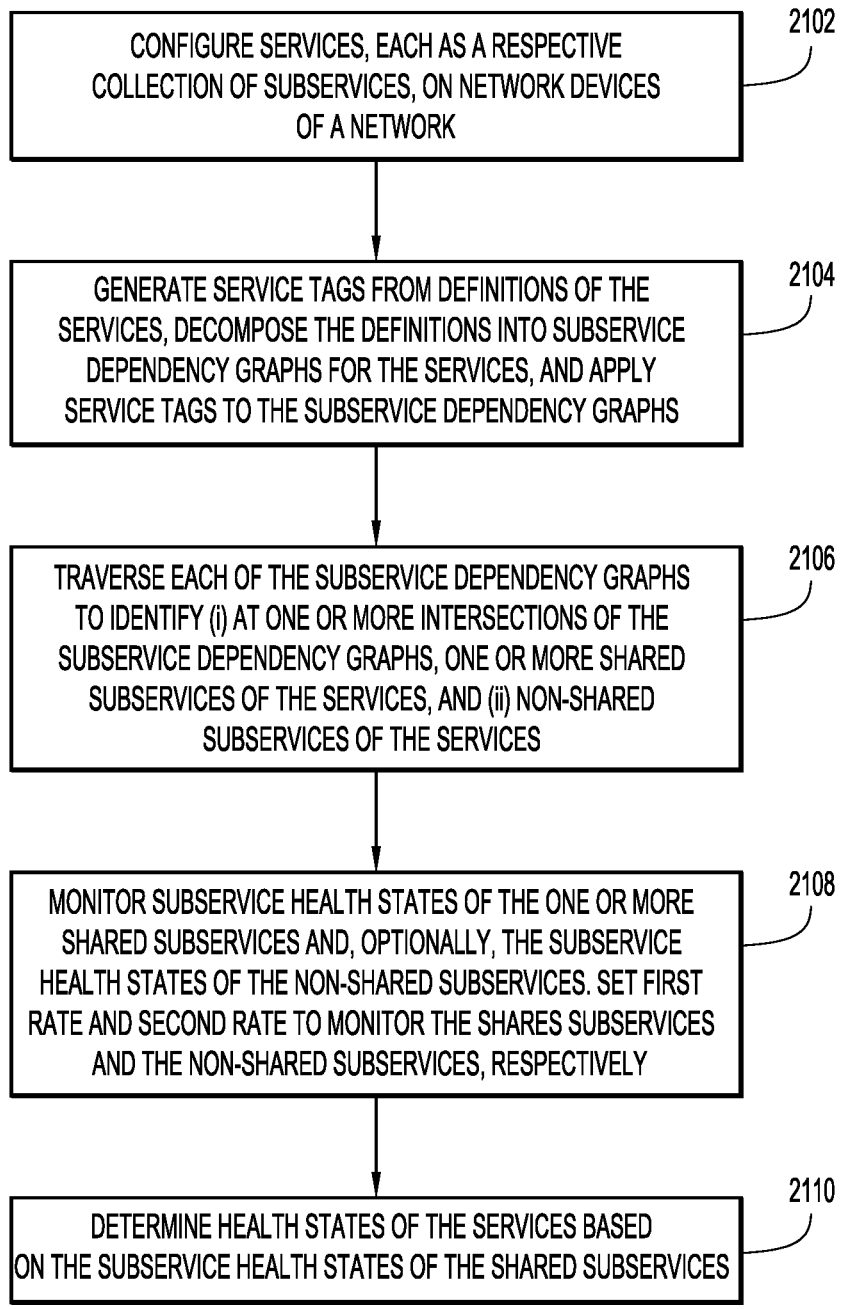
FIG. 21 is a flowchart of a method of using intelligent selection of vantage points for assurance monitoring of subservices performed by the service assurance system, according to an example embodiment.

With reference to FIG. 21, there is a flowchart of an example method of using intelligent selection of vantage points for assurance monitoring of subservices performed by service assurance system 100.

At 2102, network orchestrator 102 configures multiple services on network devices 112 of service network 113. The services each include a collection of respective subservices that implement the service. Network orchestrator 102 stores a respective definition of each of the services in service configuration database 150, and provides the definitions to assurance orchestrator 106, as described above.

At 2104, assurance orchestrator 106 generates respective service tags for the services based on the definitions of the services, as described above. Assurance orchestrator 106 also decomposes the definitions of the services into respective subservice dependency graphs (one per service) that each indicate the subservices and dependencies between the subservices that collectively implement a respective one of the services. Assurance orchestrator 106 applies the service tags to the subservice dependency graphs to associate the subservice dependency graphs with respective ones of the services to which subservice dependency graphs pertain.

At 2106, network orchestrator 106 traverses each of the subservice dependency graphs, in turn, and while traversing each subservice dependency graph, identifies and records:

a. Subservices at intersections of the subservice dependency graph with other subservice dependency graphs. Each such subservice (referred to as a "shared subservice") is a subservice that is shared by, or belongs to, at least two of the services (i.e., at least two of the subservice dependency graphs). That is, each shared subservice has links or edges that lead to at least one other service. Depending on the number of intersections between the subservice dependency graph and other subservice dependency graphs, the traversal may identify zero, one, or more than one shared subservice. Shared subservices are marked as vantage points for assurance monitoring because they each impact health states of more than one of the services.

b. Non-shared subservices in the subservice dependency graph that are not shared by any other services (i.e., by other subservice dependency graphs).

More specifically, traversal includes a traversal of all of the subservice nodes, and the links between the subservice nodes, of the subservice dependency graph. The subservice identifiers stored in the subservice nodes that are traversed are recorded and compared against the subservice identifiers previously recorded during traversals of other subservice dependency graphs. Thus, a match between subservice identifiers indicates that the subservice identified by the matched subservice identifiers belongs to different services, i.e., that the subservice is a shared subservice. Conversely, subservice identifiers that remain unmatched after traversal of all of the subservice dependency graphs identify non-shared subservices.

Other statistics may be recorded and/or determined at operation 2106. For example, network orchestrator 106 may determine, for each of the shared subservices, a respective number of services that share the shared subservice. Network orchestrator 106 may then determine, based on those numbers, a most shared subservice (i.e., the shared subservice that is shared by the greatest number of services). Network orchestrator 106 may use such statistics to make subsequent assurance monitoring decisions, such as, which subservices should be monitored most aggressively, which subservices may not need to be monitored, and so on.

At 2108, assuming one or more shared subservices, service assurance system 100 monitors/determines subservice health states of at least the one or more shared subservices, i.e., the vantage points, while they are operating. Operations used to implement the monitoring of subservices (i.e., expanding on operation 2108) are described below in connection with FIG. 22. In one embodiment, assurance orchestrator 106 monitors the subservice health states of each of the one or more shared subservice, but does not monitor subservice health states of the non-shared subservices. This embodiment may be further limited such that assurance orchestrator 106 monitors the subservice health state of only the most shared subservice, and no other subservices. In another embodiment, assurance orchestrator 106 monitors the health state of the most shared subservice at a first rate, and monitors the health states of remaining ones of the one or more shared subservices that are not the most shared subservice at a second rate that is greater than the first rate. In yet another embodiment, assurance orchestrator 106 monitors the subservice health states of the one or more shared subservices, and additionally monitors subservice health states of the non-shared subservices while they are operating.

Assurance system 100 may set one or more rates at which to monitor the subservice health states. For example, service assurance system 100 sets a first rate at which to monitor the subservice health states of the shared subservices (and then monitors those subservice health states at the first rate), and a second rate at which to monitor the subservice health states of the non-shared subservices (and then monitors those subservice health states at the second rate). In one embodiment, the first rate and the second rate are the same. In another embodiment, the first rate is greater than the second rate, such that service assurance system 100 monitors the subservice health states of the shared subservices more frequently than the service assurance system monitors the subservice health states of the non-shared subservices.

At 2110, service assurance system determines health states of the services based on the subservice health states as monitored in operation 2108, e.g., based on the subservice health states of the shared subservices, and optionally the subservice health states of the non-shared subservices. Assurance orchestrator 106 determines the health states at whichever of the rates at which the subservice health states are monitored.

Figure 22:
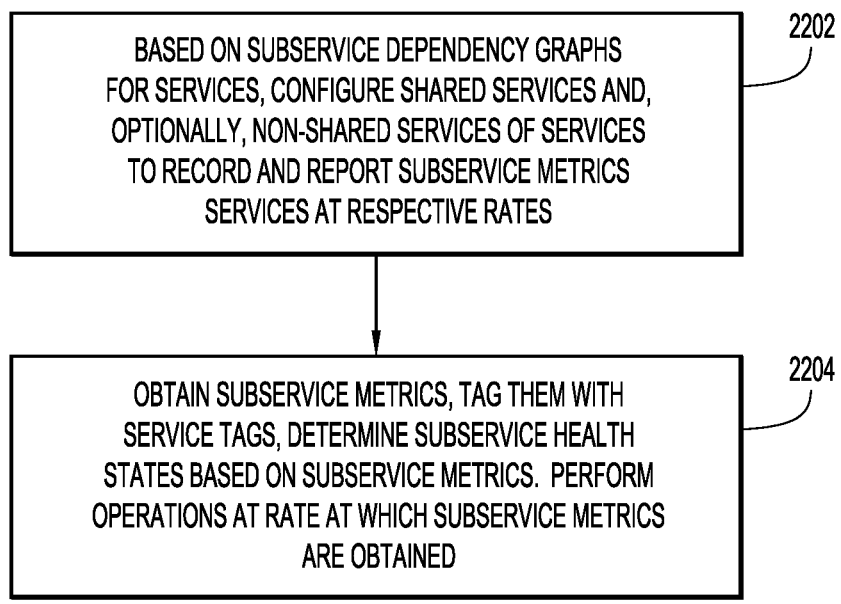
FIG. 22 shows operations expanding on an operation of the method of FIG. 21 used to monitor subservice health states, according to an example embodiment.

With reference to FIG. 22, there are shown operations 2200 expanding on operation 2108 of method 2100 used to monitor subservice health states. Operations 2200 include various operations of method 1400 described above in connection with FIG. 14.

At 2202, based on the subservice dependency graphs, assurance orchestrator 106 and assurance agents 108, collectively, configure the shared subservices and, optionally, the non-shared subservices of the services, to record and report subservice metrics indicative of health states of the subservices of the services at respective rates (e.g., the first rate and/or the second rate). Operation 2202 commands the subservices to record and report their respective subservice metrics at the respective rates via telemetry configuration information 120, e.g., each monitoring object 1200 may include a rate field that defines a rate, as a multi-bit word, at which subservice metrics are to be recorded and reported. The rate may be in a range from 0.01 Hz to 1000 Hz, for example, although lower and higher rates are possible. Operation 2202 may include operation 1408 of method 1400. As a result of operation 2202, the subservices of the services record and report their respective subservice metrics at the respective rates.

At 2204, assurance agents 108 and assurance orchestrator 106, collectively, (i) obtain the subservice metrics from the shared subservices and, optionally, the non-shared subservices, at the respective rates, (ii) tag the subservice metrics with the service tags corresponding to the services to which the subservice metrics pertain, and (iii) determine the subservice health states of the subservices based on the subservice metrics. Operation 2204 may include operations 1410, 1412, and 1414 of method 1400. The obtain operation, the tag operation, and determine subservice health state operation may each be performed at the respective rates at which the service metrics are reported by the subservices, so that the subservice health states are determined at those rates.

Figure 23:
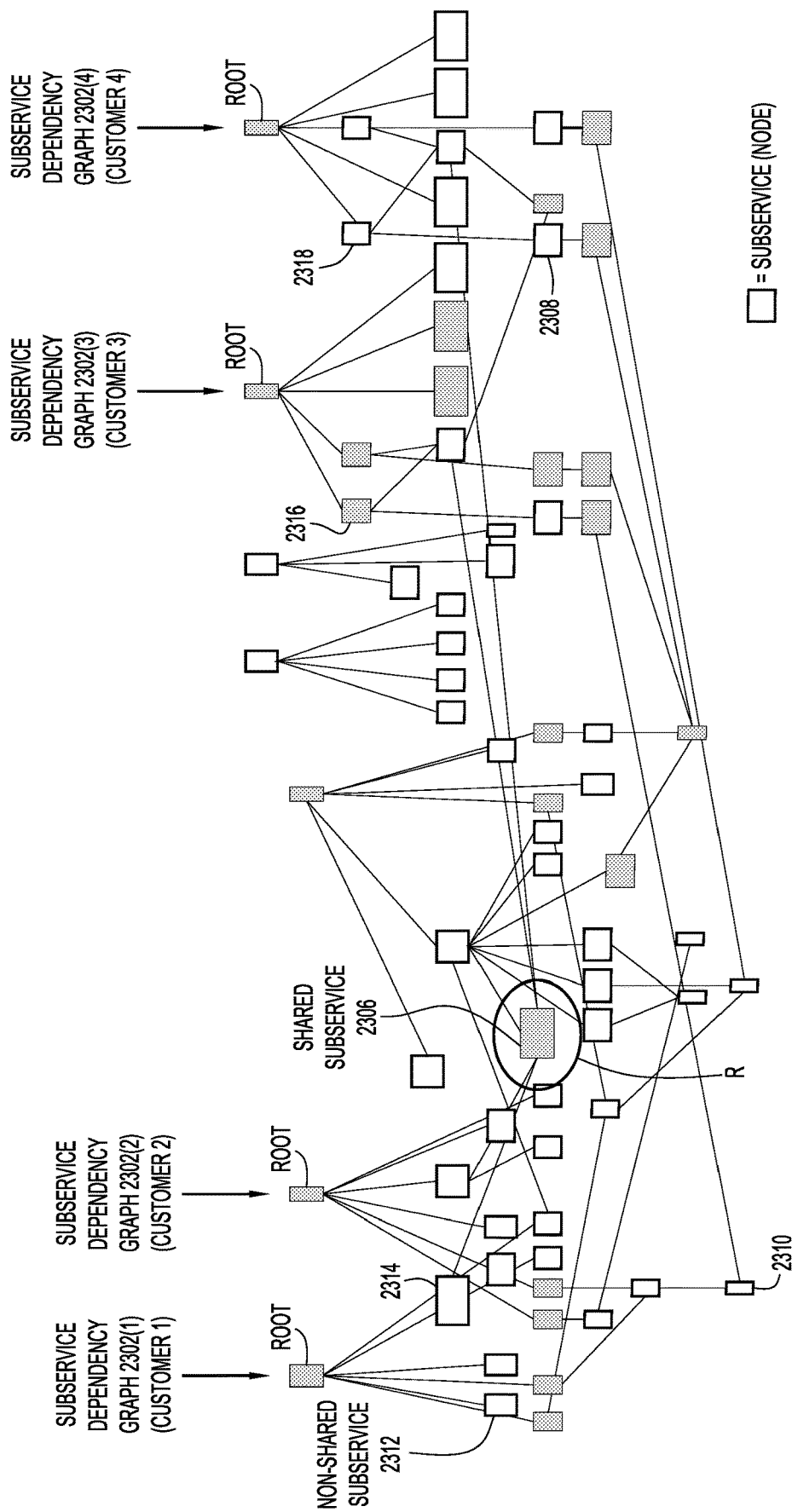
FIG. 23 is an illustration of assurance monitoring using intelligent selection of vantage points, performed by the service assurance system on a collection of service instances configured on a service provider network, according to an example embodiment.

An example application of assurance monitoring of four service instances configured on a network is now described in connection with FIGS. 23 and 24. With reference to FIG. 23, there is an illustration of an example of assurance monitoring using intelligent selection of vantage points performed by service assurance system 100 on a collection of service instances configured on a network. In the example of FIG. 23, at an initial stage of assurance monitoring, service assurance system 100 decomposes the collection of service instances into intersecting subservice dependency graphs 2302(1), 2302(2), 2302(3), and 2302(4) (collectively referred to as subservice dependency graphs 2302) for four VPN tunnel instances of a service type=L3VPN for four customers, including Customer 1, Customer 2, Customer 3, and Customer 4, respectively. The interconnected blocks shown in FIG. 23 are subservice nodes that represent respective subservices, except for the root node blocks, which identify the specific service instances. The subservice nodes of subservice dependency graphs 2302 may each include subservice information similar to the subservice information included in various one of the subservice nodes of subservice dependency graph 600, as shown in FIG. 6, but such subservice information is not shown in the subservice nodes of the subservice dependency graphs 2302 to avoid cluttering FIG. 23. The terms "subservices" and "subservice nodes" may be used synonymously and interchangeably when referencing any given subservice dependency graph.

At the initial stage of assurance monitoring, service assurance system 100 traverses subservice dependency graphs 2302 to (i) identify/reveal shared subservices (subservice nodes) 2306, 2308, and 2310, among others, at intersections of the subservice dependency graphs, and (ii) non-shared subservices (subservice nodes) 2312, 2314, 2316, and 2318, among others. Many of the shared and non-shared subservices are not labeled in FIG. 23 for purposes of illustrative clarity, and to avoid confusion. In addition, the traversal determines that shared subservice 2306, shared by all four of the service instances represented by subservice dependency graphs 2302, is a most shared subservice among the shared subservices.

Assurance system 100 performs an end-to-end assurance monitoring assessment, which determines (i) subservice health states of most of the subservices of the service instances represented by the subservice dependency graphs 2302, and (ii) health states of all of the service instances based on the subservice health states. In FIG. 23, shaded blocks indicate failed or degraded subservice health states/ health states of service instances, while un-shaded blocks indicate passing or non-degraded subservice health states/ health states of service instances. Accordingly, some of the subservice health states and some of the health states of the service instances are failing or degraded.

Shared subservice 2306 represents, and is selected as, a vantage point for subsequent assurance monitoring because a subservice health state of that one subservice potentially impacts overall health states of all of four of the service instances represented by the subservice dependency graphs 2302. Accordingly, after the initial (end-to-end) assurance monitoring, in a subsequent stage of assurance monitoring, service assurance system 100 may monitor the subservice health state of shared subservice 2306 more aggressively than before (i.e., more aggressively than at the initial stage), and more aggressively than any other subservices. For example, service assurance system 100 may drill-down, specifically on shared subservice 2306, by soliciting additional subservice metrics from the shared subservice and/or monitoring its subservice health status more frequently than before.

Figure 24:
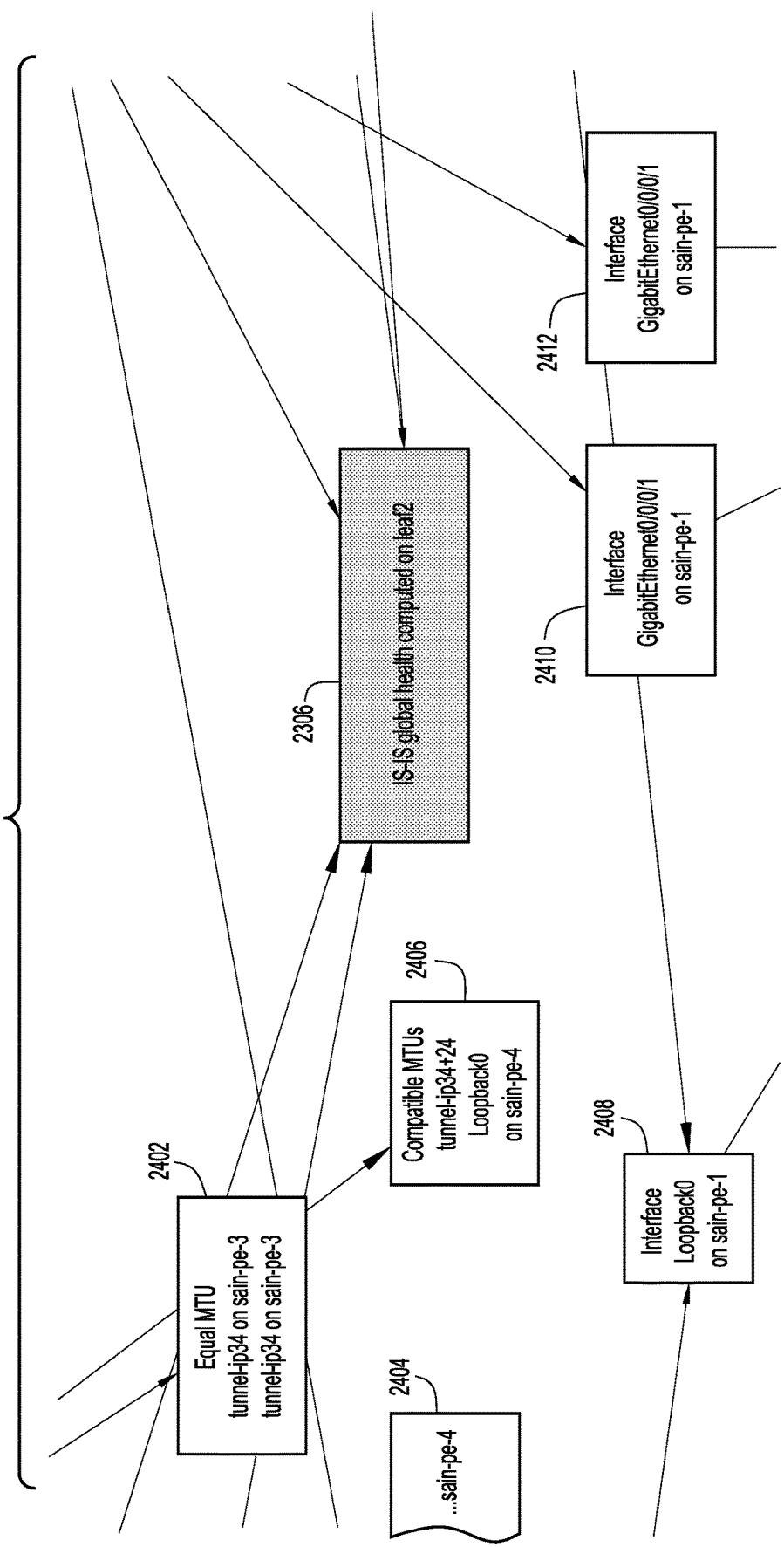
FIG. 24 is an illustration of a drill-down view of a vantage point shown in FIG. 23, according to an example embodiment.

With reference to FIG. 24, there is an illustration of a drill-down view of the vantage point represented by shared subservice 2306 in region R of FIG. 23. As shown in FIG. 24, shared subservice 2306 is an IS-IS subservice implemented on a leaf node ("leaf2") of a spine switch. Shared subservice 2306 is shown adjacent to additional subservices 2402-2412. The subsequent, more aggressive, assurance monitoring may increase the rate at which the subservice health state of the IS-IS subservice is monitored, and may collect additional information from the IS-IS subservice, and thus ensure proper functionality of the IS-IS subservice.

Figure 25:
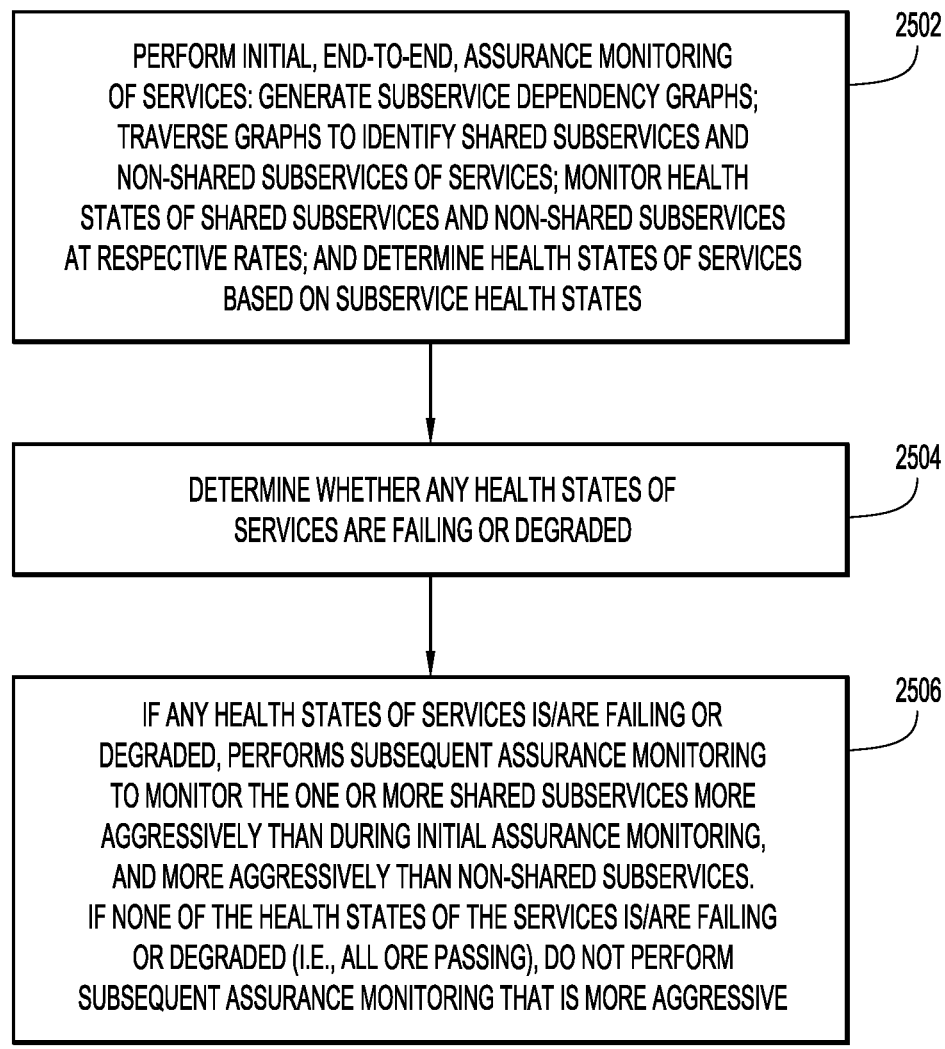
FIG. 25 is a high-level flowchart of a method of performing assurance monitoring using intelligent selection of vantage points that includes operations from the methods associated with FIGS. 21-24, according to an example embodiment.

With reference to FIG. 25, there is a high-level flowchart of an example method 2500 of performing assurance monitoring using intelligent selection of vantage points that includes and combines various operations described above in connection with FIGS. 21-24.

At 2502, service assurance system 100 performs an initial, end-to-end, assurance monitoring (e.g., stage 1 assurance monitoring) of services configured on network devices of a network. The services may include multiple service instances of a same service type, different service types, or both. The initial end-to-end assurance monitoring includes operations to:

a. Generate subservice dependency graphs representative of the services.

b. Traverse the subservice dependency graphs to identify one or more shared subservices at intersection points of the subservice dependency graphs, and to identify non-shared subservices. Method 2500 assumes there is at least one shared subservice.

c. Using the subservice dependency graphs, monitor subservice health states of the one or more shared subservices and the non-shared subservices at a first rate and a second rate, respectively. The first rate and the second rate may be the same, or the first rate may be greater than the second rate.

d. Determine health states of the services based on the subservice health states.

At 2504, service assurance system 100 determines whether any of the health states of the services are failing or degraded, as described above in connection with FIG. 16, for example.

At 2506, when/if it is determined that any of the health states of the services is/are failing or degraded, service assurance system 100 performs subsequent assurance monitoring (e.g., stage 2 assurance monitoring) that monitors the one or more shared subservices more aggressively than during the initial, end-to-end, assurance monitoring, and more aggressively than the non-shared subservices. For example, service assurance system 100 monitors the subservice health states of the one or more shared subservices at the first rate, such that the first rate is greater than the second rate, and collects additional information/subservice metrics from the one or more shared subservices. In another example, assurance system 100 may increase the first rate to an even higher rate, and monitor the one or more shared services at the increased rate. In one embodiment, service assurance system 100 continues to monitor the subservice health states of the non-shared subservices of the services at the second rate. In another embodiment, the subsequent assurance monitoring ceases to monitor the subservice health states of the non-shared subservices. Thus, the subsequent assurance monitoring is more aggressive and more focused than the initial, end-to-end, assurance monitoring.

If none of the health states of the services is/are failing or degraded, service assurance system 100 does not perform the subsequent, more aggressive, more focused, assurance monitoring.

Service Heatmap-Based Telemetry Feedback Loop

Embodiments directed to service assurance using a service heatmap-based telemetry feedback loop are now described in connection with FIGS. 26-32. The service heatmap-based telemetry feedback loop employs features of the embodiments described above.

Figure 26:
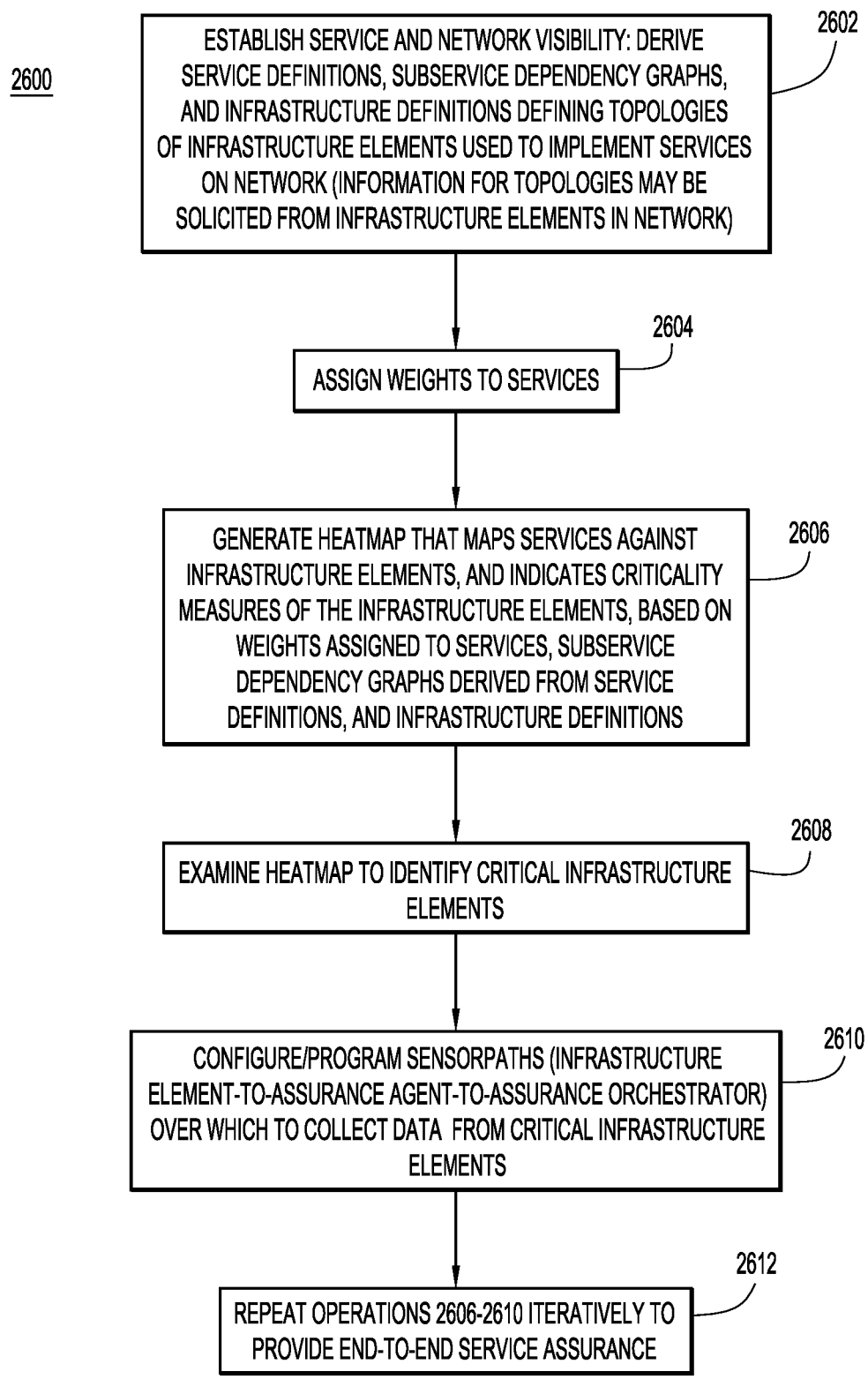
FIG. 26 is a flowchart of a high-level method of employing a heatmap-based telemetry feedback loop for service assurance, according to an example embodiment.

With reference to FIG. 26, there is a flowchart of an example high-level method 2600 of employing a heatmap-based telemetry feedback loop for service assurance, performed by assurance system 100.

At 2602, service and network visibility is established. Specifically, assurance system 100 (e.g., particularly network orchestrator 102 and assurance orchestrator 106) establishes (i) a holistic view of the services implemented on network 113 via subservice dependency graphs derived from definitions of services (referred to as "service definitions"), and (ii) visibility into a network infrastructure or overall topology of the network that is based on (network) infrastructure definitions that indicate how the services are actually implemented in/configured on network 113. The overall topology encompasses individual topologies used to implement respective ones of the services in network 113. Each individual topology may include physical and/or logical infrastructure elements or network resources (e.g., network devices or nodes, and links connecting the network devices) configured on network 113 to implement a respective/corresponding one of the services.

At 2604, respective weights are assigned to the services. For example, based on one or more factors that include, but are not limited to, business intent on which the services are based, and the types of services that the services encompass, assurance orchestrator 106 assigns to each of the services a respective priority/weight (also referred to as "weightage"), to produce weighted services. The weight assigned to a service may be based on factors such as how much a customer pays for the service, a level of traffic usage for the service, a number of users of the service, a bandwidth used by the service, an importance level or criticality that a customer assigns to the service, and so on.

At 2606, a service-level heatmap is generated. To do this, assurance orchestrator 106 uses/combines the individual topologies of the network infrastructure and the weights associated with the services to map the (weighted) services to their infrastructure elements indicated in the individual topologies, to create a service-level heatmap or matrix that maps the services against their infrastructure elements. The service-level heatmap (simply "heatmap") includes entries that indicate, for the infrastructure elements, respective measures of criticality (i.e., respective "criticality measures") in a range from a high criticality to a low criticality, where the low criticality is less than the high criticality. Thus, the heatmap indicates, at the intersection of each service with each infrastructure element for the service, a respective measure of criticality for the infrastructure element.

At 2608, critical data points are identified on the heatmap. To do this, assurance orchestrator 106 examines the heatmap to identify the critical data points, which may include infrastructure elements that have respective measures of criticality that exceed a predetermined criticality threshold (e.g., that have a high criticality). These are considered the critical data points/infrastructure elements. Assurance orchestrator 106 then employs a closed loop approach (at, e.g., operation 2610 described below) to program telemetry for relevant sensor paths, e.g., to collect data or metrics in telemetry from the identified, critical infrastructure elements. A sensor path represents a data collection path (e.g., a metric collection path) from an infrastructure element in network 113 to assurance orchestrator 106, via orchestrator agents 108. The "data" or "metrics" that are collected may be the same as, or substantially the same as, the subservice metrics described above. Moreover, the data may be collected in the same manner as the subservice metrics.

At 2610, data is collected from the critical data points. To do this, assurance orchestrator 106 configures assurance agents 108 to subscribe to the relevant sensor paths, e.g., to collect the metrics in telemetry from the identified, critical infrastructure elements. In operation 2610, assurance orchestrator 106 may combine (i) heuristic packages derived from the subservice dependency graphs, (ii) information from the infrastructure definitions, and (iii) information identified in operation 2608, to identify and program the relevant sensor paths. Operation 2610 may include operations 1408-1414, 1606-1614, and 2108 described above.

At 2612, operations 2606-2610 are repeated to provide end-to-end service assurance in a scalable manner.

FIGS. 27-31 are now described with continued reference to method 2600 of FIG. 26. FIGS. 27-31 provide examples for various operations of method 2600.

Figure 27:
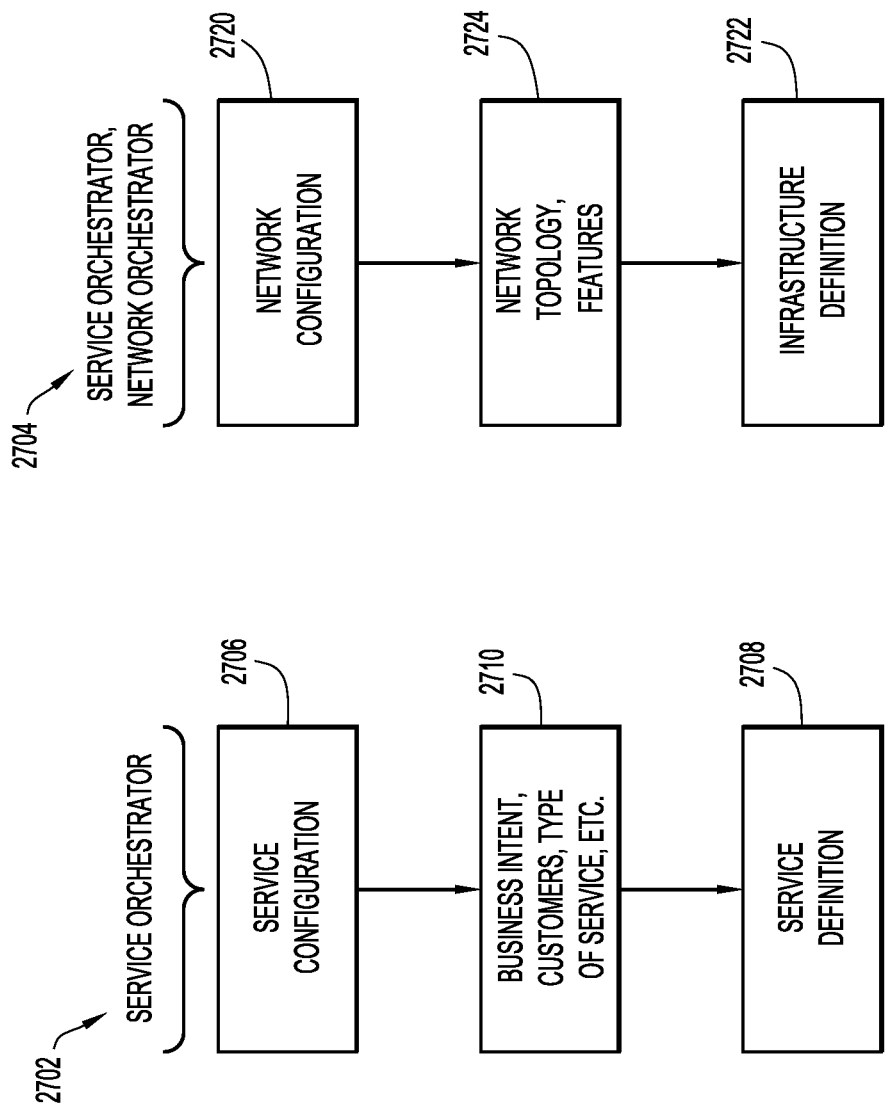
FIG. 27 shows operations used to derive a service definition, and operations used to derive an infrastructure definition in the method of FIG. 26, according to an example embodiment.

With reference to FIG. 27, there are shown example operations 2702 used to derive/determine a service definition, and operations 2704 used to derive/determine an infrastructure definition used in method 2600. Operations 2702 and 2704 may be performed by network orchestrator 102, assurance orchestrator 106, or both the network orchestrator and the assurance orchestrator.

At 2702, a high-level service configuration 2706 is converted to a service definition 2708 of a service based on service-related inputs 2710 for the service, including business intent to be satisfied by the service, a type of service to be implemented, and a criticality of the service. Examples of service definitions include service definitions 300-500 described above in connection with FIGS. 3-5, expanded to include parameters described below. The criticality of the service determines a weight of the service, which is added to the service definition. Examples of service-related inputs 2706 include, but are not limited to, the following:
  a. Service offered=L3VPN, L2VPN, or Internet.
  b. Default weight for L3VPN service=25.
  c. Weight for L3VPN for customers with SLA=50.
  d. Weight for L3VPN for customers with penalty based SLA=75.

Operation 2702 is repeated for each of multiple services to produce service definitions corresponding to respective ones of the multiple services.

At 2704, a high-level network configuration 2720 is converted to an infrastructure definition 2722 based on network configuration-related inputs 2724. Infrastructure definition 2722 defines a topology of infrastructure elements (e.g., network devices, interfaces, links, and so on) configured on network 113 to support the service. The topology may include a network path constructed as a sequence of hops, including network devices and links that connect the network devices to each other, through which traffic for the service flows. The network devices and associated links that form the hops are examples of the infrastructure elements defined by infrastructure definition 2722, and may also be referred to as "per-hop resources" of the network path.

Network configuration-related inputs 2724 may include, but are not limited to, information defining the topology and information defining features enabled in the topology to augment the service. In an example, the information defining the topology may be solicited from various ones of network devices 112 in network 113 that form the network path. Such information may include identifiers and addresses of the network devices, adjacency information that identifies the links and interfaces that connect the network devices to each other to form the network path, and properties enabled on the network devices, such as QoS values, ECMP paths, and Fast Reroute (FRR).

Examples of network configuration-related inputs 2724 include, but are not limited to:
  a. Information solicited from network devices, including identities of the network devices (e.g., routers) and links (collectively, the per-hop resources) connecting the network devices to implement a network path that supports traffic for a service.
  b. QoS applied to classify and prioritize critical business traffic (e.g., Webex).
  c. ECMP paths available in all of the network devices (this may be included in the information solicited in (a)).
  d. FRR enabled and backup path programmed in RIB of the network devices.

Operation 2704 is repeated for each of multiple services to produce infrastructure definitions that define topologies for respective ones of the multiple services.

Below is an example of a simple infrastructure definition that defines a topology, where Nd1-Nd5 represent identifiers of network devices or nodes, and L1-L5 represent identifiers of physical or logical links between various ones of the network devices:

| | |
|---|---|
| Nd1 | Flags: ECMP enabled |
| Nd2 | Flags: ECMP enabled, FRR enabled |
| Nd3 | Flags: None |
| Nd4 | Flags: FRR enabled |
| Nd5 | Flags: None |
| L1 Nd1-Nd2 | Flags: Layer 3, QoS level 1, LAG enabled |
| L2 Nd2-Nd3 | Flags: Layer 3, QoS level 1, LAG enabled |
| L3 Nd1-Nd4 | Flags: Layer 3, QoS default |

| | |
|---|---|
| L4 Nd4-Nd3 | Flags: Layer 3, QoS default |
| L5 Nd4-Nd5 | Flags: Layer 3, QoS default |

Figure 28:
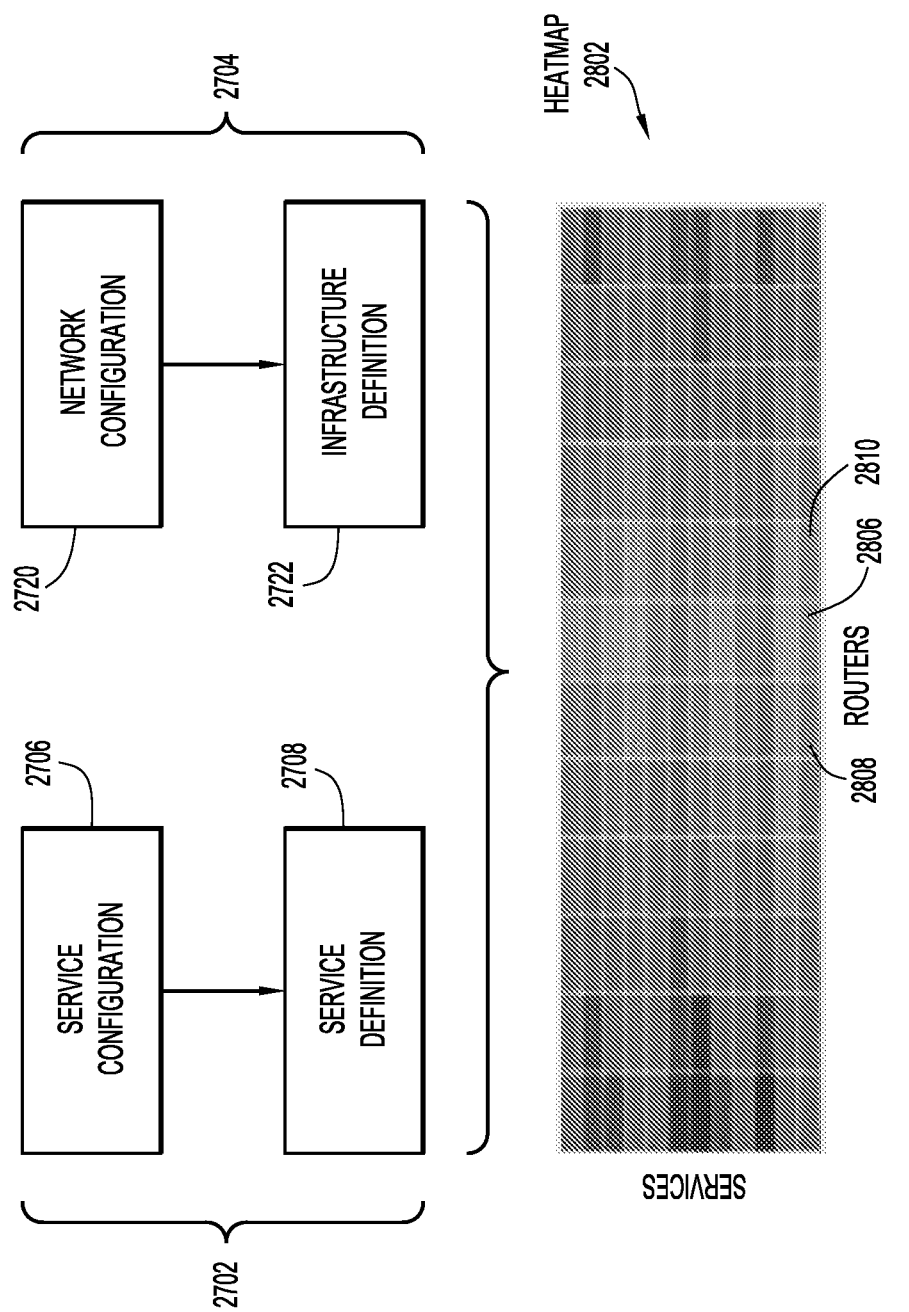
FIG. 28 is an illustration of a heatmap that maps services against infrastructure elements, according to an example embodiment.

At operation 2606, armed with the service definitions and the corresponding infrastructure definitions for the services (resulting from operations 2702 and 2704), assurance orchestrator 106 generates a heatmap that maps the services to/against the infrastructure elements which implement the services. With reference to FIG. 28, there is an illustration of an example heatmap 2802 that maps services against infrastructure elements, in the form of routers. More specifically, heatmap 2802 includes a matrix that maps the services (associated with rows of the matrix) against the routers (associated with columns of the matrix) in the network paths for the services. That is, a particular row of heatmap 2802 may represent the routers of a network path (across the columns of the heatmap) that supports the service indicted by the particular row.

Heatmap 2802 maps the services against the routers, by way of example, only. Different heatmaps may map the services against different types of infrastructure elements on a per-hop basis, or otherwise. For example, a heatmap may map the services against infrastructure elements in the form of per-hop links associated with each of the per-hop routers. In yet another example, a heatmap may map the services against network that are not strictly per-hop resources, but rather aggregated resources for multiple hops, or segments of a network path, and so on. Accordingly, assurance orchestrator 106 may generate many different heatmaps to map the services against many different types of infrastructure elements used to implement the services on network 113.

To generate heatmap 2802, assurance orchestrator 106 computes for each infrastructure element (e.g., router, link, and so on) of each service a respective measure of criticality in a range from a high criticality to a low criticality based on the weight assigned to the service and information from the infrastructure definition. Assurance orchestrator 106 stores the respective measure of criticality in heatmap 2802 at the junction of the service and the infrastructure element.

Thus, heatmap 2802 indicates for each infrastructure element of each service the respective measure of criticality. In the example of FIG. 28, the measures of criticality are represented in gray scale, such that relatively lighter and darker gray scales represent relatively higher and lower levels of criticality. An example method of computing measures of criticality for a heatmap is described below in connection with FIG. 31.

At operation 2608, assurance orchestrator 106 examines a heatmap (e.g., heatmap 2802) to identify relevant data points in the heatmap. Heatmap 2802 reveals/indicates the most critical infrastructure elements as those infrastructure elements having the lightest gray scale corresponding to the highest levels of criticality. For example, a provider edge (PE) node (e.g., router) 2806 in network 113 may be enabled to serve 100 customers/services where 15 are critical, and a PE node (e.g., router) 2808 in the network may be enabled to service 25 customer/services where 20 are critical. Alternately, a transit node (e.g., router) 2810 may be used by 1000 service endpoints of a service offering numerous critical services. Thus, heatmap 2802 plays a key role in identifying critical vantage points (e.g., routers 2806, 2808, and 2810) at which data collection for service assurance may be positioned or directed.

Figure 29:
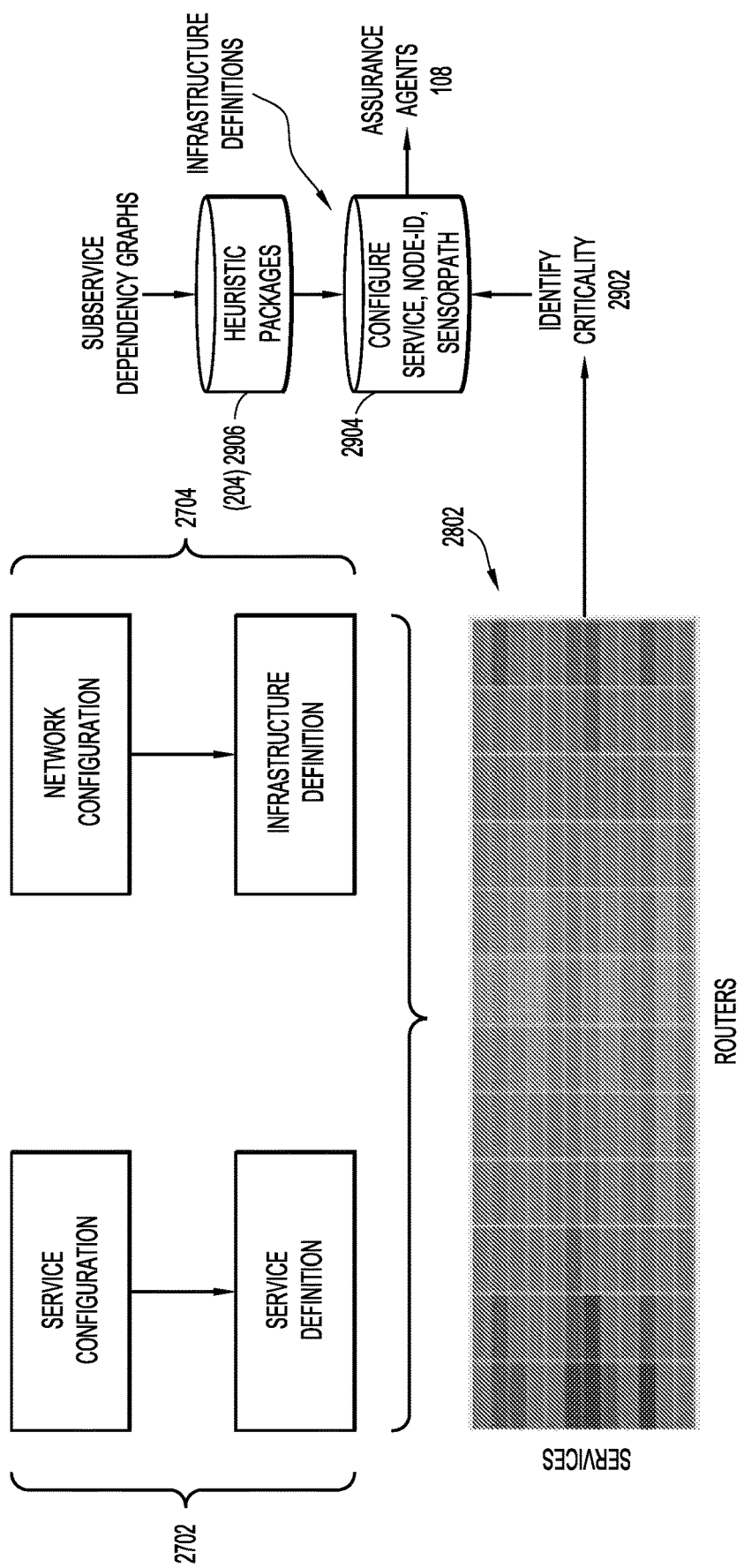
FIG. 29 is an illustration of operations used to identify critical data points among services, and to collect data from the data points, according to an example embodiment.

With reference to FIG. 29, there is an illustration of operations 2902-2906, expanding on operations 2608 and 2610, in which heatmap 2802 is used to identify critical data points (i.e., infrastructure elements) among the services in the heatmap, and to collect data from the data points.

At 2902, assurance orchestrator 106 examines heatmap 2802 to identify/determine critical infrastructure elements among all of the infrastructure elements across the services represented in the heatmap. For example, assurance orchestrator 106 determines as the most critical infrastructure elements those infrastructure elements that have respective measures of criticality that exceed a predetermined criticality threshold. Operation, 2802 generates identifiers of the most critical infrastructure elements, and identifiers of the services to which the critical infrastructure elements pertain (i.e., in which the infrastructure elements are employed). Based on the infrastructure definitions and the service definitions/subservice dependency graphs, assurance orchestrator 106 also identifies relevant service agents among service agents 108 that serve the critical infrastructure elements, and that can be used to collect the data from the critical infrastructure elements.

At 2904, assurance orchestrator 106 configures the relevant assurance agents to collect data from the infrastructure elements. To do this, assurance orchestrator 106 programs the relevant assurance agents, via assurance agent configuration information 118, to collect the data from the critical infrastructure elements. For example, in a case in which the critical infrastructure elements are (previously) represented as subservices in the subservice dependency graphs, assurance orchestrator 106 derives from the subservice dependency graphs heuristic packages 2906 directed to the critical infrastructure elements (represented as subservices), and provides the heuristic packages to the relevant assurance agents. Alternatively, in a case in which the critical infrastructure elements are not (previously) represented as subservices in the subservice dependency graphs, assurance orchestrator 106 first updates the subservice dependency graphs to include the critical infrastructure elements as new subservices in the subservice dependency graphs, then derives from the subservice dependency graphs heuristic packages 2906 directed to the critical infrastructure elements, and provides the heuristic packages to the relevant assurance agents.

Figure 30:
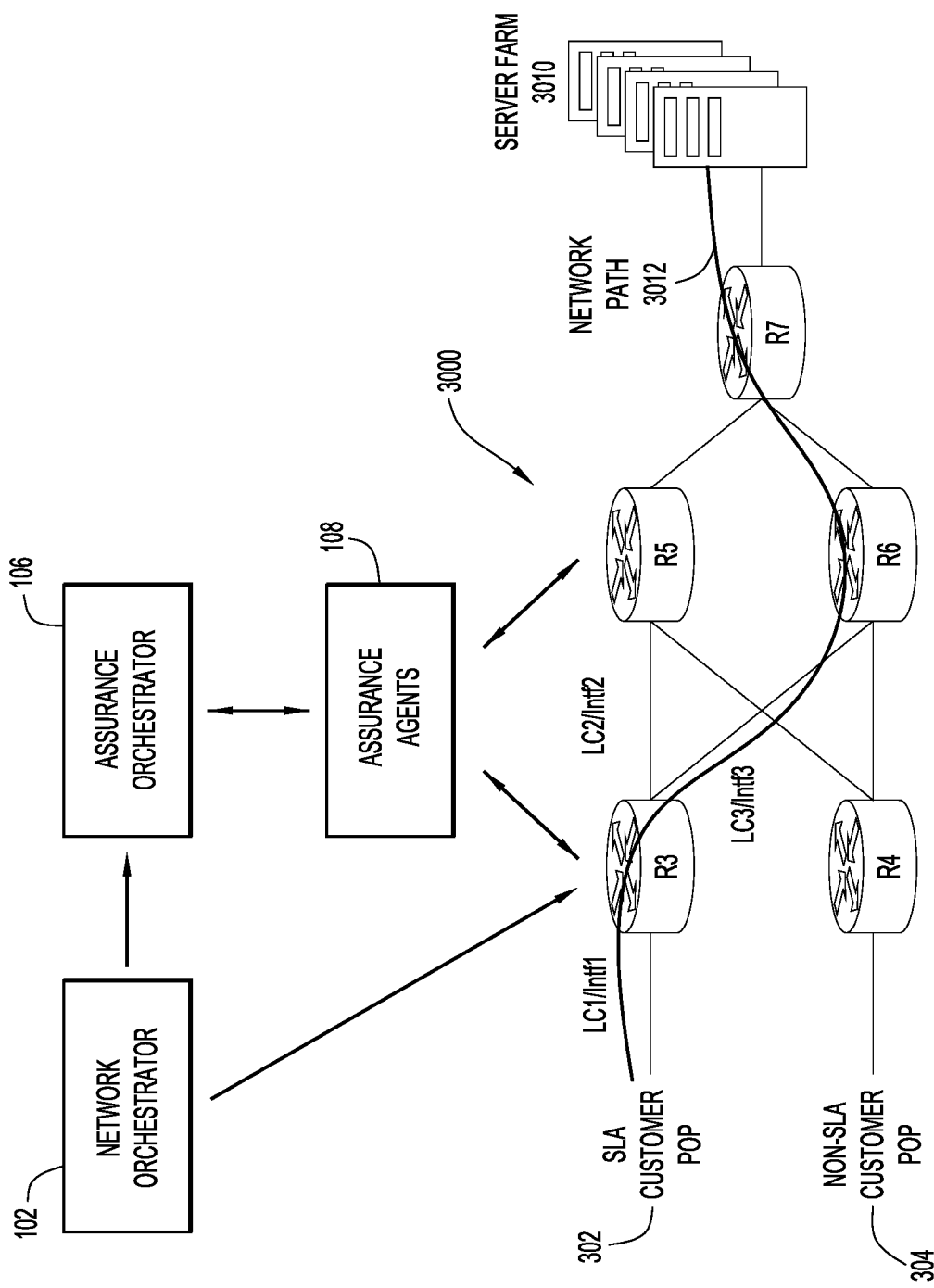
FIG. 30 is a block diagram of a network infrastructure including critical infrastructure elements used to implement a network path over which service traffic flows, according to an example embodiment.

With reference to FIG. 30, there is a block diagram of an example network infrastructure or topology 3000 that includes a network path over which traffic flows for two services; one service supports an SLA customer point-of-presence (POP) 3002, while the other service supports a non-SLA customer POP 3004. Topology 3000 includes routers or hops R3-R7 connected to each other via various links or interfaces as shown, to provide candidate network paths from POPs 3002, 3004 to a server farm 3010. For example, router R3 includes line cards/interfaces: LC1/Intf1 connected to POP 3002; LC2/Intf2 connected to router R5; and LC3/Intf3 connected to router R6.

In topology 3000, router R3 serves critical traffic towards server farm 3010 compared to router R4, which serves less critical traffic. Router R3 is enabled with FRR (Loop Free Alternative (LFA) or MPLS-Traffic Engineering (TE) (MPLS-TE)), and uses the R3-R6 link as a primary (network) path 3012, and the R3-R5 link as a backup or secondary path.

Based on the above-described arrangement, as determined by the service heatmap-based telemetry feedback loop, data (e.g., metrics indicative of the performance/health of the CPU and memory) of router R3 is critical compared to that of router R4, which is not as critical. Accordingly, as configured by the service heatmap-based telemetry feedback loop, the data type and the frequency at which the data is collected differs between router R3 and router R4, so as to focus on and give more insight into router R3. More specifically, assurance orchestrator 106 may collect data (e.g., metrics) from router R3 more frequently than from router R4. Also, assurance orchestrator 106 may configure the data to be collected from router R3 so as to provide more insight to the performance of router R3 relative to router R4. For example, within router R3, link statistics from line card/interfaces LC1/Intf1 and LC3/Intf3 are critical compared to link statistics from line card/interface LC2/Intf2. Therefore, assurance orchestrator 106 instructs router R3 (via assurance agents 108) to record and report statistics about line cards LC1 and LC3 at a relatively higher rate, and instructs router R4 to record and report statistics about its line card at a relatively lower rate that is less than the higher rate.

Event triggered monitoring may also be used with topology 3000. So long as the interfaces of routers R3-R5 (i.e., the backup interfaces) are up, the rate at which data (e.g., metrics indicative of performance and health state) of interface Intf3 is collected can be relatively low. This is because if interface Intf3 goes down, there is a pre-computed backup path available via router R5, as mentioned above; however, if link R3-R5 goes down, the rate at which data is collected for link R3-R6 should be increased.

Figure 31:
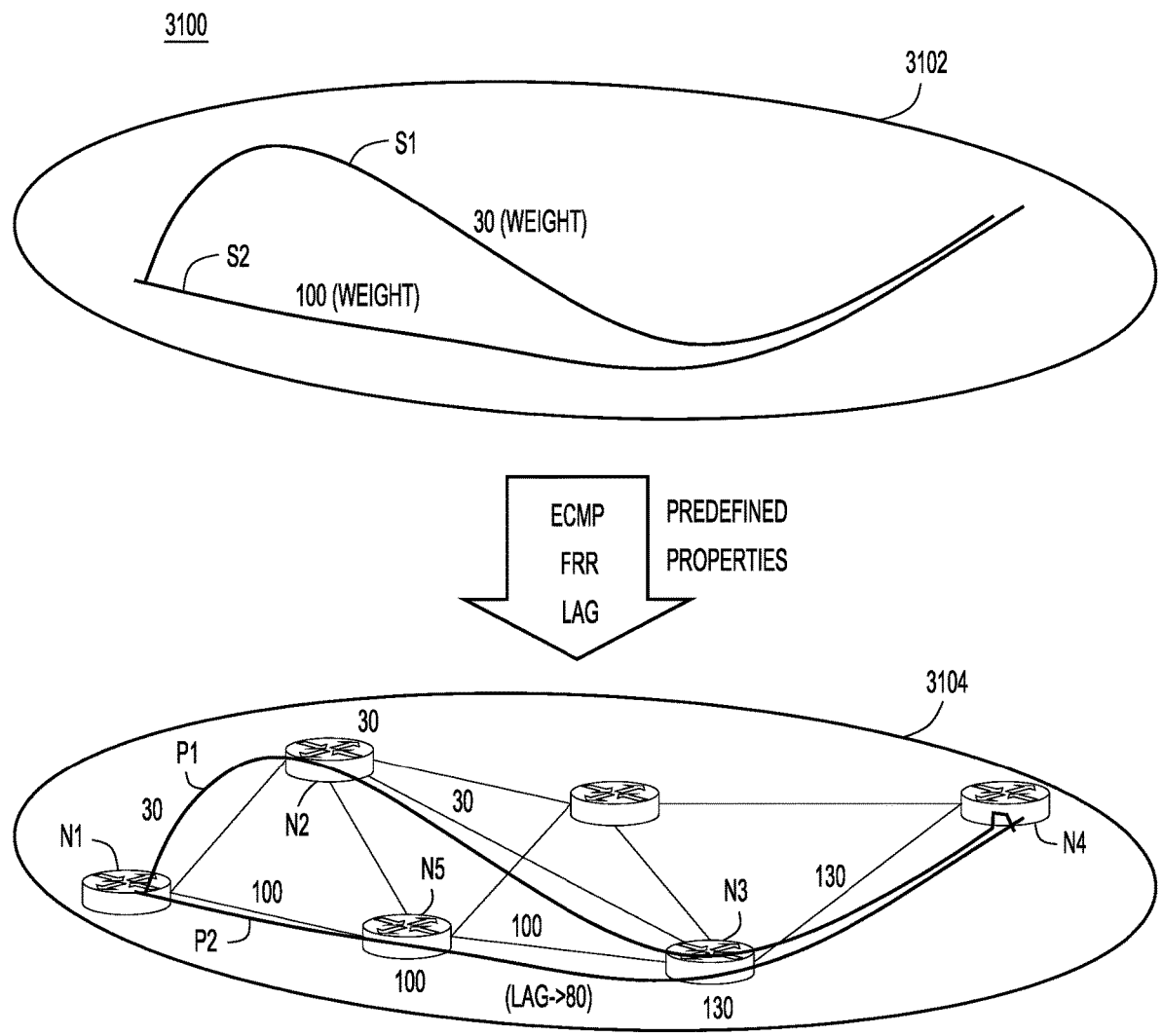
FIG. 31 is an illustration of a method of computing measures of criticality of infrastructure elements of a heatmap based on operations that weight services and decompose the services into network infrastructures, according to an example embodiment.

With reference to FIG. 31, there is an illustration of an example method 3100 of computing measures of criticality of infrastructure elements of a heatmap based on weighting services and decomposing the services into infrastructure definitions/topologies. Method 3100 operates on two services S1 and S2 defined in a top, service layer 3102. Services S1 and S2 are depicted in solid line and dashed line, respectively.

Method 3100 assigns weights of 30 and 100 to services S1 and S2, respectively.

Method 3100 performs a top-down decomposition of services S1 and S2 into a network infrastructure/topology layer 3104 (as defined in an infrastructure definition). The decomposition projects services S1 and S2 into a set of first infrastructure elements and a set of second infrastructure elements in topology layer 3104, respectively. More specifically, the first infrastructure elements of service S1 include a sequence of network devices or nodes N1, N2, N3, and N4 and links connecting the nodes to each other, to form a first network path P1 that carries traffic for service S1. In other examples, the decomposition may result in other types of infrastructure elements besides network devices and links, and may also result in multi-layer topologies.

Similarly, the second infrastructure elements of service S2 includes a sequence of network devices N1, N5, N3, and N4 and links connecting the nodes to each other, to form a second network path P2 that carries traffic for service S2. Network paths P1 and P2 overlap at network devices N1, N3, and N4, which are thus common to both of the network paths. Many of the links connecting common network devices N1, N3, and N4 to each other are also common to both network paths P1 and P2.

Predefined properties may be associated with various ones of the first infrastructure elements and various ones of the second infrastructure elements. The predefined properties may include ECMP, FRR, and LAG (in which multiple physical links may be aggregated into a single logical link).

The operations described below are performed on information of infrastructure definitions that define the hops of the first network path P1 and the second network path P2.

To compute criticality measures for the infrastructure elements for the heatmap, method 3100 traverses the first and second infrastructure elements of network paths P1 and P2 paths. As each infrastructure element (network device/link) is traversed, method 3100 computes a respective initial criticality measure for the infrastructure element as an aggregate (starting from zero) of all of the weights assigned to the services that use the infrastructure element. When the infrastructure element is used by only one service, the aggregate is simply the weight assigned to the one service. On the other hand, when the infrastructure element is used by multiple services, i.e., is common to multiple services, the aggregate is the sum of the weights assigned to the multiple services.

Thus, in the example of FIG. 31, method 3100 computes initial criticality measures for the infrastructure elements as follows:
  a. Set initial criticality measures to 30 for network devices/links only used by service S1 (e.g., network device N2).
  b. Set initial criticality measures to 100 for network devices/links only used by service S2 (e.g., network device N5).
  c. Set initial criticality measures to 130 (30+100) for network devices/links used by both service S1 and S2 (e.g., network devices N1, N3, and N4).

Next, method 3100 may adjust/modify the initial criticality measures of the infrastructure elements based on the predefined properties associated with the infrastructure elements, if any, to produce final/adjusted criticality measures that are stored in the heatmap. For example, method 3100 may compute adjusted criticality measures as follows:
  a. If there is a LAG, subtract an amount representative of the LAG from the initial criticality measure, e.g., 100−20=80 (e.g., link between network devices N5 and N3).
  b. If services are decomposed into ECMP-aware paths according to subservice dependency graph, reduce the initial criticality measure of the infrastructure elements included in the ECMP-aware paths.
  c. If infrastructure elements have FRR, reduce the initial criticality measure of the infrastructure elements that have FRR.

The example of FIG. 31 computes the measures of criticality as numeric values by way of example, only. Each of the measures of criticality may be represented by a numeric value, percentage, ratio, or any other suitable indicator of criticality.

Figure 32:
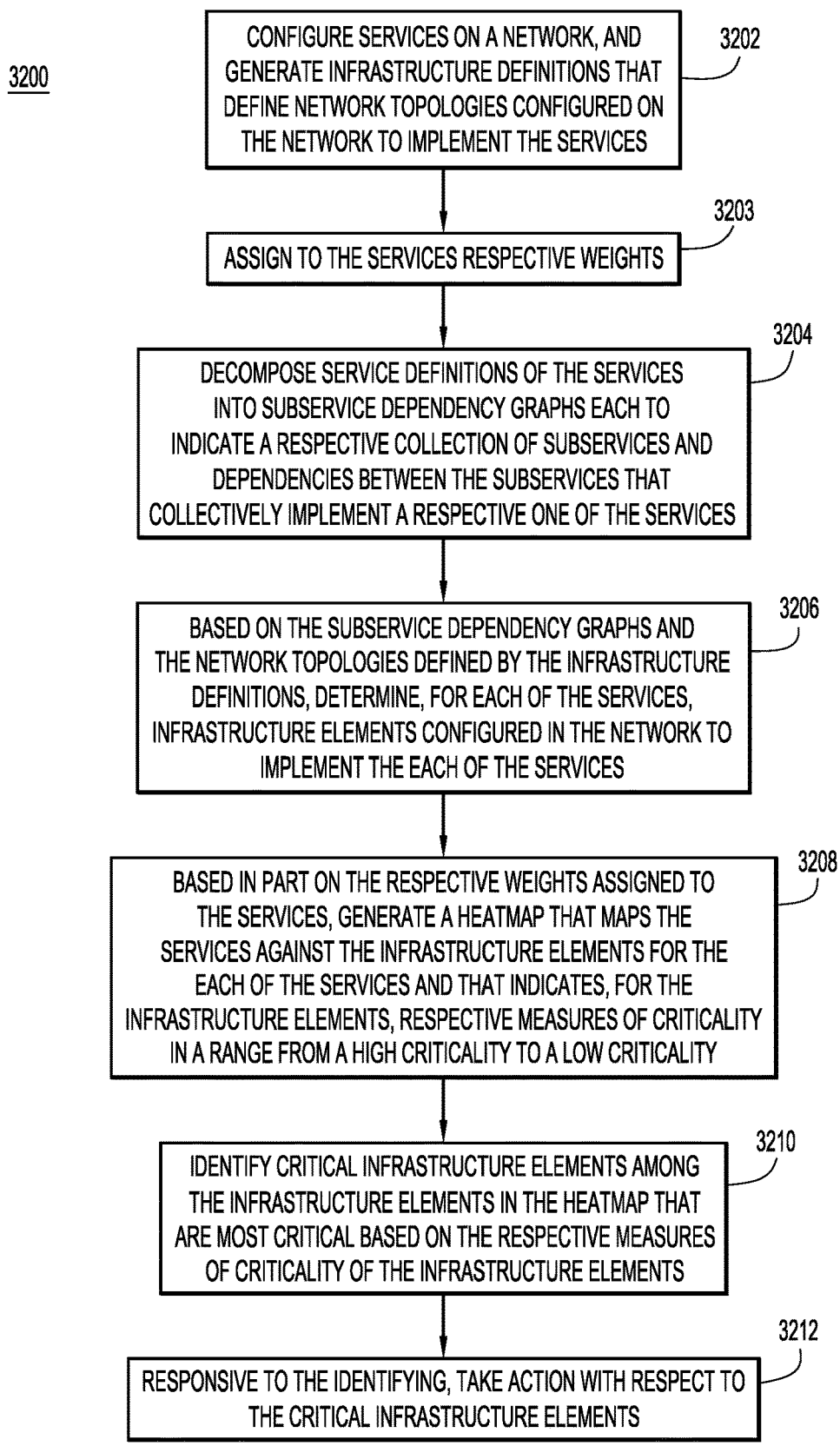
FIG. 32 is a flowchart of a method of employing a heatmap-based telemetry feedback loop for service assurance, performed by the assurance system, according to an example embodiment.

With reference to FIG. 32, there is a flowchart of an example method 3200 of employing a heatmap-based telemetry feedback loop for service assurance, performed by assurance system 100. Method 3200 includes operations described above.

At 3202, network orchestrator 102 configures services on network 113, and provides to assurance orchestrator 106 service definitions for the services, or information from which the service definitions may be derived. Network orchestrator 102 and/or assurance orchestrator 106 generate infrastructure definitions that define network topologies configured on the network to implement the services. This may include soliciting information indicative of the network topologies from network devices 112 of network 113 either directly, or indirectly through a network controller of the network. Operation 3202 may include operation 2102 described above.

At 3203, either network orchestrator 102 or assurance orchestrator 106 assigns respective weights to the services based on one or more factors/criteria that influence the weights.

At 3204, assurance orchestrator 106 decomposes service definitions of the services into subservice dependency graphs each to indicate a respective collection of subservices and dependencies between the subservices that collectively implement a respective one of the services. Operation 3204 may include operations 1402-1406 and 2104 described above. Also, assurance orchestrator 106 may monitor, at a first rate, subservice health states of at least some of the subservices indicated in the subservice dependency graphs. Such monitoring may include performing one or more of operations 1408-1414, 1606-1614, and 2108 described above.

At 3206, based on the subservice dependency graphs and the network topologies defined by the infrastructure definitions, assurance orchestrator 106 determines, for each of the services, a respective set of infrastructure elements configured in the network to implement each of the services. Assurance orchestrator 106 may determine, as the respective set of infrastructure elements, a respective network path formed as a sequence of hops including network devices and links connecting the network devices to each other to form the network path. The network path implements, and carries service traffic for, a respective one of the services.

To determine a network path for a service, assurance orchestrator 106 identifies subservices in the corresponding subservice dependency graph that represent first and second network devices that serve as endpoint devices (simply "endpoints") of the network path (e.g., the endpoints may be network devices SAIN-pe-1 and SAIN-pe-2 identified in subservice nodes D-1 and D-2 of subservice dependency graph 600 of FIG. 6). Using identifiers of the endpoints from the subservice dependency graph, assurance orchestrator 106 identifies the endpoints in the infrastructure definition (e.g., based on a search of the infrastructure definition for matching network device identifiers), and determines hops between the endpoints as found in the infrastructure definition, based on the infrastructure definition.

At 3208, based in part on the respective weights assigned to the services, assurance orchestrator 106 generates a heatmap that maps the services against the infrastructure elements for the each of the services and that indicates, for the infrastructure elements, respective measures of criticality in a range from a high criticality to a low criticality. For example, the heatmap maps each service against the infrastructure elements of the respective network path for that service. To generate the heatmap, assurance orchestrator 106 computes, for each infrastructure element, the respective measure of criticality based on the weights of the services that use the infrastructure element. Assurance orchestrator 106 stores the respective measure of criticality in the heatmap.

When multiple services use the infrastructure element, which is thus common to the services, assurance orchestrator 106 may compute an initial measure of criticality as an aggregate of the respective weights of the services. Otherwise, when only one service uses the infrastructure element, assurance orchestrator 106 may set the initial measure of criticality equal to the respective weight of the service. In some cases, assurance orchestrator 106 may adjust the initial measure of criticality based on one or more properties assigned to the infrastructure element, to produce a final measure of criticality, which the assurance orchestrator stores in the heatmap.

Assurance orchestrator 106 may generate many heatmaps that map the services against different types of infrastructure elements, including network devices, links and interfaces that connect the network devices, and so on.

At 3210, assurance orchestrator 106 traverses the heatmap to identify critical infrastructure elements among the infrastructure elements in the heatmap that are most critical based on the respective measures of criticality of the infrastructure elements. For example, assurance orchestrator 106 determines the critical infrastructure elements as those having respective measures of criticality that exceed a criticality threshold, or simply as those having a highest criticality.

At 3212, assurance orchestrator 106 takes action with respect to the critical infrastructure elements identified at 3210. For example, assurance orchestrator 106 may take action to (i) reconfigure the critical infrastructure elements to reduce their respective measures of criticality, (ii) add the critical infrastructure elements as new/additional subservices to the subservice dependency graphs if the critical infrastructure elements are not already included in the subservice dependency graphs, and/or (iii) monitor health states of the critical infrastructure elements as added to the subservice dependency graphs. Once the critical infrastructure elements have been added to the subservice dependency graphs as new subservices, assurance orchestrator 106 may monitor the critical infrastructure elements as described above, e.g., in operations 1408-1414, 1606-1614, and 2108. In the event that the critical infrastructure elements are not added to the subservice dependency graphs, assurance orchestrator 106 may access the critical infrastructure elements directly to monitor their health states.

With respect to monitoring the health states of the infrastructure elements, assurance orchestrator 106 may (i) monitor the health states of the critical infrastructure elements at a second rate that is greater than the first rate used to monitor the subservice health states in operation 3204, and (ii) monitor the health states of the infrastructure elements that are not critical infrastructure elements at the first rate.

Method 3200 repeats to generate and update heatmaps and to monitor changing critical infrastructure elements over time.

Computer System for Assurance Entities

Figure 33:
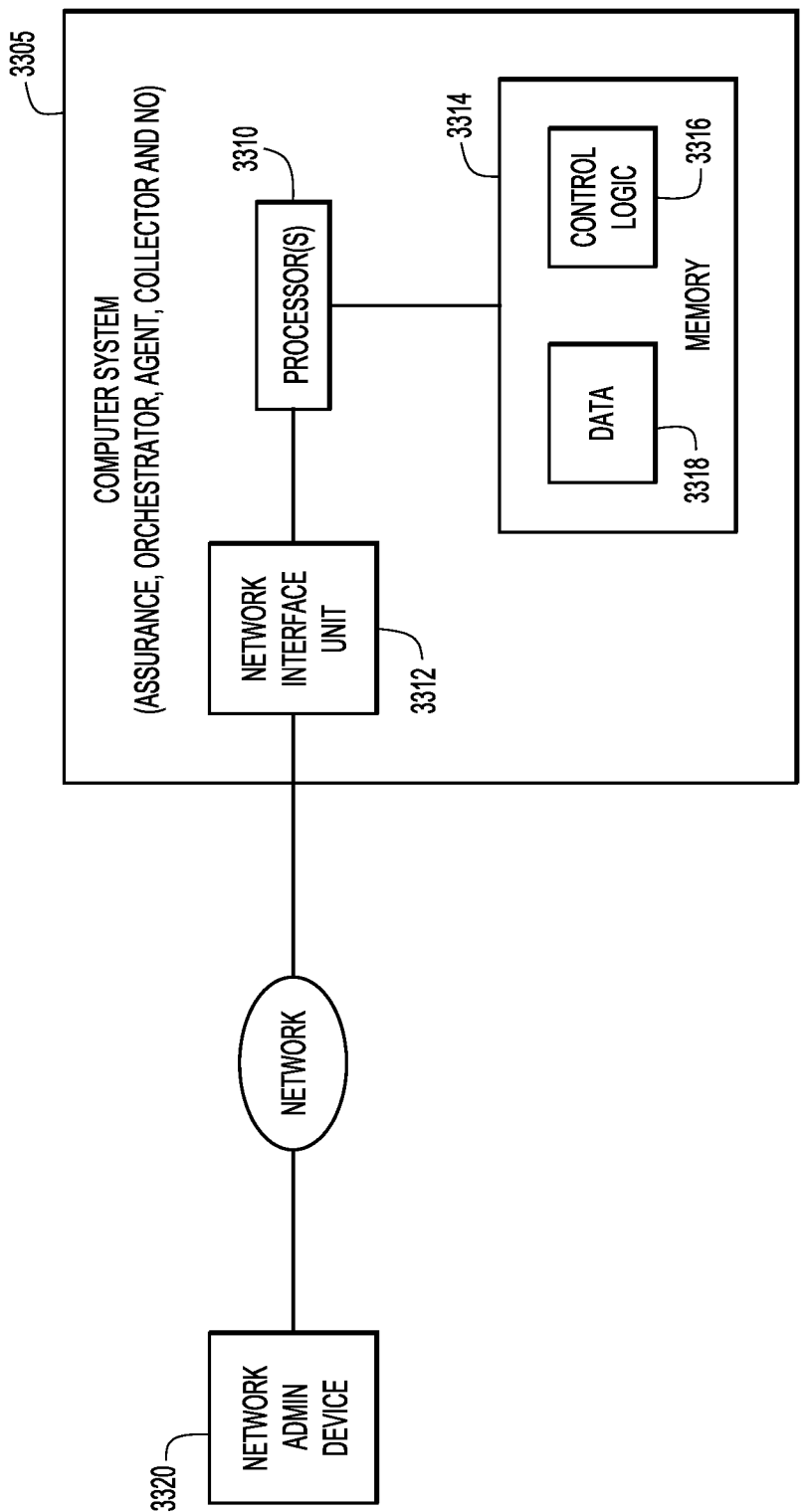
FIG. 33 is a hardware block diagram of an example computer system of a network orchestrator and an assurance entity, representative of one or more of an assurance orchestrator, assurance agents, and assurance collectors of the service assurance system, according to an example embodiment.

With reference to FIG. 33, there is shown a hardware block diagram of an example computer system 3305 of network orchestrator 102 and a service assurance entity, such as one or more of assurance orchestrator 106, assurance agents 108, and assurance collectors 110. Computer system 3305, such as a server, includes one or more processors 3310, a network interface unit (NIU) 3312 (or multiple such NIUs), and a memory 3314. Memory 3314 stores control software 3316 (referred as "control logic"), that when executed by the processor(s) 3310, causes the computer system to perform the various operations described herein for the service assurance entity and for network orchestrator 102.

The processor(s) 3310 may be a microprocessor or microcontroller (or multiple instances of such components). The NIU 3312 enables computer system 3305 to communicate over wired connections or wirelessly with a network. NIU 3312 may include, for example, an Ethernet card or other interface device having a connection port that enables computer system 3305 to communicate over the network via the connection port. In a wireless embodiment, NIU 3312 includes a wireless transceiver and an antenna to transmit and receive wireless communication signals to and from the network.

The memory 3314 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 3314 may comprise one or more tangible (non-transitory) computer readable storage media (e.g., memory device(s)) encoded with software or firmware that comprises computer executable instructions. For example, control software 3316 includes logic to implement operations performed by one or more (or all) of assurance orchestrator 106, assurance agents 108, assurance collectors 110, and network orchestrator 102. Thus, control software 3316 implements the various methods/operations described above. Control software 3316 also includes logic to implement/generate for display graphical user interfaces (GUIs) or, more generally, UIs, as necessary in connection with the above described methods/operations.

Memory 3314 also stores data 3318 generated and used by control software 3316, including network configuration information and service tags, service definitions, subservice dependency graphs, identifiers of shared and non-shared subservices and their associated statistics, heuristic packages, monitoring and telemetry objects, subservice metrics and service-tagged subservice metrics, health states and other KPIs, mappings between the aforementioned parameters stored in memory, infrastructure definitions that define topologies, service weights, measures of criticality, heatmaps, and so on.

A user, such as a network administrator, may interact with computer system 3305, to receive reports, change algorithms, and so on, through GUIs by way of a user device 3320 (also referred to as a "network administration device") that connects by way of a network with computer system 3305. The user device 3320 may be a personal computer (laptop, desktop), tablet computer, SmartPhone, and the like, with user input and output devices, such as a display, keyboard, mouse, and so on. Alternatively, the functionality and a display associated with user device 3320 may be provided local to or integrated with computer system 3305.

In other embodiments, the assurance entity may be implemented as one or more virtual machines (VMs) and or containers.

Figure 34:
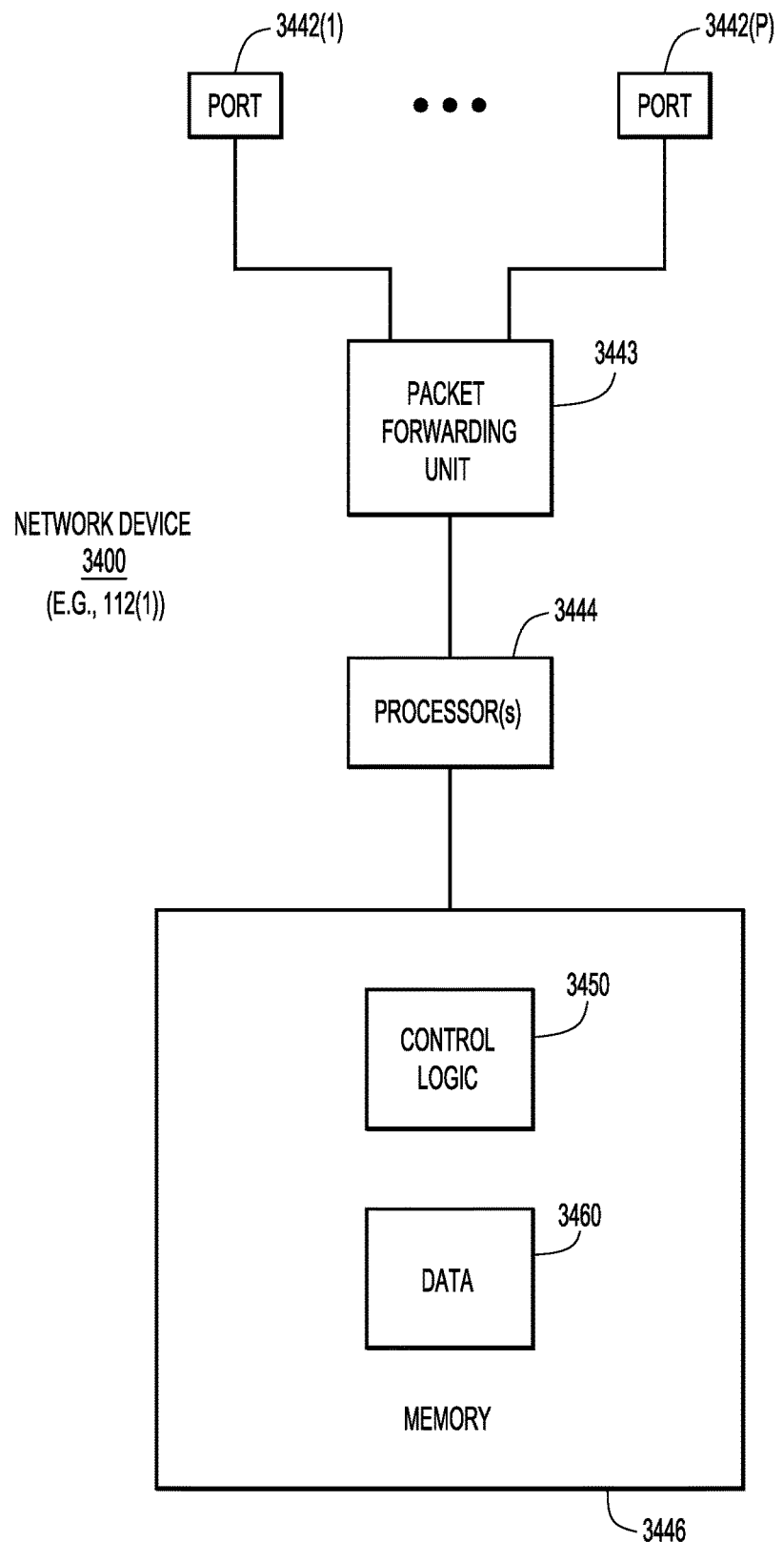
FIG. 34 is a block diagram of a network device on which a subservice may be implemented, according to an example embodiment.

With reference to FIG. 34, there is a block diagram of an example network device 3400, representative of each of network devices 112. Network device 3400 comprises a network interface unit having a plurality of network input/output (I/O) ports 3442(1)-3442(P) to send traffic to one or more networks and receive traffic from the networks, a packet forwarding/processing unit 3443, a network processor 3444 (also referred to simply as "processor"), a management port 3445 to exchange control messages with other network devices and an administration function, and a memory 3446. The packet forwarding/processing unit 3443 is, for example, one or more application specific integrated circuits (ASICs) that include packet buffers, packet queues, and other control logic for performing packet forwarding operations. The processor 3444 may include multiple processors, which may be implemented as software or hardware processors. For example, processor 3444 may include a microcontroller or microprocessor that is configured to perform higher level controls of network device 3400. To this end, the memory 3446 stores software instructions that, when executed by the processor 3444, cause the processor 3444 to perform a variety of operations including operations described herein. For example, the memory 3446 stores instructions for control logic 3450 to perform operations described herein for recording and reporting of subservice metrics, and for configuring network device 3400 responsive to network device configuration information 114. Control logic 3450 may also include logic components in packet forwarding unit 3443. Memory 3446 also stores data 3460 used and generated by logic 3450. Such data may include subservice metrics and device configuration information, for example, as described above.

In summary, assurance system 100 leverages service visibility to identify vital data to be collected, and leverages a heatmap-based approach to identify critical data points, and uses a closed loop approach to program the data points with an appropriate level and frequency of telemetry data and sensor path collection for assurance.

In one form, a method is provided comprising: configuring a service on a network, and generating infrastructure definitions that define one or more network topologies configured on the network to implement the service; decomposing a service definition of the service into a subservice dependency graph to indicate a collection of subservices and dependencies between the subservices that collectively implement the service; based on the subservice dependency graph and the one or more network topologies defined by the infrastructure definitions, determining infrastructure elements configured in the network to implement the service; and generating a heatmap that maps the service against the infrastructure elements and that indicates, for the infrastructure elements, respective measures of criticality in a range from a high criticality to a low criticality.

In another form, a system or apparatus is provided comprising: one or more network interface units; and one or more processors coupled to the one or more network interface units and configured to perform: configuring a service on a network, and generating infrastructure definitions that define one or more network topologies configured on the network to implement the service; decomposing a service definition of the service into a subservice dependency graph to indicate a collection of subservices and dependencies between the subservices that collectively implement the service; based on the subservice dependency graph and the one or more network topologies defined by the infrastructure definitions, determining infrastructure elements configured in the network to implement the service; and generating a heatmap that maps the service against the infrastructure elements and that indicates, for the infrastructure elements, respective measures of criticality in a range from a high criticality to a low criticality.

In yet another form, a computer readable medium is provided. The computer readable medium stores instructions that, when executed by one or more processors coupled to one or more network interface units, cause the one or more processors to perform: configuring a service on a network, and generating infrastructure definitions that define one or more network topologies configured on the network to implement the service; decomposing a service definition of the service into a subservice dependency graph to indicate a collection of subservices and dependencies between the subservices that collectively implement the service; based on the subservice dependency graph and the one or more network topologies defined by the infrastructure definitions, determining infrastructure elements configured in the network to implement the service; and generating a heatmap that maps the service against the infrastructure elements and that indicates, for the infrastructure elements, respective measures of criticality in a range from a high criticality to a low criticality.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A processor-implemented method comprising:
   configuring a service on a network, and generating infrastructure definitions that define one or more network topologies configured on the network to implement the service;
   decomposing a service definition of the service into a subservice dependency graph to indicate a collection of subservices and dependencies between the subservices that collectively implement the service;
   based on the subservice dependency graph and the one or more network topologies defined by the infrastructure definitions, determining infrastructure elements configured in the network to implement the service;
   generating a heatmap that maps the service against the infrastructure elements and that indicates, for the infrastructure elements, respective measures of criticality in a range from a high criticality to a low criticality;
   identifying critical infrastructure elements among the infrastructure elements in the heatmap that are most critical based on the respective measures of criticality of the infrastructure elements; and
   responsive to the identifying, monitoring health states of critical infrastructure elements at a first rate, and monitoring health states of the infrastructure elements that are not the critical infrastructure elements at a second rate that is less than the first rate.

2. The method of claim 1, further comprising:
   responsive to the identifying, taking action with respect to the critical infrastructure elements.

3. The method of claim 2, wherein the taking action includes one or more of:
   reconfiguring the critical infrastructure elements to reduce their respective measures of criticality; and
   adding the critical infrastructure elements to the subservice dependency graph.

4. The method of claim 1, wherein:
   the monitoring health states of critical infrastructure elements at the first rate includes collecting data indicative of the health states of the critical infrastructure elements from the critical infrastructure elements at the first rate.

5. The method of claim 1, wherein the generating the heatmap includes:
   assigning to the service a weight; and
   computing for each of the infrastructure elements a respective measure of criticality based on the weight for the service, to produce the respective measures of criticality.

6. The method of claim 5, wherein the computing includes setting the respective measure of criticality equal to the weight.

7. The method of claim 5, further comprising:
   configuring at least two services on the network such that the at least two services share a common infrastructure element among infrastructure elements that implement the at least two services;
   assigning respective weights to the at least two services; and
   computing a measure of criticality of the common infrastructure element as an aggregate of the respective weights of the at least two services.

8. The method of claim 1, wherein the generating the infrastructure definitions includes:
   soliciting, from the infrastructure elements, information indicative of the network topologies; and
   including the information indicative of the one or more network topologies in the infrastructure definitions.

9. The method of claim 1, wherein:
   the determining includes determining infrastructure elements among the infrastructure elements that are not represented as subservices in the subservice dependency graph; and
   the method further comprises updating the subservice dependency graph to include as additional subservices in the subservice dependency graph the infrastructure elements that are not represented as any of the subservices in the subservice dependency graph.

10. The method of claim 1, wherein:
    the determining includes determining, for the service, a network path including the infrastructure elements configured in the network to implement the service; and
    the generating the heatmap includes generating the heatmap to map the service against the infrastructure elements of the network path.

11. The method of claim 10, wherein the determining, for the service, the network path includes:
    identifying endpoint devices for the network path in the subservice dependency graph for the service; and
    determining hops between the endpoint devices resulting from the identifying based on the infrastructure definitions.

12. The method of claim 10, wherein the infrastructure elements of the network path include network devices of the network and links that connect the network devices to each other to form the network path, and the generating the heatmap includes generating the heatmap such that the heatmap (i) maps the service against the network devices of the network path, and (ii) indicates respective measures of criticality of the network devices of the network path as the respective measures of criticality.

13. A system comprising:
    one or more network interface units; and
    one or more processors coupled to the one or more network interface units and configured to perform:
       configuring a service on a network, and generating infrastructure definitions that define one or more network topologies configured on the network to implement the service;
       decomposing a service definition of the service into a subservice dependency graph to indicate a collection of subservices and dependencies between the subservices that collectively implement the service;
       based on the subservice dependency graph and the one or more network topologies defined by the infrastructure definitions, determining infrastructure elements configured in the network to implement the service;
       generating a heatmap that maps the service against the infrastructure elements and that indicates, for the infrastructure elements, respective measures of criticality in a range from a high criticality to a low criticality;

identifying critical infrastructure elements among the infrastructure elements in the heatmap that are most critical based on the respective measures of criticality of the infrastructure elements; and responsive to the identifying, monitoring health states of critical infrastructure elements at a first rate, and monitoring health states of the infrastructure elements that are not the critical infrastructure elements at a second rate that is less than the first rate.

14. The system of claim 13, wherein the one or more processors are further configured to perform:

responsive to the identifying, taking action with respect to the critical infrastructure elements.

15. The system of claim 14, wherein the one or more processors are configured to perform the taking action by performing one or more of:

reconfiguring the critical infrastructure elements to reduce their respective measures of criticality; and adding the critical infrastructure elements to the subservice dependency graph.

16. The system of claim 13, wherein the one or more processors are configured to perform the generating the heatmap by:

assigning to the service a weight; and computing for each of the infrastructure elements a respective measure of criticality based on the weight for the service, to produce the respective measures of criticality.

17. The system of claim 13, wherein the one or more processors are configured to perform the generating the infrastructure definitions by:

soliciting, from the infrastructure elements, information indicative of the one or more network topologies; and including the information indicative of the one or more network topologies in the infrastructure definitions.

18. Non-transitory computer readable media encoded with instructions that, when executed by one or more processors coupled to one or more network interface units, cause the one or more processors to perform:

configuring a service on a network, and generating infrastructure definitions that define one or more network topologies configured on the network to implement the service;

decomposing a service definition of the service into a subservice dependency graph to indicate a collection of subservices and dependencies between the subservices that collectively implement the service;

based on the subservice dependency graph and the one or more network topologies defined by the infrastructure definitions, determining infrastructure elements configured in the network to implement the service;

generating a heatmap that maps the service against the infrastructure elements and that indicates, for the infrastructure elements, respective measures of criticality in a range from a high criticality to a low criticality;

identifying critical infrastructure elements among the infrastructure elements in the heatmap that are most critical based on the respective measures of criticality of the infrastructure elements; and responsive to the identifying, monitoring health states of critical infrastructure elements at a first rate, and monitoring health states of the infrastructure elements that are not the critical infrastructure elements at a second rate that is less than the first rate.

19. The non-transitory computer readable media of claim 18, further comprising instructions to cause the one or more processors to perform:

responsive to the identifying, taking action with respect to the critical infrastructure elements.

20. The non-transitory computer readable media of claim 19, wherein the instructions to cause the one or more processors to perform the taking action include instructions to cause the processors to perform one or more of:

reconfiguring the critical infrastructure elements to reduce their respective measures of criticality; and adding the critical infrastructure elements to the subservice dependency graph.

* * * * *